US008656030B2

(12) United States Patent  
Ishibashi et al.

(10) Patent No.: US 8,656,030 B2  
(45) Date of Patent: Feb. 18, 2014

(54) COMMUNICATION SYSTEM, COMMUNICATION DEVICE AND METHOD, AND PROGRAM

(75) Inventors: Yoshihito Ishibashi, Tokyo (JP); Susumu Kusakabe, Tokyo (JP); Fumio Kubono, Tokyo (JP); Shoji Nagai, Tokyo (JP); Yuko Yoshida, Tokyo (JP)

(73) Assignee: Sony Corporation, Tokyo (JP)

(*) Notice: Subject to any disclaimer, the term of this patent is extended or adjusted under 35 U.S.C. 154(b) by 1280 days.

(21) Appl. No.: 11/490,317

(22) Filed: Jul. 21, 2006

(65) Prior Publication Data

US 2007/0058563 A1 Mar. 15, 2007

(30) Foreign Application Priority Data

Jul. 25, 2005 (JP) ................ P2005-215064  
Jun. 26, 2006 (JP) ................ P2006-174774

(51) Int. Cl.
*G06F 15/16* (2006.01)
*G06F 15/177* (2006.01)
*H04L 12/66* (2006.01)

(52) U.S. Cl.
USPC ............ 709/228; 709/219; 709/220; 370/252

(58) Field of Classification Search
USPC .................. 709/219, 228; 370/252
See application file for complete search history.

(56) References Cited

U.S. PATENT DOCUMENTS

| 7,024,548 B1* | 4/2006 | O'Toole, Jr. ............ 713/1 |
| 7,139,559 B2* | 11/2006 | Kenagy et al. ............ 455/418 |
| 2002/0032024 A1* | 3/2002 | Namba et al. ............ 455/419 |
| 2007/0260738 A1* | 11/2007 | Palekar et al. ............ 709/229 |

FOREIGN PATENT DOCUMENTS

| JP | 2001-320326 | 11/2001 |
| JP | 2002-109494 | 4/2002 |
| JP | 2002-359623 | 12/2002 |
| JP | 2003-168083 | 6/2003 |
| JP | 2004-078495 | 3/2004 |
| JP | 2005-167946 | 6/2005 |

OTHER PUBLICATIONS

Office Action issued by Japanese Patent Office in corresponding Japanese Patent Application No. 2006-174774 on May 10, 2011 (3 pages).

* cited by examiner

*Primary Examiner* — Noel Beharry

(74) *Attorney, Agent, or Firm* — Finnegan, Henderson, Farabow, Garrett & Dunner, L.L.P.

(57) ABSTRACT

A communication device for performing communication with another communication device via a communication medium includes an obtaining unit for obtaining first attribute information which is information relating to a function and a usage of the other communication device, a setting unit for performing setting of the communication based on the first attribute information obtained by the obtaining unit, and a control unit for controlling the communication based on the setting results of the communication performed by the setting unit.

21 Claims, 70 Drawing Sheets

| FREQUENCY f [Hz] | RECEPTION LOAD Rr [Ω] | CAPACITANCE [F] | EFFECTIVE VOLTAGE Vrms [V] |
|---|---|---|---|
| 1.0E+06 | 1.0E+04 | 1.0E−13 | 0.013 |
| 1.0E+06 | 1.0E+04 | 1.0E−12 | 0.125 |
| 1.0E+06 | 1.0E+04 | 1.0E−11 | 1.064 |
| 1.0E+06 | 1.0E+05 | 1.0E−13 | 0.125 |
| 1.0E+06 | 1.0E+05 | 1.0E−12 | 1.064 |
| 1.0E+06 | 1.0E+05 | 1.0E−11 | 1.975 |
| 1.0E+06 | 1.0E+06 | 1.0E−13 | 1.064 |
| 1.0E+06 | 1.0E+06 | 1.0E−12 | 1.975 |
| 1.0E+06 | 1.0E+06 | 1.0E−11 | 2.000 |
| 1.0E+07 | 1.0E+04 | 1.0E−13 | 0.125 |
| 1.0E+07 | 1.0E+04 | 1.0E−12 | 1.064 |
| 1.0E+07 | 1.0E+04 | 1.0E−11 | 1.975 |
| 1.0E+07 | 1.0E+05 | 1.0E−13 | 1.064 |
| 1.0E+07 | 1.0E+05 | 1.0E−12 | 1.975 |
| 1.0E+07 | 1.0E+05 | 1.0E−11 | 2.000 |
| 1.0E+07 | 1.0E+06 | 1.0E−13 | 1.975 |
| 1.0E+07 | 1.0E+06 | 1.0E−12 | 2.000 |
| 1.0E+07 | 1.0E+06 | 1.0E−11 | 2.000 |
| 1.0E+08 | 1.0E+04 | 1.0E−13 | 1.064 |
| 1.0E+08 | 1.0E+04 | 1.0E−12 | 1.975 |
| 1.0E+08 | 1.0E+04 | 1.0E−11 | 2.000 |
| 1.0E+08 | 1.0E+05 | 1.0E−13 | 1.975 |
| 1.0E+08 | 1.0E+05 | 1.0E−12 | 2.000 |
| 1.0E+08 | 1.0E+05 | 1.0E−11 | 2.000 |
| 1.0E+08 | 1.0E+06 | 1.0E−13 | 2.000 |
| 1.0E+08 | 1.0E+06 | 1.0E−12 | 2.000 |
| 1.0E+08 | 1.0E+06 | 1.0E−11 | 2.000 |

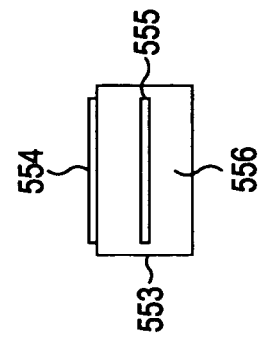
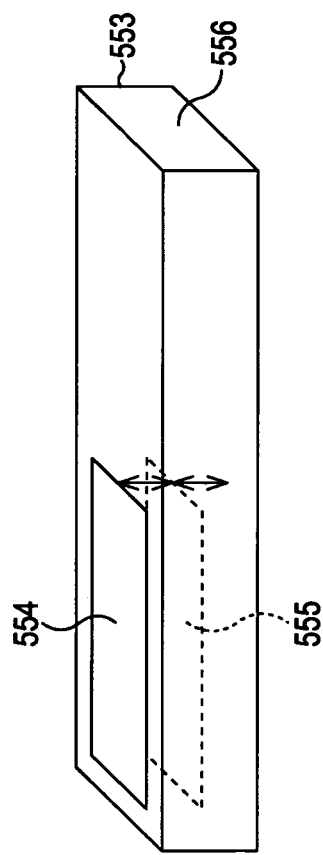

| ITEM | ATTRIBUTE VALUE |
|---|---|
| PROCESSING SPEED | 0: FIXED AT LOWEST LEVEL<br>1: FIXED AT MIDDLE LEVEL<br>2: FIXED AT HIGHEST LEVEL<br>3: LEVEL VARIABLE |
| TRANSMISSION POWER | |
| RECEPTION SENSITIVITY | |
| POWER FEED CAPABILITY | |

| ITEM | ATTRIBUTE VALUE |
|---|---|
| WICKET PROCESSING | PROCESSING SPEED: HIGH<br>TRANSMISSION POWER: HIGH<br>RECEPTION SENSITIVITY: HIGH<br>POWER FEED CAPABILITY: YES |
| PAYMENT PROCESSING | PROCESSING SPEED: VARIABLE<br>TRANSMISSION POWER: VARIABLE<br>RECEPTION SENSITIVITY: LOW<br>POWER FEED CAPABILITY: NO |
| BALANCE INQUIRY PROCESSING | PROCESSING SPEED: LOW<br>TRANSMISSION POWER: LOW<br>RECEPTION SENSITIVITY: HIGH<br>POWER FEED CAPABILITY: NO |

FIG. 41

| 1071 | EXTERNAL POWER SOURCE TYPE USER DEVICE (VARIABLE PROCESSING SPEED) | INTERNAL POWER SOURCE TYPE USER DEVICE (WITH SUFFICIENT POWER) (PROCESSING SPEED, TRANSMISSION POWER: VARIABLE) | INTERNAL POWER SOURCE TYPE USER DEVICE (WITH INSUFFICIENT POWER) (PROCESSING SPEED, TRANSMISSION POWER: VARIABLE) |
|---|---|---|---|
| WICKET PROCESSING (PROCESSING SPEED, TRANSMISSION POWER, RECEPTION SENSITIVITY: VARIABLE, POWER: SUPPLIABLE) | · USER DEVICE PROCESSING SPEED: LOW<br>· READER/WRITER PROCESSING SPEED: LOW TRANSMISSION POWER: HIGH RECEPTION SENSITIVITY: HIGH POWER SUPPLY: SUPPLIED | · USER DEVICE PROCESSING SPEED: HIGH TRANSMISSION POWER: HIGH<br>· READER/WRITER PROCESSING SPEED: HIGH TRANSMISSION POWER: LOW RECEPTION SENSITIVITY: HIGH POWER SUPPLY: STOPPED | · USER DEVICE PROCESSING SPEED: LOW TRANSMISSION POWER: LOW<br>· READER/WRITER PROCESSING SPEED: LOW TRANSMISSION POWER: HIGH RECEPTION SENSITIVITY: HIGH POWER SUPPLY: STOPPED |
| PAYMENT PROCESSING (PROCESSING SPEED, TRANSMISSION POWER, RECEPTION SENSITIVITY: VARIABLE, POWER: SUPPLIABLE) | · USER DEVICE PROCESSING SPEED: LOW<br>· READER/WRITER PROCESSING SPEED: LOW TRANSMISSION POWER: HIGH RECEPTION SENSITIVITY: HIGH POWER SUPPLY: SUPPLIED | · USER DEVICE PROCESSING SPEED: HIGH TRANSMISSION POWER: HIGH<br>· READER/WRITER PROCESSING SPEED: HIGH TRANSMISSION POWER: LOW RECEPTION SENSITIVITY: HIGH POWER SUPPLY: STOPPED | · USER DEVICE PROCESSING SPEED: LOW TRANSMISSION POWER: LOW<br>· READER/WRITER PROCESSING SPEED: LOW TRANSMISSION POWER: HIGH RECEPTION SENSITIVITY: HIGH POWER SUPPLY: STOPPED |
| BALANCE INQUIRY PROCESSING (PROCESSING SPEED, TRANSMISSION POWER, RECEPTION SENSITIVITY: VARIABLE, POWER: SUPPLIABLE) | · USER DEVICE PROCESSING SPEED: LOW<br>· READER/WRITER PROCESSING SPEED: LOW TRANSMISSION POWER: LOW RECEPTION SENSITIVITY: LOW POWER SUPPLY: SUPPLIED | · USER DEVICE PROCESSING SPEED: LOW TRANSMISSION POWER: HIGH<br>· READER/WRITER PROCESSING SPEED: LOW TRANSMISSION POWER: LOW RECEPTION SENSITIVITY: LOW POWER SUPPLY: STOPPED | · USER DEVICE PROCESSING SPEED: LOW TRANSMISSION POWER: LOW<br>· READER/WRITER PROCESSING SPEED: LOW TRANSMISSION POWER: HIGH RECEPTION SENSITIVITY: LOW POWER SUPPLY: STOPPED |

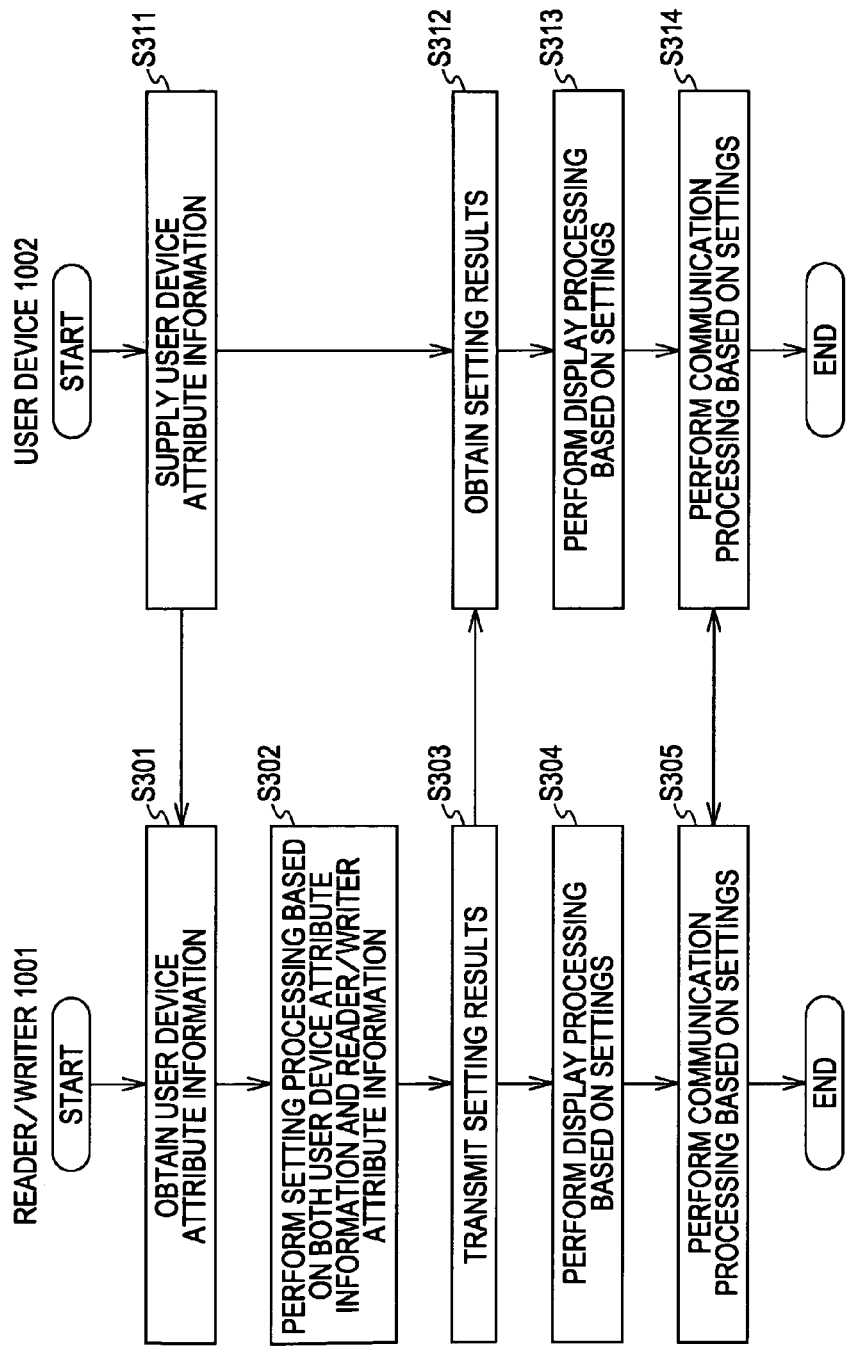

FIG. 72A

| ITEM | ATTRIBUTE VALUE |
|---|---|
| VIBRATION FUNCTION | 0: NO<br>1: YES |
| DISPLAY FUNCTION | |
| AUDIO CONVEYANCE FUNCTION | |

| ITEM | ATTRIBUTE VALUE |
|---|---|
| WICKET PROCESSING | VIBRATION: NO<br>DISPLAY: PATTERN A<br>AUDIO: PATTERN B |
| DEPOSIT PROCESSING | VIBRATION: PATTERN C<br>DISPLAY: PATTERN D<br>AUDIO: PATTERN E |

1742

COMMUNICATION SYSTEM, COMMUNICATION DEVICE AND METHOD, AND PROGRAM

CROSS REFERENCES TO RELATED APPLICATIONS

The present invention contains subject matter related to Japanese Patent Application JP 2005-215064 filed in the Japanese Patent Office on Jul. 25, 2005, and Japanese Patent Application JP 2006-174774 filed in the Japanese Patent Office on Jun. 26, 2006, the entire contents of which are incorporated herein by reference.

BACKGROUND OF THE INVENTION

1. Field of the Invention

The present invention relates to a communication system, a communication device and a method, and a program, and particularly relates to a communication system, a communication device and a method, and a program, wherein communication can be performed under more appropriate communication settings according to the usage purpose of communication processing.

2. Description of the Related Art

The precision of communication has heretofore been greatly affected by communication devices involved, communication conditions, and so forth. For example, in a case wherein communication conditions are very poor and successful reception of information transmitted by the other party of communication is difficult, and in the event that communication speed is set to a higher speed, or reception sensitivity or transmission power is suppressed in such a state, the rate of communication error further rises, making successful communication even more difficult.

Accordingly, methods wherein the intensity of the transmission power is adjusted according to reception level have been conceived (e.g., Japanese Unexamined Patent Application Publication No. 2001-320326).

Now, in recent years communication systems wherein various types of services are provided using close-distance wireless communication has become commonplace due to advances in information processing technology. Such systems are used for, for example, payment of fees for mass transit systems, purchase of goods and tickets in shops, personal identification such as for employee ID or admission permits, locking/unlocking doors in security systems, payment in cafeterias, and so forth.

With such systems, user can receive services by carrying a portable device such as an IC card or the like, having communication functions of close-distance wireless communication, and a storage medium for storing personal information and monetary amounts and the like, and bringing the portable device in to the proximity or into contact with a reader/writer of a service provider so as to effect communication therebetween at the time of receiving serving of payment of charges, personal identification, or the like.

SUMMARY OF THE INVENTION

However, as described above, communication conditions are not necessarily always optimal. Accordingly, depending on the communication conditions, communication processing necessary for providing services may not be performed successfully.

An arrangement for handling this by adjusting the intensity of the transmitted electric power according to the reception conditions, using the method described in the above Japanese Unexamined Patent Application Publication No. 2001-320326 may be conceived; however, as described above, close-distance wireless communication is used for various purposes, and depending on the purpose there may be a need to reduce the transmission speed regardless of the communication environment. Also, evaluation factors of communication processing include for example communication range and electric power consumption, besides processing speed, so performing communication at high speeds is not necessarily desirable.

Accordingly, there has been recognized a need to enable communication under communication settings more appropriate for the usage purpose of the communication processing.

According to an embodiment of the present invention, a communication system is provided which comprises: a first communication device; and a second communication device; wherein the first communication device and the second communication device communicate via a communication medium; the first communication device including first holding means for holding first attribute information which is information relating to a function and a usage of the first communication device, first sharing means for sharing with the second communication device the first attribute information held in the first holding means and second attribute information held in the second communication device, which is information relating to a function and a usage of the second communication device, first setting means for performing setting of the communication based on the second attribute information shared by the first sharing means, and first control means for controlling the communication based on the setting results of the communication performed by the first setting means; and the second communication device including second holding means for holding the second attribute information, second sharing means for sharing with the first communication device second attribute information held in the second holding means and first attribute information held in the first holding means of the first communication device, second setting means for performing setting of the communication based on the first attribute information shared by the second sharing means, and second control means for controlling the communication based on the setting results of the communication performed by the second setting means.

With this embodiment of the present invention, first attribute information which is information relating to a function and a usage of the first communication device, which is held by the first communication device, and second attribute information which is information relating to a function and a usage of the second communication device, which is held by the second communication device, are shared, such that communication is controlled at the first communication device based on the shared second attribute information, and communication is controlled at the second communication device based on the shared first attribute information.

According to another embodiment of the present invention, a communication device for performing communication with another communication device via a communication medium comprises: obtaining means for obtaining first attribute information which is information relating to a function and a usage of the other communication device; setting means for performing setting of the communication based on the first attribute information obtained by the obtaining means; and control means for controlling the communication based on the setting results of the communication performed by the setting means.

The first attribute information may include information relating to hardware of the other communication device, including at least one of information relating to processing speed of the other communication device, information relating to transmission power, information relating to reception sensitivity, information relating to whether or not a power source is provided, and information relating to the state of power source.

The first attribute information may include information relating to software which the other communication device executes.

The communication device may further comprise request means for requesting the first attribute information of the other communication device, with the obtaining means obtaining the first attribute information which the communication device has transmitted in response to a request from the request means.

The setting means may perform setting for at least one of processing speed, transmission power, reception sensitivity, and power supply control to the other communication device, as setting of the communication.

The communication device may further comprise table holding means for holding a setting table which is table information for performing setting of the communication with the first attribute information, with the setting means performing setting of the communication using the table information hold in the table holding means.

The communication device may further comprise setting changeability determining means for determining whether or not the other communication device can change settings regarding the communication, with the setting means performing setting of the communication based on the determination results of the changeability determining means.

The communication device may further comprise display means for displaying information relating to the setting results of the communication with the setting means.

The first attribute information may include at least one of information relating to an algorithm for encryption processing for the other communication device, information relating to the number of processing steps of encryption processing thereof, and information relating to an encryption key and key length thereof.

The first attribute information may include information relating to a clock frequency of the other communication device.

The first attribute information may include information relating to a hardware function of the other communication device.

The communication device may further comprise attribute information holding means for holding second attribute information which is information relating to a function and usage of the communication device, and supply means for supplying the second attribute information hold by the attribute information holding means to the other communication device.

The second attribute information may include information relating to hardware of the communication device, including at least one of information relating to processing speed of the communication device, information relating to transmission power, information relating to reception sensitivity, information relating to whether or not a power source is provided, and information relating to the state of power source.

The second attribute information may include information relating to software which the other communication device executes.

The communication device may further comprise request accepting means for accepting requests for the second attribute information from the other communication device, with the supply means supplying the second attribute information to the other communication device upon accepting the request by the request accepting means.

The second attribute information may include at least one of information relating to an algorithm for encryption processing for the communication device, information relating to the number of processing steps of encryption processing thereof, and information relating to an encryption key and key length thereof.

The second attribute information may include information relating to a clock frequency of the communication device.

The second attribute information may include information relating to a hardware function of the communication device.

The communication device may further comprise: attribute information holding means for holding second attribute information which is information relating to a function and usage of the communication device; and supply means for supplying the setting results of the communication performed by the setting means to the other communication device; with the setting means performing setting of the communication relating to the communication device and setting of the communication relating to the other communication device, based on the first attribute information obtained by the obtaining means, and the second attribute information held by the attribute information holding means; and with the supply means supplying setting results of the communication relating to at least the other communication device, to the other communication device.

The communication device may further comprise setting results obtaining means for obtaining setting results of the communication relating to the communication device, supplied from the other communication device, with the setting means performing setting of the communication based on the setting results of the communication relating to the communication device, obtained from the setting result obtaining means.

According to another embodiment of the present invention, there is provided a communication method for a communication device to perform communication with another communication device via a communication medium, the method comprising the steps of: obtaining attribute information relating to a function and a usage of the other communication device; performing setting for the communication, based on the attribute information obtained by the obtaining; and controlling the communication based on the setting results of the communication performed by the setting.

According to yet another embodiment of the present invention, there is provided a program for causing a computer to carry out the method by execution thereof.

According to yet another embodiment of the present invention, there is provided a communication system comprising: a first communication device; and a second communication device; wherein the first communication device and the second communication device communicate via a communication medium; the first communication device including a first holding unit for holding first attribute information which is information relating to a function and a usage of the first communication device, a first sharing unit for sharing with the second communication device the first attribute information held in the first holding unit and second attribute information which is information relating to a function and a usage of the second communication device, a first setting unit for performing setting of the communication based on the second attribute information shared by the first sharing unit, and a first control unit for controlling the communication based on the setting results of the communication performed by the first setting unit; and the second communication device including a second holding unit for holding second first attribute information which is information relating to a function and a usage of the second communication device, a second sharing unit for sharing with the first communication device the second attribute information held in the second holding unit and first attribute information which is information relating to a function and a usage of the first communication device, a second setting unit for performing setting of the communication based on the first attribute information shared by the second sharing unit, and a second control unit for controlling the communication based on the setting results of the communication performed by the second setting unit.

According to yet another embodiment of the present invention, there is provided a communication device for performing communication with another communication device via a communication medium, the communication device including: an obtaining unit for obtaining first attribute information which is information relating to a function and a usage of the other communication device; a setting unit for performing setting of the communication based on the first attribute information obtained by the obtaining unit; and a control unit for controlling the communication based on the setting results of the communication performed by the setting unit.

With this embodiment, attribute information which is information relating to a function and a usage of the other communication device is obtained, setting is performed based on the obtained attribute information, and communication is controlled based on the setting results of the communication.

Thus, according to an embodiment of the present invention, communication can be performed, and more particularly, communication can be performed under communication settings more suitable of the usage purpose of the communication processing.

BRIEF DESCRIPTION OF THE DRAWINGS

FIG. 3 is a diagram illustrating an example of calculation results of actual values of voltage occurring at both ends of a reception load resistor, in the model shown in FIG. 2;

FIGS. 16A and 16B are diagrams illustrating yet another example of placement of electrodes;

FIGS. 38A and 38B are tables illustrating configuration examples of reader/writer attribute information shown in FIG. 37;

FIG. 41 is a table diagram illustrating a configuration example of a settings table shown in FIG. 40;

FIG. 63 is a flowchart for describing yet another example of the flow of communication optimization processing;

FIGS. 72A and 72B are tables illustrating further configuration examples of reader/writer attribute information;

DESCRIPTION OF THE PREFERRED EMBODIMENTS

Embodiments of the present invention will now be described with reference to the drawings. First, making reference to FIGS. 1 through 33, description will be made regarding a communication system which is no restricted by the usage environment by doing away with the need for a physical reference point path and realizing communication by a communication signal transmission path alone, as an example of a communication system to which the present invention is applied.

Figure 1:
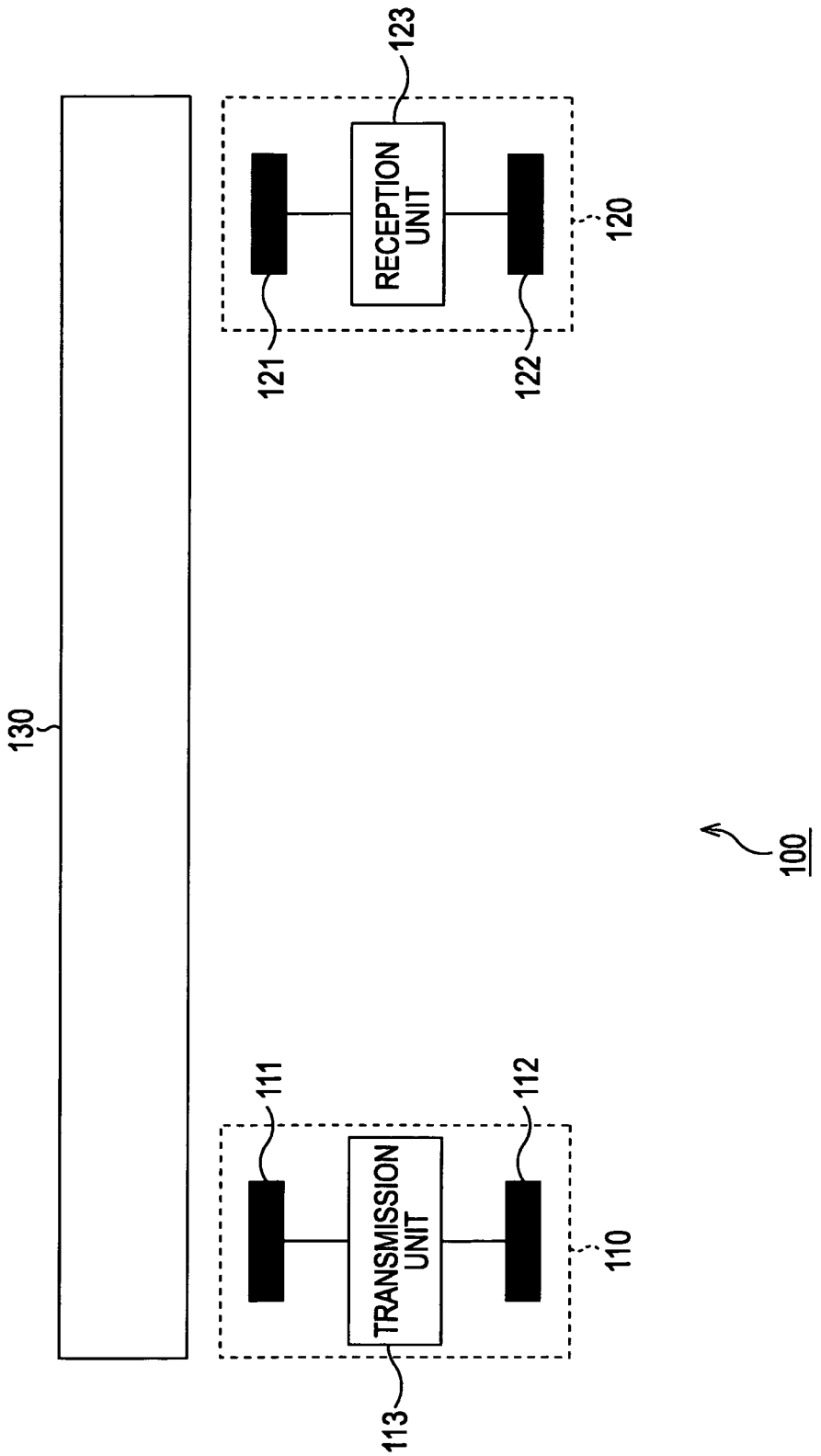
FIG. 1 is a diagram illustrating a configuration example of an embodiment of a communication system to which the present invention is applied.

FIG. 1 is a diagram illustrating a configuration example according to an embodiment of a communication system which does not use a physical but realizes communication by a communication signal transmission path alone.

In FIG. 1, a communication system 100 is configured including a transmission device 110, a reception device 120, and a communication medium 130, thereby realizing a transmission/reception system wherein the transmission device 110 and the reception device 120 exchange signal via the communication medium 130. In other words, with this communication system 100, signals transmitted from the transmission device 110 are transmitted via the communication medium 130, and received by the reception device 120.

The transmission device 110 includes a transmission signal electrode 111, a transmission reference electrode 112, and a transmission unit 113. The transmission signal electrode 111 is one electrode of a pair of electrodes provided for transmission of signals to be transferred via the communication medium 130, and is provided such that the electrostatic coupling thereof as to the communication medium 130 is stronger than that of the transmission reference electrode 112, which is the other electrode of the pair. The transmission unit 113 is provided between the transmission signal electrode 111 and the transmission reference electrode 112, and provides these electrodes with electric signals (electric potential) to be transferred to the reception device 120.

The reception device 120 includes a reception signal electrode 121, a reception reference electrode 122, and a reception unit 123. The reception signal electrode 121 is one electrode of a pair of electrodes provided for reception of signals transferred via the communication medium 130, and is provided such that the electrostatic coupling thereof as to the communication medium 130 is stronger than that of the reception reference electrode 122, which is the other electrode of the pair. The reception unit 123 is provided between the reception signal electrode 121 and the reception reference electrode 122, and detects electric signals (electric potential) generated between these electrodes by signals transferred over the communication medium 130, converts these electric signals into suitable electric signals, and restores the electric signals generated and the transmission unit 113 of the transmission device 110.

The communication medium 130 is configured of a material having physical properties enabling electric signals to be carried, such as electric conductors, dielectric materials, for example. For example, the communication medium 130 may be configured of: an electric conductor, a representative example of which is metal, such as copper, iron, aluminum, or the like; a dielectric material such as pure water, rubber, glass, or the like; or a compound material having the nature of both a conductor and a dielectric substance, such as an organism, an electrolytic solution of saltwater or the like, or the like. The shape of the communication medium 130 is not restricted in any way, and may be linear, plate-shaped, spherical, a polygonal pillar, a cylinder, or any other arbitrary shape.

With regard to such a communication system 100, description will first be made regarding the relation between the electrodes and the space around the communication medium or device. In the following description, the communication medium 130 will be described as being a perfect conductor, for the sake of facilitating description. Also, we sill say that there is space between the transmission signal electrode 111 and the communication medium 130, and between the transmission reference electrode 121 and the communication medium 130, and that there is no electrical coupling in this space. That is to say, capacitance is formed between the communication medium 130 and each of the transmission signal electrode 111 and the transmission reference electrode 121.

Further, the transmission reference electrode 112 is disposed facing the space around the transmission device 110, and the reception reference electrode 122 is disposed facing the space around the reception device 120. Generally, in the event that a spherical conductor exists in a space, capacitance is formed between the spherical conductor and the space. For example, with a conductor shaped as a sphere having a radius of r meters, the capacitance C is obtained as in the following Expression (1)

$$C = 4\pi \in r \ [F] \quad (1)$$

wherein $\pi$ is the circle ratio. Also, $\in$ represents permittivity, and is obtained by $$\in = \in_r \times \in_0 \quad (2)$$

wherein $\in_0$ represents permittivity in a vacuum, which is $8.854 \times 10^{-12}$ F/m, and $\in_r$ represents relative permittivity as to the permittivity $\in_0$ in a vacuum.

As can be seen from Expression (1), the greater the radius r is, the greater the capacitance C is. Now, with conductors having complex shapes instead of a spherical shape, the capacitance C cannot be expressed in a simple from as with the above Expression (1), still, it can be clearly understood that the capacitance C changes according to the surface area of the conductor.

As described above, the transmission reference electrode 112 forms a capacitance as to the space around the transmission device 110, and the reception reference electrode 122 forms a capacitance as to the space around the reception device 120. That is to say, when viewed from an external virtual infinite distance from the transmission device 110 and the reception device 120, the potential of the transmission reference electrode 112 and the reception reference electrode 121 becomes less readily changeable as the capacitance increases.

Next, the principle of the communication with the communication system 100 will be described. Note that in the following description, a capacitor may be referred to simply as capacitance for the sake of facilitating description, or due to the order in which description is made, but these should be understood to be equivalent.

Also, the following description is made with the understanding that the transmission device 110 and the reception device 120 in FIG. 1 are disposed with sufficient distance maintained between the two devices, and that mutual effects are negligible. Also, let us say that at the transmission device 110, the transmission signal electrode 111 forms electrostatic coupling only with the communication medium 130, with sufficient distance between the transmission reference electrode 112 and the transmission signal electrode 111, so that mutual effect is negligible (e.g., there is no electrostatic coupling). Further, let us say that at the reception device 120, the reception signal electrode 121 forms electrostatic coupling only with the communication medium 130, with sufficient distance between the reception reference electrode 122 and the reception signal electrode 121, so that mutual effect is negligible (e.g., there is no electrostatic coupling). Of course, the very fact that that the transmission signal electrode 111, reception signal electrode 121, and the communication medium 130 are disposed in a space means that each has capacitance as to the space in reality, but these will be considered negligible for the sake of facilitating description.

Figure 2:
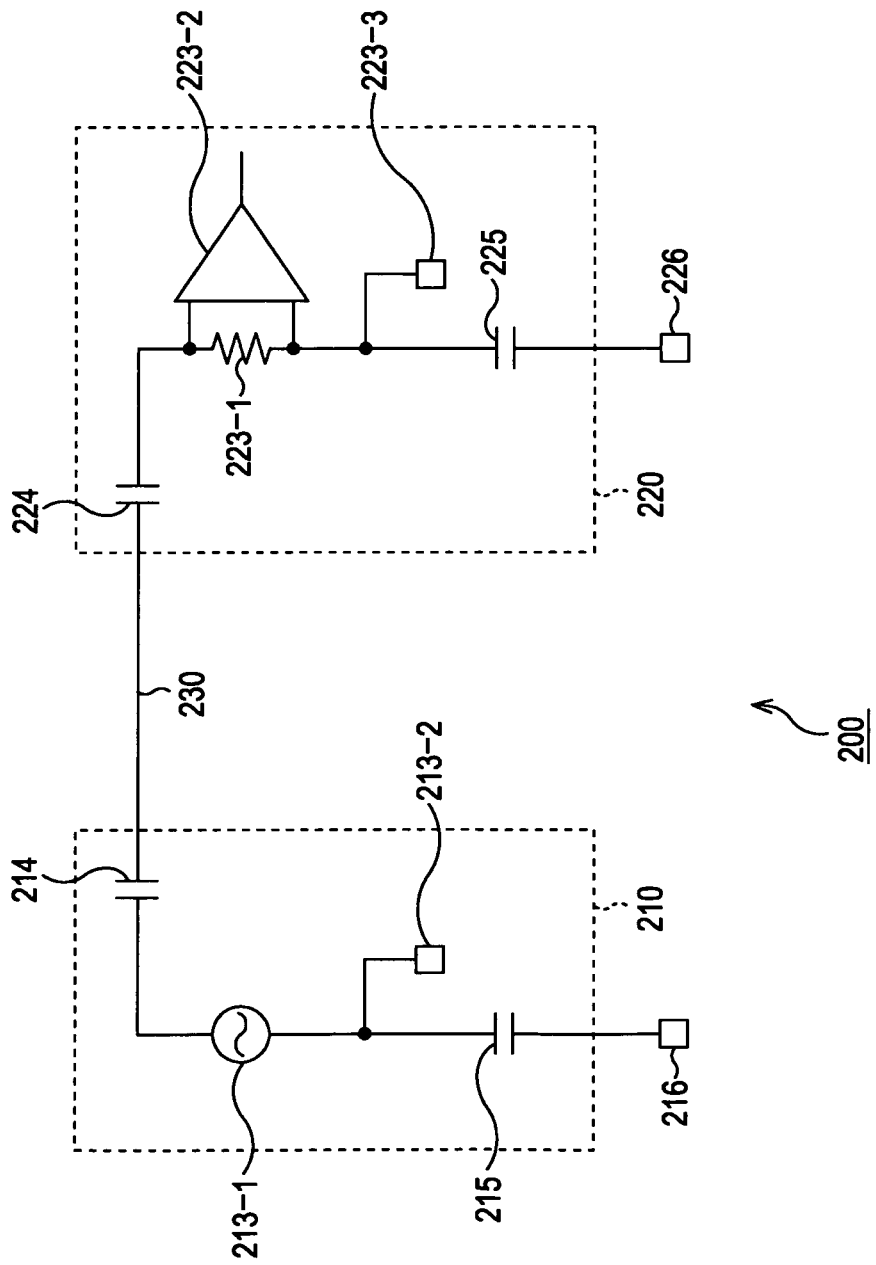
FIG. 2 is a diagram illustrating an equivalent circuit of the communication system shown in FIG. 1 in an ideal state.

FIG. 2 is a diagram illustrating the communication system 100 shown in FIG. 1 with an equivalent circuit. The communication system 200 is the communication system 100 represented with an equivalent circuit, and is substantially equivalent to the communication system 100.

That is to say, while the communication system 200 has a transmission device 210, reception device 220, and connection line 230, the transmission device 210 corresponds to the transmission device 110 of the communication system 100 shown in FIG. 1, the reception device 220 corresponds to the reception device 120 of the communication system 100 shown in FIG. 1, and the connection line 230 corresponds to the communication medium 130 of the communication system 100 shown in FIG. 1.

At the transmission device 210 shown in FIG. 2, the signal source 213-1 and the in-transmission-device reference point 213-2 correspond to the transmission unit 113 shown in FIG. 1. The signal source 213-1 generates sine waves of a specific cycle $\omega$xt rad as transmission signals, wherein t (seconds) represents time, and $\omega$ rad/s represents angular frequency which can be represented as in Expression (3)

$$\omega = 2\pi f \ [rad/s] \quad (3)$$

wherein $\pi$ represents the circle ratio and f Hz represents the frequency of signals generated by the signal source 2131. The in-transmission-device reference point 213-2 the point where the circuit within the transmission device 210 is grounded. That is to say, one terminal of the signal source 213-1 is set to a predetermined reference potential of the circuit within the transmission device 210.

Cte 214 denotes a capacitor, representing the capacitance between the transmission signal electrode 111 and the communication medium 130. That is to say, Cte 214 is provided between the end of the signal source 213-1 at the opposite side from the in-transmission-device reference point 213-2, and the connection line 230. Also, Ctg 215 denotes a capacitor, representing the capacitance of the transmission reference electrode 112 shown in FIG. 1 as to space. Ctg 215 is provided between the end of the signal source 213-1 at the side of the in-transmission-device reference point 213-2 and a reference point 216 representing a spatial point of infinity (virtual point) based on the transmission device 210.

In the reception device 220 shown in FIG. 2, a Rr 223-1, detector 223-2, and in-reception-device reference point 223-3 correspond to the reception unit 123 shown in FIG. 1. The Rr 223-1 is a load resistor (reception resistor) for extracting reception signals. The detector 223-2, which is configured of an amplifier, detects and amplifies potential difference between the terminals at both ends of the Rr 223-1. The in-reception-device reference point 223-3 is a point at which the circuit within the reception device 220 is grounded. That is to say, one terminal of the Rr 223-1 (one input terminal of the detector 223-2) is set to a predetermined reference potential of the circuit within the reception device 220.

The detector 223-2 may be provided with other functions as well, such as demodulating the detected modulation signals, decoding encoded information contained in the detected signals, and so forth, for example.

Cre 224 denotes a capacitor, representing the capacitance between the reception signal electrode 121 and the communication medium 130 shown in FIG. 1. That is to say, the Cre 224 is provided between the terminal of the Rr 223-1 opposite to the in-reception-device reference point 223-3 and the connection line 230. Also, Crg 225 is a capacitor, representing the capacitance of the reception reference electrode 112 as to the space. The Crg 225 is provided between the terminal of the Rr 223-1 at the side of the in-reception-device reference point 223-3 and a reference point 226 representing a spatial point of infinity (virtual point) based on the reception device 226.

The connection line 230 represents the communication medium 130, which is a perfect conductor. Note that in the communication system 200 shown in FIG. 2, the Ctg 215 and Crg 225 are represented as being electrically connected via the reference point 216 and the reference point 226, as an equivalent circuit, but these actually do not need to be electrically connected; formation of capacitance in the space around the transmission device 210 or reception device 220 is sufficient. What is important is that, in the presence of a conductor, capacitance proportionate to the surface area thereof is always formed as to the surrounding space. Also note that the reference point 216 and the reference point 226 do not need to be electrically connected, and may be mutually independent.

Also, in the event that the communication medium 130 shown in FIG. 1 is a perfect conductor, the conductivity of the connecting line 230 can be considered to be infinite, so there is no effect of the connection line 230 shown in FIG. 2 on communications. Note further that in the event that the communication medium 130 is a conductor with sufficient conductivity, the distance between the transmission device and the reception device does not affect the stability of communication. Accordingly, in such a case, the distance between the transmission device 210 and the reception device 220 can never be too long.

In the communication system 200, the signal source 213-1, Rr 223-1, Cte 214, Ctg 215, Cre 224, and Crg 225 form a circuit. The combined capacity Cx of the four serially-connected capacitors (Cte 214, Ctg 215, Cre 224, and Crg 225) can be expressed as in the following Expression (4).

$$C_x = \frac{1}{\frac{1}{Cte} + \frac{1}{Ctg} + \frac{1}{Cre} + \frac{1}{Ctg}} \ [F] \tag{4}$$

Also, the sine wave vt (t) which the signal source 213-1 generates is represented as shown in Expression 5.

$$V_t(t) = V_m \times \sin(\omega t + \theta) \ [V] \tag{5}$$

Now, Vm, of which the unit is V, represents the peak voltage of the signal source voltage, and θ, of which the increment is increment is rad, represents the initial phase angle. Now, the actual value Vtrms of the voltage from the signal source 213-1 can be obtained from the following Expression (6).

$$V_{trms} = \frac{V_m}{\sqrt{2}} \ [V] \tag{6}$$

The combined impedance Z of the entire circuit can be obtained from the following Expression (7).

$$Z = \sqrt{Rr^2 + \frac{1}{(\omega C_x)^2}} \tag{7}$$

$$= \sqrt{Rr^2 + \frac{1}{(2\pi f C_x)^2}} \ [\Omega]$$

That is to say, the actual value Vrrms of the voltage generated at both ends of the Rr 223-1 an be obtained from the following Expression (8).

$$V_{rrms} = \frac{Rr}{Z} \times V_{trms} \tag{8}$$

$$= \frac{Rr}{\sqrt{Rr^2 + \frac{1}{(2\pi f C_x)^2}}} \times V_{trms} \ [V]$$

Accordingly, as can be seen from Expression (8), the greater the resistance value of the Rr 223-1 is, and the greater the capacitance Cx is and the higher the frequency f, of which the unit is Hz, of the signal source 213-1 is, the smaller the item $1/((2 \times \pi \times f \times Cx)2)$ is, and greater signals can be generated at both ends of Rr 223-1.

For example, the Table 250 shown in FIG. 3 illustrates the calculation results of the actual values Vrrms of the voltage generated at both ends of Rr 223-1, with the actual value Vtrms of the voltage of the signal source 213-1 of the transmission device 210 fixed to 2 V, for signals generated by the signal source 213-1 at frequencies f of 1 MHz, 10 MHz, and 100 MHz, resistance values of Rr 223-1 of 10 KΩ, 100 KΩ, and 1 MΩ, and total circuit capacitance Cx of 0.1 pF, 1 pF, and 10 pF.

As can be seen from the Table 250, the calculation results of the actual value Vrrms of the voltage are such that, in the event that other conditions are the same, the actual value Vrrms is greater for frequency f of 10 MHz than 1 MHz, greater for 10 KΩ for the resistance value of the Rr 223-1 which is the reception load than 1 MΩ, and greater for 10 pF in capacitance Cx than 0.1 pF. That is to say, the greater the frequency f value, Rr 223-1 resistance value, and capacitance Cx value are, the greater the actual value Vrrms of the voltage is.

Also, it can be understood from Table 250 that electric signals are generated at the Rr 223-1 even with capacitance less than 1 picofarad. That is to say, even in the event that the signal level of the signal being transferred is minute, communication can be enabled by amplifying the detected signal using the detector 223-2 of the reception device 220.

Figure 4:
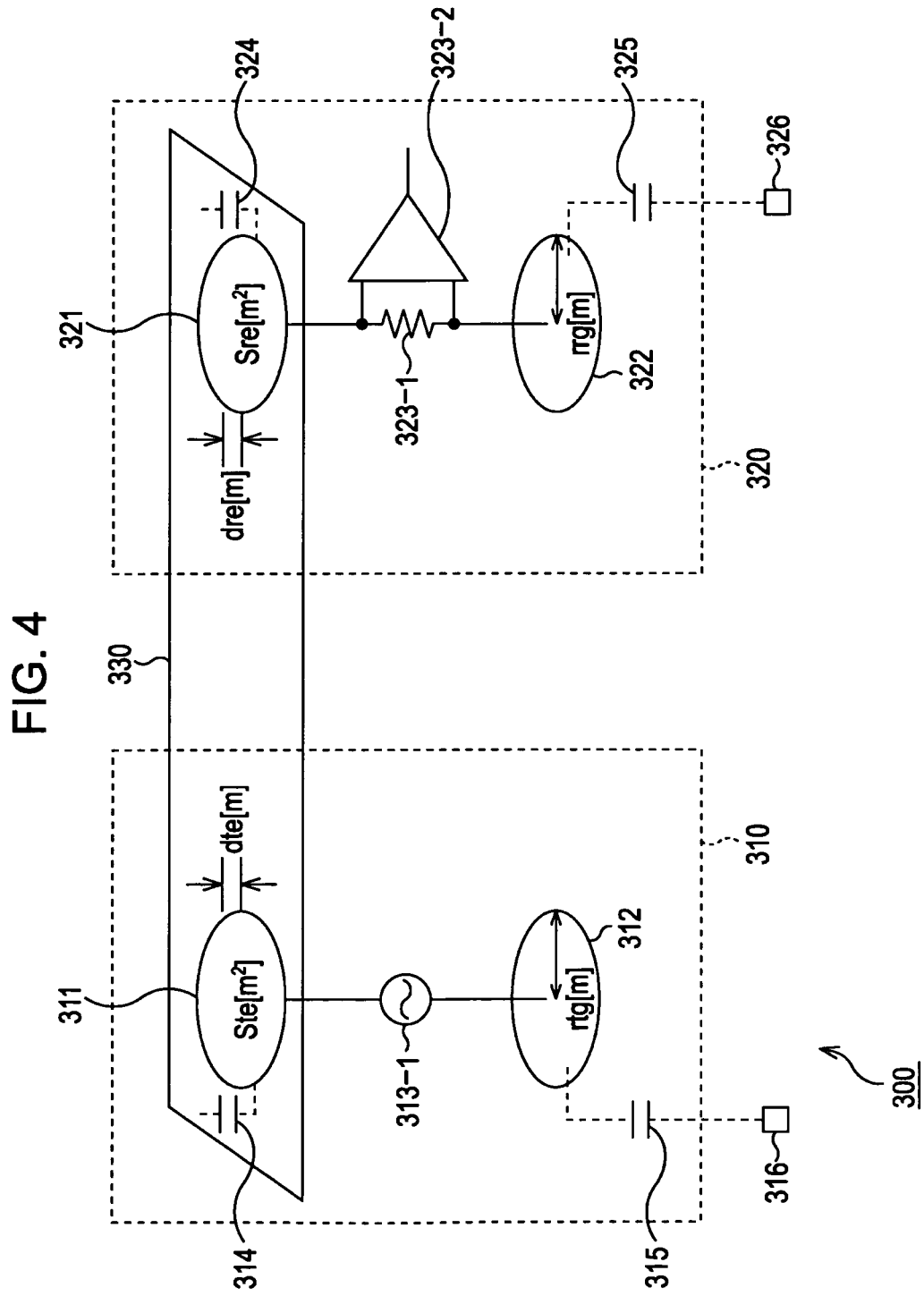
FIG. 4 is a diagram illustrating an example of a physical model of the physical configuration of the communication system shown in FIG. 1.

Next, a calculation example of the parameters for the communication system 200 according to the equivalent circuit described above will be described in detail with reference to FIG. 4. FIG. 4 is a diagram for describing computation examples, including effects of the physical configuration of the communication system 100.

The communication system 300 shown in FIG. 4 is a system corresponding to the communication system 100 shown in FIG. 1, wherein information relating to the physical configuration of the communication system 100 have been added to the communication system 200 shown in FIG. 2. That is to say, the communication system 300 has a transmission device 310, reception device 320, and a communication medium 330. Making description in comparison with the communication system 100 shown in FIG. 1, the transmission device 310 corresponds to the transmission device 110, the reception device 320 corresponds to the reception device 120, and the communication medium 330 corresponds to the communication medium 130.

The transmission device 310 has a transmission signal electrode 311 corresponding to the transmission signal electrode 111, a transmission reference electrode 312 corresponding to the transmission reference electrode 112, and a signal source 313-1 corresponding to the transmission unit 113. That is to say, the transmission signal electrode 311 is connected to one of the terminals at both ends of the signal source 313-1, and the transmission reference electrode 312 is connected to the other. The transmission signal electrode 311 is provided so as to be in close proximity with the communication medium 330. The transmission reference electrode 312 is provided removed from the communication medium 330 to a degree so as to not be affected by the communication medium 330, and is configured so as to have capacitance as to the external space of the transmission device 310. Note that while the transmission unit 113 has been described in FIG. 2 such that the signal source 213-1 and the in-transmission-device reference point 213-2 correspond, but this in-transmission-device reference point has been omitted from FIG. 4 for the sake of facilitating description.

As with the case of the transmission device 310, the reception device 320 also has a reception signal electrode 321 corresponding to the reception signal electrode 121, a reception reference electrode 322 corresponding to the reception reference electrode 122, and Rr 323-1 and detector 323-2 corresponding to the reception unit 123. That is to say, the reception signal electrode 321 is connected to one of the terminals at both ends of the Rr 323-1, and the reception reference electrode 322 is connected to the other. The reception signal electrode 321 is provided so as to be in close proximity with the communication medium 330. The reception reference electrode 322 is provided removed from the communication medium 330 to a degree so as to not be affected by the communication medium 330, and is configured so as to have capacitance as to the external space of the reception device 320. Note that while the reception unit 123 has been described in FIG. 2 such that the Rr 223-1, detector 223-2, and in-reception-device reference point 223-2 correspond, but this in-reception-device reference point has been omitted from FIG. 4 for the sake of facilitating description.

Note that the communication medium 330 is assumed to be a perfect conductor, as with the cases of FIGS. 1 and 2. The transmission device 310 and reception device 320 are positioned with a sufficient distance therebetween, and accordingly mutual effects can be considered negligible. Also, the transmission signal electrode 311 has electrostatic coupling only with the communication medium 330. Also, the transmission reference electrode 312 is distanced from the transmission signal electrode 311 by a sufficient distance, so mutual effects can be considered to be negligible. In the same way, the reception signal electrode 321 has electrostatic coupling only with the communication medium 330. Further, the reception reference electrode 322 is distanced from the reception signal electrode 321 by a sufficient distance, so mutual effects can be considered to be negligible. To be more exact, the transmission signal electrode 311, reception signal electrode 321, and communication medium 330 do have capacitance with regard to space, but these will be considered to be negligible here to facilitate description.

As shown in FIG. 4, with the communication system 300, the transmission device 310 is disposed at one end of the communication medium 330, and the reception device 320 is placed at the other end.

Let us say that there is a space of the distance dte m between the transmission signal electrode 311 and the communication medium 330. Also, if we say that the transmission signal electrode 311 is a disc-shaped conductor of which the surface area on one side is Ste $m^2$, the capacitance Cte 314 formed between the transmission signal electrode 311 and the communication medium 330 can be obtained as with the following Expression (9).

$$Cte = \varepsilon \times \frac{Ste}{dte} \quad [F] \tag{9}$$

Expression (9) is a computation expression generally known as parallel plate capacitance calculation. In the above Expression, $\in$ represents permittivity, and since the communication system 300 is disposed in the air, the relative permittivity $\in r$ can be considered to be approximately 1, so the permittivity $\in$ can be considered to be equivalent to permittivity $\in 0$ in a vacuum. Calculating the capacitance Cte 314 with the surface area Ste of the transmission signal electrode 311 as $2\times10^{-3}$ $m^2$ (diameter of approximately 5 cm) and the spacing thereof as $5\times10^{-3}$ m (5 mm) yields the following Expression (10).

$$Cte = (8.854 \times 10^{-12}) \times \frac{2 \times 10^{-3}}{5 \times 10^{-3}} \tag{10}$$
$$\approx 3.5 \ [pF]$$

Now, it should be noted that strictly speaking, the above Expression (9) holds as an actual physical phenomenon in the event that the relation of Ste>>dte, but here, we will say that this is can be approximated with Expression (9).

Next, description will be made regarding the capacitance Ctg formed of the transmission reference electrode 312 and space, i.e., the capacitance between the transmission reference electrode 312 and a reference point 316 representing a virtual point of infinity from the transmission reference electrode 312. Generally, in the event that a disc with a radius of r m is placed in space, the capacitance C in farads formed between the disc and the space can be obtained from the following Expression (11).

$$C = 8 \in r \ [F] \tag{11}$$

If we say that the transmission reference electrode 312 is a conductor disc of a radius of rtg=$2.5\times10^{-2}$ m (radius of 2.5 cm), the capacitance Ctg 315 formed of the transmission reference electrode 317 and the space can be obtained as shown in the following Expression (12), using the above-described Expression (11). Note that the communication system 300 is disposed in air, and that the permittivity of the space can be approximated by the permittivity ∈0 in a vacuum.

$$Ctg = 8 \times 8.854 \times 10^{-12} \times 2.5 \times 10^{-2} \qquad (12)$$
$$\approx 1.8 \ [pF]$$

If the size of the reception signal electrode 321 is the same as that of the transmission signal electrode 311 (i.e., conductor disc wherein Sre m²=Ste m²), and the distance as to the communication medium 330 is also the same (dre m=dte m), the capacitance Cre 324 formed of the reception signal electrode 321 and the communication medium 330 is 3.5 pF, the same as at the transmission side. Also, in the event that the size of the reception reference electrode 322 is the same size as the transmission reference electrode 312 (conductor disc with radius of rrg m=rtg m), the capacitance Crg 325 formed of the reception reference electrode 322 and space, i.e., the capacitance between the reception reference electrode 322 and a reference point 326 representing a virtual point of infinity from the reception reference electrode 322, is 1.8 pF, the same as at the transmission side. From the above, the combined capacitance Cx of the four capacitances Cte 314, Ctg 315, Cre 324, and Crg 325, can be obtained from the following Expression (13), applying the above-described Expression (4).

$$C_x = \cfrac{1}{\cfrac{1}{Cte} + \cfrac{1}{Ctg} + \cfrac{1}{Cre} + \cfrac{1}{Ctg}} \qquad (13)$$
$$= \cfrac{1}{\cfrac{1}{3.5 \times 10^{-12}} + \cfrac{1}{1.8 \times 10^{-12}} + \cfrac{1}{3.5 \times 10^{-12}} + \cfrac{1}{1.8 \times 10^{-12}}}$$
$$\approx 0.6 \ [pF]$$

With the frequency f of the signal source 313-1 as 1 MHz, the actual value Vtrms of voltage as 2 V, and the Rr 323-1 as 100 KΩ, the voltage Vrrms generated at both ends of the Rr 323-1 can be obtained by the following Expression (14).

$$V_{rrms} = \cfrac{Rr}{\sqrt{Rr^2 + \cfrac{1}{(2\pi f C_x)^2}}} \times V_{trms} \qquad (14)$$
$$= \cfrac{1 \times 10^5}{\sqrt{(1 \times 10^5)^2 + \cfrac{1}{(2 \times \pi \times (1 \times 10^6) \times (0.6 \times 10^{-12}))^2}}} \times 2$$
$$\approx 0.71 \ [V]$$

Based on the above results, as a basic principle, signals can be handed from the transmission device to the reception device by using the capacitance generated with the space.

The capacitance of the transmission reference electrode and reception reference electrode as to space as described above can be formed as long as there is space at the position of each electrode. Accordingly, the transmission device and reception device described above can yield stable communication without dependence on distance therebetween, as long as the transmission signal electrode and reception signal electrode are coupled by the communication medium.

Figure 5:
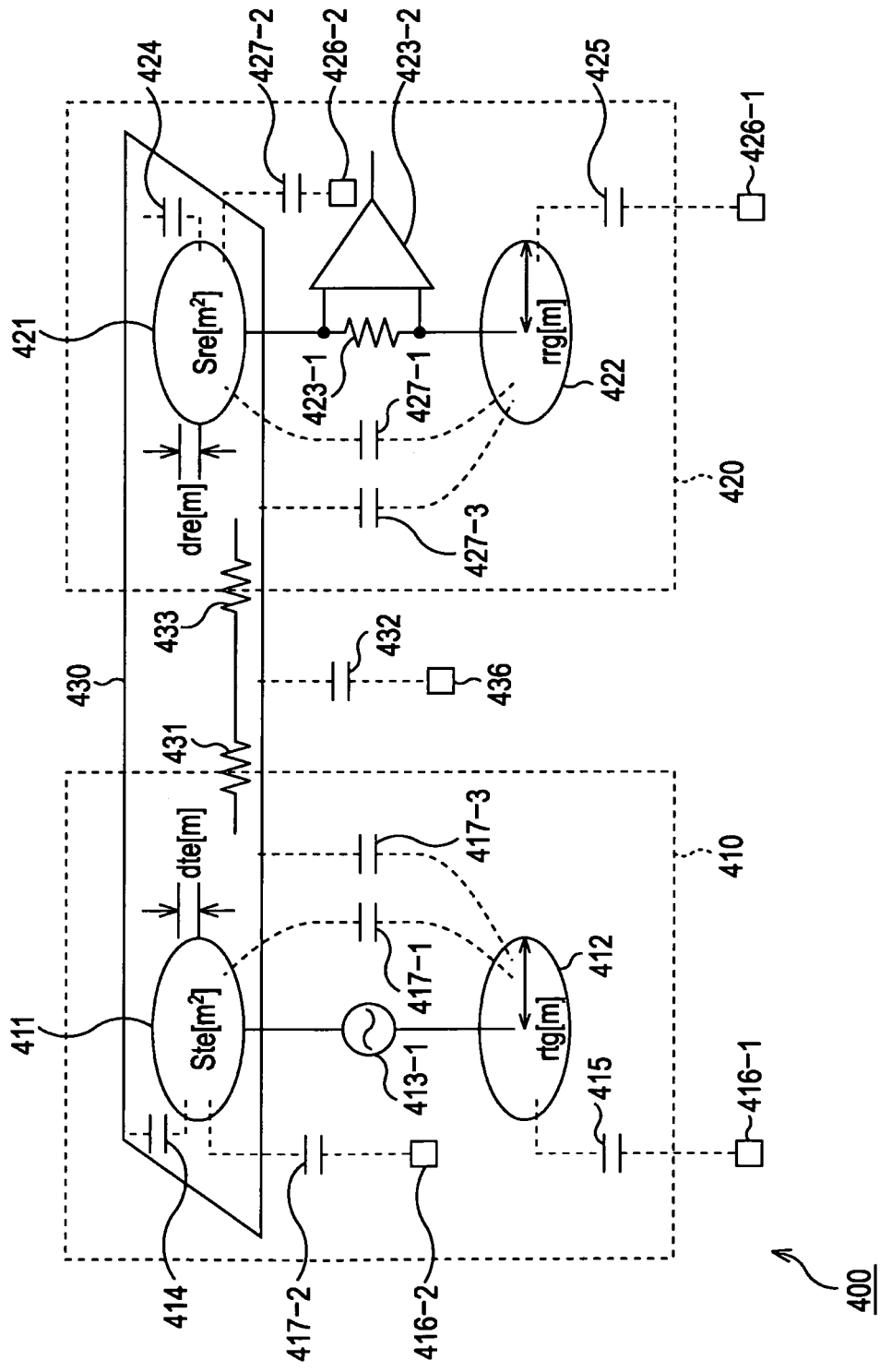
FIG. 5 is a diagram illustrating an example of a model of parameters occurring in the model shown in FIG. 4.

Next, description will be made regarding an actual physical configuration of the present communication system. FIG. 5 is a diagram illustrating an example of a computation model for the parameters generated in the system in the event of making an actual physical configuration of the communication system described above.

That is to say, the communication system 400 has a transmission device 410, reception device 420, and communication medium 430, and is a system corresponding to the above-described communication system 100 (and accordingly communication systems 200 and 300). Only the parameters to be evaluated are different and the configuration is basically the same as that of the communication systems 100 through 300.

That is to say, in comparison with the communication system 300, the transmission device 410 corresponds to the transmission device 310, the transmission signal electrode 411 of the transmission device 410 corresponds to the transmission signal electrode 311, the transmission reference electrode 412 corresponds to the transmission reference electrode 312, and the signal source 431-1 corresponds to the signal source 331-1. Also, the reception device 420 corresponds to the reception device 320, reception signal electrode 421 of the reception device 420 corresponds to the reception signal electrode 321, the reception reference electrode 422 corresponds to the reception reference electrode 322, Rr 423-1 corresponds to Rr 323-1, and the detector 423-2 corresponds to the detector 323-2. Further, the communication medium 43.0 corresponds to the communication medium 330.

Also, making description with regard to the parameters, the capacitance Cte 414 between the transmission signal electrode 411 and the communication medium 430 corresponds to the Cte 314 in the communication system 300, the capacitance Ctg 415 of the transmission reference electrode 412 as to the space corresponds to the Ctg 315 in the communication system 300, and the reference point 416-1 and reference point 416-2 representing virtual points of infinity in space from the transmission device 410 correspond to the reference point 316 in the communication system 300. Also, the transmission signal electrode 411 is a disc-shaped electrode having an area of Ste m², and is provided at a position removed from the communication medium 430 by a minute distance dte m. The transmission reference electrode 412 also is a disc-shaped electrode, and the radius thereof is rtg m.

At the reception device 420 side, the capacitance Cre 424 between the reception signal electrode 421 and the communication medium 430 corresponds to the Cre 324 in the communication system 300, the capacitance Crg 425 of the reception reference electrode 422 as to the space corresponds to the Crg 325 in the communication system 300, and the reference point 426-1 and reference point 426-2 representing virtual points of infinity in space from the reception device 420 correspond to the reference point 326 in the communication system 300. Also, the reception signal electrode 421 is a disc-shaped electrode having an area of Sre m², and is provided at a position removed from the communication medium 430 by a minute distance dre m. The reception reference electrode 422 also is a disc-shaped electrode, and the radius thereof is rrg m.

The communication system 400 shown in FIG. 5 is a model wherein the following new parameters have been added in addition to the above parameters.

For example, with regard to the transmission device 410, capacitance Ctb 417-1 formed between the transmission signal electrode 411 and the transmission reference electrode 412, capacitance Cth 417-2 formed between the transmission signal electrode 411 and space, and capacitance Cti 417-3 formed between the transmission reference electrode 412 and the communication medium 430, are added as new parameters.

Further, with regard to the reception device 420, capacitance Crb 427-1 formed between the reception signal electrode 421 and the reception reference electrode 422, capacitance Crh 427-2 formed between the reception signal electrode 421 and space, and capacitance Cri 427-3 formed between the reception reference electrode 422 and the communication medium 430, are added as new parameters.

Further, with regard to the communication medium 430, capacitance Cm 432 formed between the communication medium 430 and space, i.e., the capacitance between the communication medium 430 and a reference point 436 representing a virtual point of infinity from the communication medium 430, is added as a new parameter. Moreover, the communication 430 has electrical resistance in reality, depending on the size, material, and so forth thereof, so resistance values Rm 431 and Rm 433 are added as new parameters representing the resistance components thereof.

Also, while omitted from the communication system 400 shown in FIG. 5, in the event that the communication medium is dielectric in addition to being conductive, capacitance according to the permittivity thereof is also formed. Also, in the event that there is no conductivity to the communication medium and the communication medium is only dielectric, coupling between the transmission signal electrode 411 and the reception signal electrode 421 occurs at a capacitance determined by the permittivity, distance, size, and placement, of the dielectric material.

Also, the situation assumed here is an arrangement wherein the transmission device 410 and the reception device 420 are distanced one form another to where the mutual electrostatic coupling component is negligible (i.e., a case wherein the effects of electrostatic coupling between the transmission device 410 and the reception device 420 can be ignored). In the event that the distance is close, there may be need to take into consideration the capacitance between the electrodes within the transmission device 410 and the electrodes within the reception device 420, depending on the positional relation thereof, in light of the above-described concept.

Figure 6:
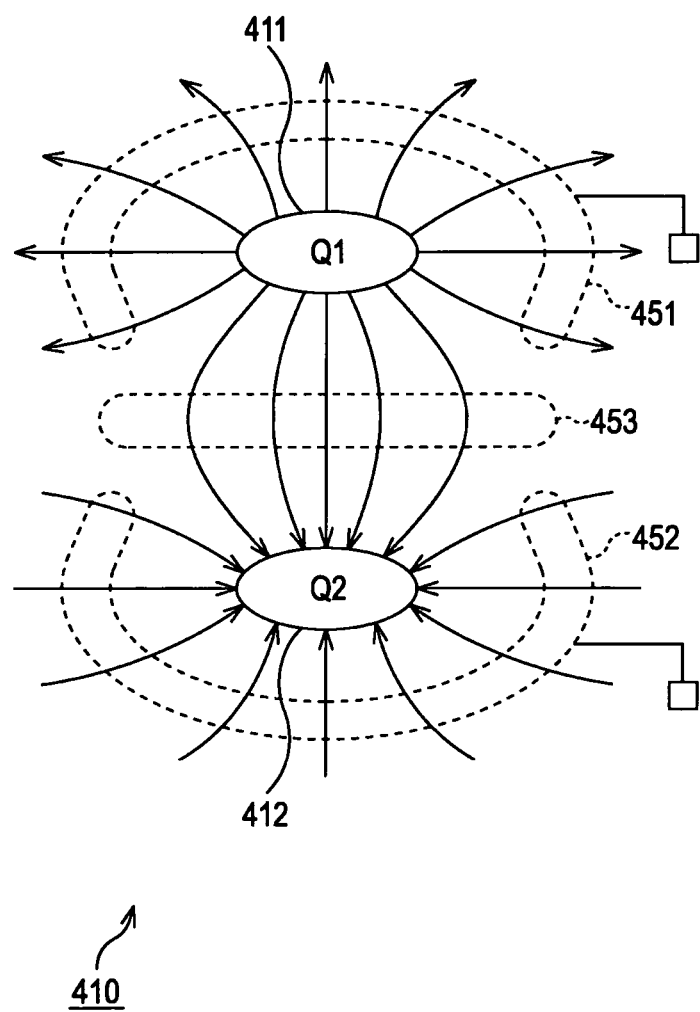
FIG. 6 is a schematic diagram illustrating an example of the distribution of electric flux lines as to electrodes.
Figure 7:
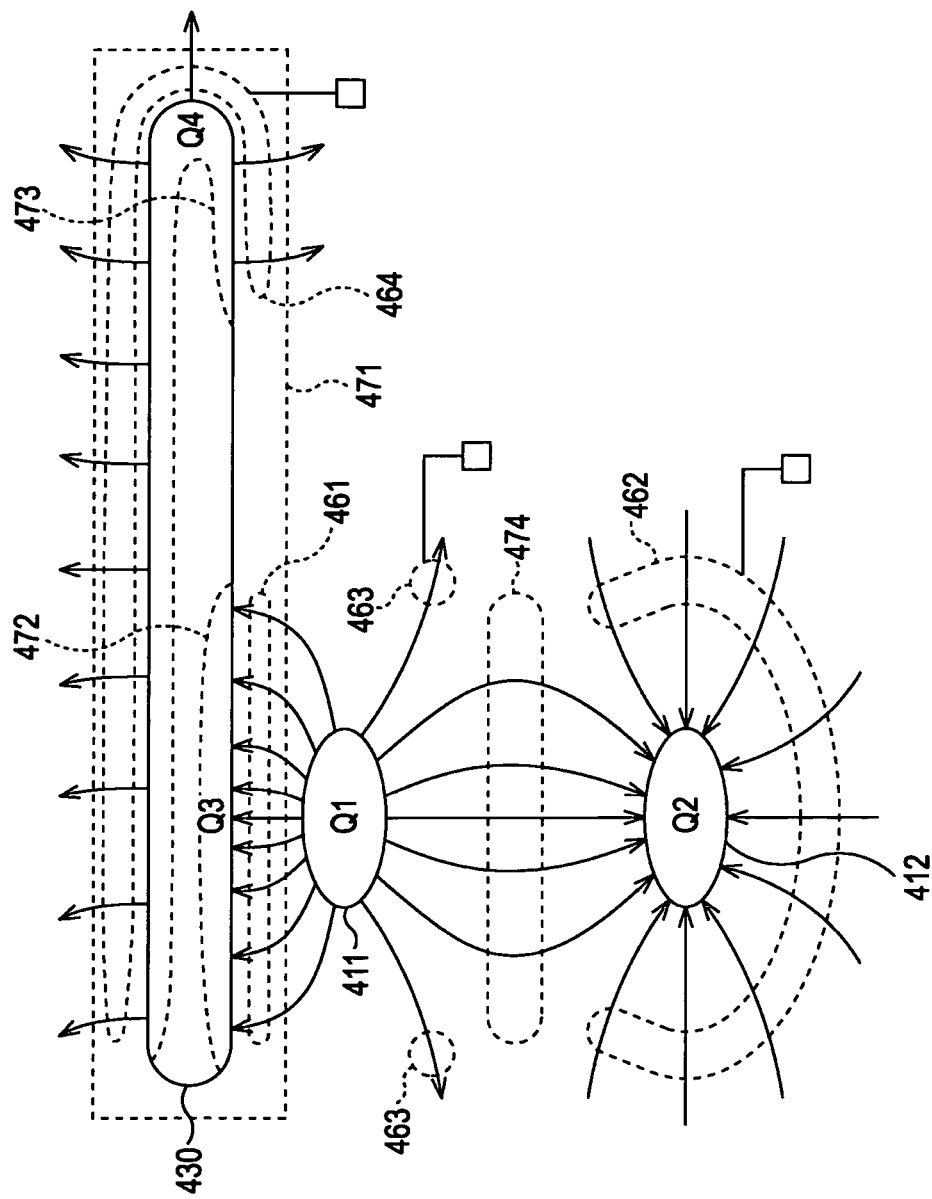
FIG. 7 is a schematic diagram illustrating another example of the distribution of electric flux lines as to electrodes.

The operations of the communication system 400 shown in FIG. 5 will be described by way of electric flux lines. FIGS. 6 and 7 are schematic diagrams representing the relation between the electrodes of the transmission device 410 of the communication system one with another, or between the electrodes and the communication medium 430, using electric flux lines.

FIG. 6 is a schematic diagram illustrating an example of distribution of electric flux lines regarding the transmission device 410 of the communication system 400, in the event that a communication medium 430 is not present. Now, let us say that the transmission signal electrode 411 has a positive charge (i.e., is charged positively), and that the transmission reference electrode 412 has a negative charge (i.e., is charged negatively). The arrows in the drawing represent electric flux lines, and the directions thereof are from the positive charge toward negative charge. Electric flux lines have a nature of never disappearing partway; they either reach an object having a charge of the opposite sign, or reach a virtual point of infinity.

Now, the electric flux lines 451 represent the electric flux lines which have been discharged from the transmission signal electrode 411 and which reach the point of infinity. The electric flux lines 452 represent, of the electric flux lines heading toward the transmission reference electrode 412, those which are arriving from a virtual point of infinity. The electric flux lines 453 represent the electric flux lines generated between the transmission signal electrode 411 and the transmission reference electrode 412. The distribution of the electric flux lines is affected by the size of the electrodes and the positional relation thereof.

FIG. 7 us a schematic diagram illustrating an example of the distribution of electric flux lines in the event that such a transmission device 410 is brought close to the communication medium 430. The communication medium 430 has become close to the transmission signal electrode 411, is coupling between the two intensifies, such that a great deal of the electric flux lines 451 which had been reaching the point of infinity in FIG. 6 become electric flux lines 461 which reach the communication medium 430, and there is reduction of the electric flux lines 463 heading toward the point of infinity (the electric flux lines 451 in FIG. 6). In accordance with this, the capacitance as to the point of infinity as viewed from the transmission signal electrode 411 (Cth 417-2 in FIG. 5) weakens, and the capacitance as to the communication medium 430 (Cte 414 in FIG. 5) increases. Note that in reality, there is also electrostatic coupling between the transmission reference electrode 412 and the communication medium 430 (Cti 417-3 in FIG. 5), but this will be considered to be negligible here.

According to Gauss' law, the number N of electric flux lines passing through and out an arbitrary closed surface S is equal to the total charge included in the closed surface S by the permittivity $\in$, and is not affected by charges outside of the closed surface S. If we way that there are n charges at the closed surface S, the following Expression holds.

$$N = \frac{1}{\varepsilon}\sum_{i=1}^{n} q_i \text{ [Lines]} \tag{15}$$

Wherein i is an integer, and the variables qi represent the charge content of each charge. This law shows that the electric flux lines flowing out from the closed surface S are determined only by the charges existing within the closed surface S, and that all electric flux lines entering externally are being emitted from somewhere else.

If we way that the communication medium 430 is not grounded in FIG. 7, according to this law there is no charge source in the closed surface 471 near the communication medium 430, so a charge Q3 is inducted by electrostatic induction at the region 472 of the communication medium near the electric flux lines 461. The communication medium 430 is not grounded so the total charge content of the communication medium 430 does not charge, and accordingly, a charge Q4 having the same quantity but opposite sign from the charge Q3 is inducted at the region 473 outside of the region 472 where the charge Q3 has been inducted, and electric flux lines 464 generated thereby are emitted from the closed surface 471. The greater the communication medium is, the greater the dispersion of the charge Q4 is, and charge density also deteriorates, so the number of electric flux lines per unit area also drops.

In the event that the communication medium 430 is a complete conductor, due to the property that the potential is the same regardless of the part thereof owing to the nature of perfect conductors, there is the nature that the charge density is also approximately equal regardless of the part thereof. In the event that the communication medium 430 is a conductor having a resistance component, the number of electric flux lines decreases according to distance in accordance with the resistance thereof. Also, in the event that the communication medium 430 is a dielectric material not having conductivity, the electric flux lines are dispersed and propagated due to polarization action thereof. If we way that there are n conductors in space, the charges Qi of each of the conductors can be calculated by the following Expression.

$$Q_i = \sum_{j=1}^{n} (C_{ij} \times V_j) \; [C] \quad (16)$$

Wherein i and j are integers, and Cij represents a capacity coefficient formed of conductor i and conductor j, which can be considered to be the same nature as capacitance. A capacity coefficient is determined only from the shape of the conductors and the positional relationship thereof. The capacity coefficient Cii is a capacitance which the conductor i itself forms as to space. Further, Cij=Cji holds. Expression (16) shows that a system formed of multiple conductors operates based on the law of superposition, indicating that the charge of the conductor is determined by the sum of products of the capacitance between conductors and the potential of each conductor.

Now, let us define the parameters related with each other in FIG. 7 and Expression (16). For example, we will say that Q1 represents the charge inducted at the transmission signal electrode 411, Q2 represents the charge inducted at the transmission reference electrode 412, Q3 represents the charge inducted at the communication medium 430 by the transmission signal electrode 411, and Q4 represents the charge on the communication medium 430 having the same quantity but opposite sign from the charge Q3.

Also, V1 represents the potential at the transmission signal electrode 411 with the point of infinity as the reference, V2 represents the potential at the transmission reference electrode 412 with the point of infinity as the reference, V3 represents the potential at the communication medium 430 with a point of infinity as the reference, C12 represents the capacity coefficient between the transmission signal electrode 411 and transmission reference electrode 412, C13 represents the capacity coefficient between the transmission signal electrode 411 and communication medium 430, C15 represents the capacity coefficient between the transmission signal electrode 411 and space, C25 represents the capacity coefficient between the transmission reference electrode 411 and space, and further, C45 represents the capacity coefficient between the communication medium 430 and space.

Q3 here can be obtained by the following Expression.

$$Q_3 = C13 \times V1 \; [C] \quad (17)$$

Increasing the charge Q3 enables a greater electric field to be input to the communication medium 430, and this can be accomplished by raising the capacity coefficient C13 between the transmission signal electrode 411 and communication medium 430, and also providing a potential V1 of a sufficient level. While the capacity coefficient C13 is determined by shape and positional relation, the closer the mutual distance is and the greater the facing area is, the greater the capacitance is.

Next, regarding the potential V1, sufficient potential must be generated as viewed from the point of infinity. While a potential difference is provided between the transmission signal electrode 411 and the transmission reference electrode 412 by the signal source when viewed form the transmission device 410, the behavior of the transmission reference electrode 412 is crucial in order to generate this potential difference as a sufficient potential difference when viewed from the point of infinity as well.

In the event that the transmission reference electrode 412 is minute and the transmission signal electrode 411 is sufficiently great, the capacity coefficients C12 and C25 are small. On the other hand, the capacity coefficients C13, C15, and C45 have great capacitance, and accordingly do not readily fluctuate electrically, so most of the potential difference generated at the signal source is manifested as the potential V2 of the transmission reference electrode 412, and the potential V1 of the transmission signal electrode 411 becomes small.

Figure 8:
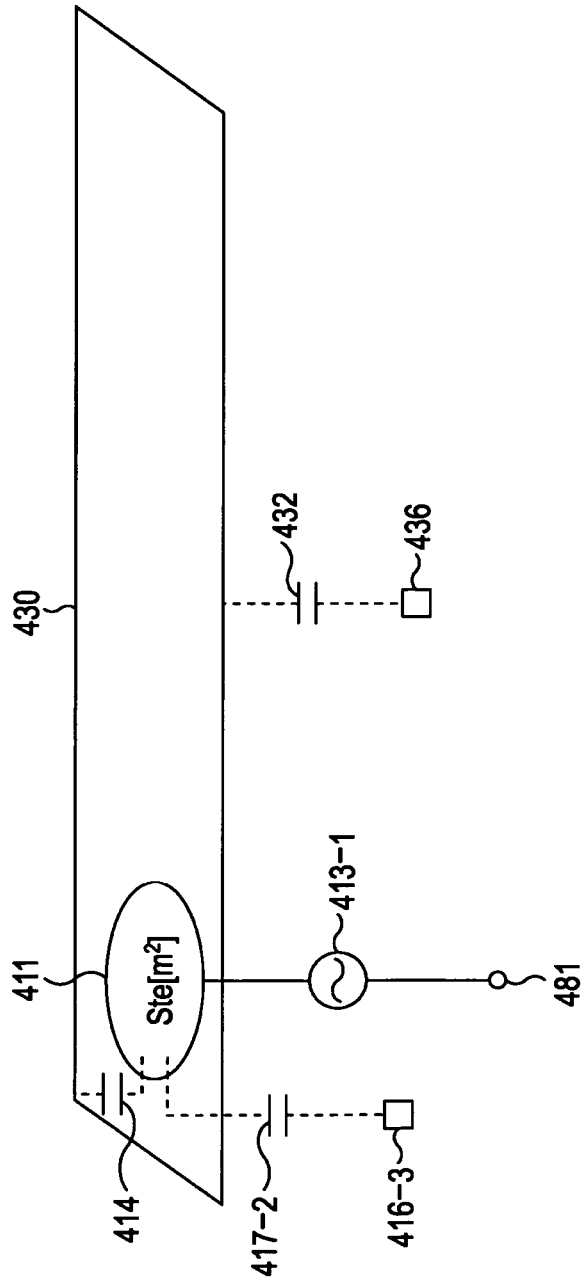
FIG. 8 is a diagram for describing another example of a model of electrodes in a transmission device.

This is shown in FIG. 8. The transmission reference electrode 481 is minute, and accordingly does not couple with any conductor or point of infinity. The transmission signal electrode 411 forms capacitance Cte with the communication medium 430, and forms capacitance Cth 417-2 with the space. The communication medium 430 forms capacitance Cm 432 as to the space. Even in the event that potential is generated between the transmission signal electrode 411 and the transmission reference electrode 412, the capacitances Cte 414, Cth 417-2, and CM 432 are overpoweringly great, and accordingly a great amount of energy is necessary for changing this potential, but the capacitance of the transmission reference electrode facing the signal source 413-1 is weak, so the potential of the transmission signal electrode 411 hardly changes at all, and almost all of the potential change of the signal source 413-1 is manifested at the transmission reference electrode 481 side.

Conversely, in the event that the transmission signal electrode 411 is minute and the transmission reference electrode 481 is sufficiently great, the capacitance of the transmission reference electrode 481 becomes great and electrically not readily changed, so sufficient potential V1 is generated at the transmission signal electrode 411, but electrostatic coupling with the communication medium 430 is weakened, so sufficient electric field cannot be injected.

Accordingly, there is the need to provide a transmission reference electrode whereby sufficient potential can be provided, while injecting an electric field necessary for communication to the communication medium from the transmission signal electrode, in this overall balance. The transmission side has been considered so far, but between the reception device 420 electrodes and the communication medium 430 shown in FIG. 5 can also be considered in the same way.

A point of infinity does not have to be physically a long distance a way, and for practical purposes can be though to be the space around the device, but is preferably something which is most stable with little potential change in the systems of the overall system. Under actual usage environment, there is noise generated from AC power source lines, lighting devices, other electrical equipment, and so forth, but the noise thereof should be at least not overlapping the frequency band used by the signal source, or negligible.

Figure 9:
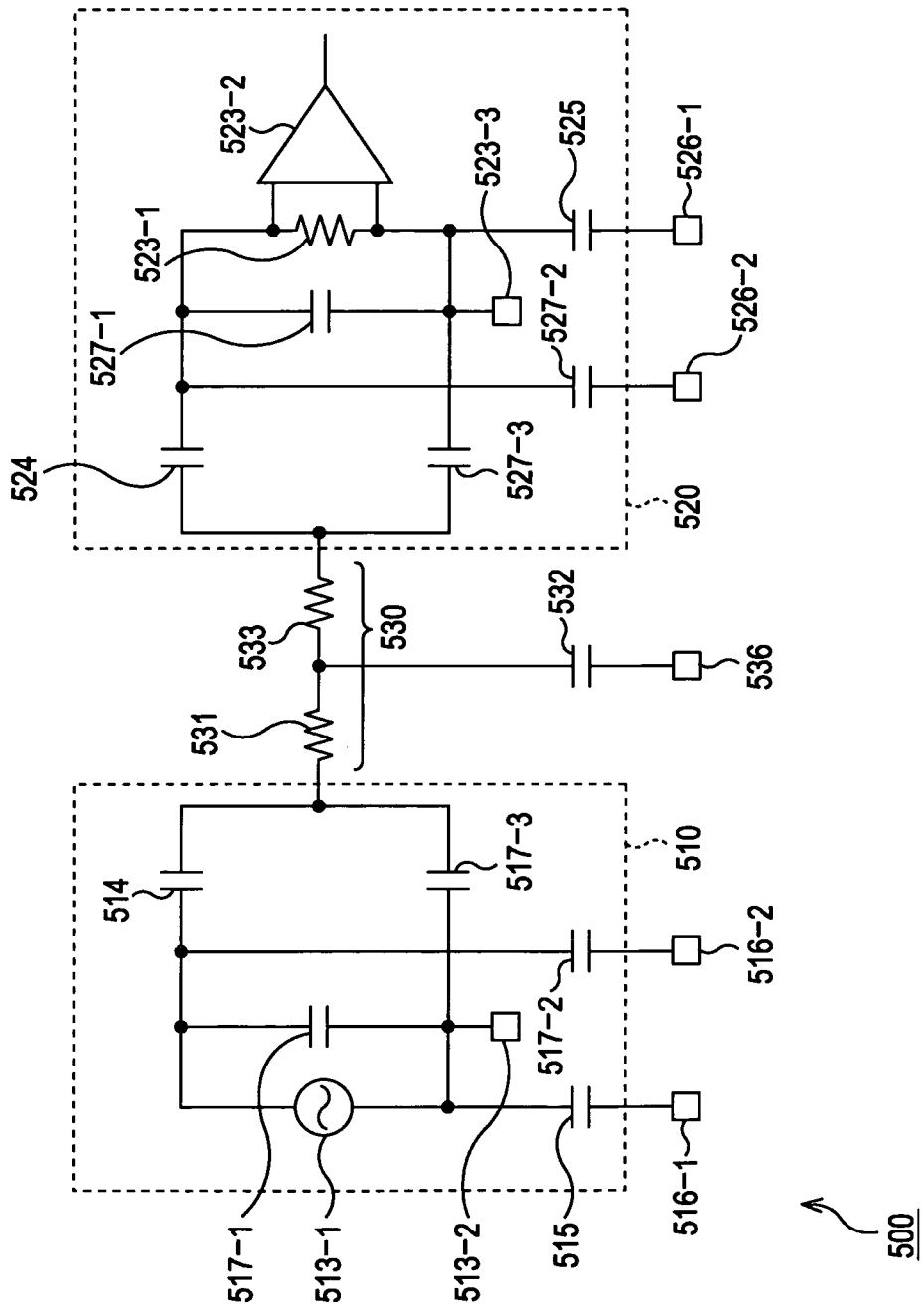
FIG. 9 is a diagram illustrating an example of an equivalent circuit of the model shown in FIG. 5.

FIG. 9 is a diagram illustrating a model (communication system 400) shown in FIG. 5 with an equivalent circuit. That is to say, as with the relation between FIG. 2 and FIG. 4, the communication system 500 shown in FIG. 5 corresponds to the communication system shown in FIG. 5. the transmission device 510 of the communication system 500 corresponds to the transmission device 410 of the communication system 400, the reception device 520 of the communication system 500 corresponds to the reception device 420 of the communication system 400, and the connection line 530 of the communication system 500 corresponds to the communication medium 430 of the communication system 400.

In the same way, in the transmission device 510 shown in FIG. 9, the signal source 513-1 corresponds to the signal source 413-1. Note illustrated in the transmission device 510 in FIG. 9 is the in-transmission-device reference point 513-2 indicating the ground in the internal circuit of the transmission unit 113 shown in FIG. 1, corresponding to the in-transmission-device reference point 213-2 shown in FIG. 2, that has been omitted from FIG. 5.

Also, Cte 514 shown in FIG. 9 is capacitance corresponding to Cte 414 shown in FIG. 5, Ctg 515 is capacitance corresponding to Ctg 415 shown in FIG. 5, and reference point 516-1 and reference point 516-2 each correspond to reference point 416-1 and reference point 416-2. Further, Ctb 517-1 is capacitance corresponding to Ctb 417-1, Cth 517-2 to Cth 417-2, and Cti 517-3 to Cti 417-3, respectively.

The components of the reception device 520 are also the same, with the reception resistor Rr 523-1 and detector 523-2 each corresponding to the Rr 423-1 and detector 423-2 shown in FIG. 5. Note that in the reception device 520 shown in FIG. 9 is illustrated the in-reception-device reference point 523-3 indicating the ground in the internal circuit of the reception unit 123 shown in FIG. 1, corresponding to the in-reception-device reference point 223-2 shown in FIG. 2 that has been omitted from FIG. 5.

Also, Cre 524 shown in FIG. 9 is capacitance corresponding to Cre 424 shown in FIG. 5, Crg 525 is capacitance corresponding to Crg 425 shown in FIG. 5, and reference point 526-1 and reference point 526-2 correspond to reference point 426-1 and reference point 426-2, respectively. Further, Crb 527-1 is capacitance corresponding to Crb 427-1, Crh 527-2 to Crh 427-2, and Cri 527-3 to Cri 427-3, respectively.

The components connected to the connection line 530 are also the same, with the Rm 531 and Rm 533 which are resistance components of the connection line corresponding to Rm 431 and Rm 433, Cm 532 corresponding to Cm 432, and reference point 536 corresponding to reference point 436.

This communication system 500 has the following nature.

For example, at the transmission device 510, the greater the value of Cte 514 is (the greater the capacity is), the greater the signals, which can be applied to the connection line 530 corresponding to the communication medium 430, are. Also, at the transmission device 510, the greater the value of Ctg 515 is (the greater the capacity is), the greater the signals which can be applied to the connection line 530 are. Further, at the transmission device 510, the smaller the value of Ctb 517-1 is (the smaller the capacity is), the greater the signals which can be applied to the connection line 530 are. Moreover, at the transmission device 510, the smaller the value of Cth 517-2 is (the smaller the capacity is), the greater the signals which can be applied to the connection line 530 are. Moreover, at the transmission device 510, the smaller the value of Cti 517-3 is (the smaller the capacity is), the greater the signals which can be applied to the connection line 530 are.

At the reception device 520, the greater the value of Cre 524 is (the greater the capacity is), the greater the signals, which can be extracted from the connection line 530 corresponding to the communication medium 430, are. Also, at the reception device 520, the greater the value of Crg 525 is (the greater the capacity is), the greater the signals which can be extracted from the connection line 530 are. Further, at the reception device 520, the smaller the value of Crb 527-1 is (the smaller the capacity is), the greater the signals which can be extracted from the connection line 530 are. Further, at the reception device 520, the smaller the value of Crh 527-2 is (the smaller the capacity is), the greater the signals which can be extracted from the connection line 530 are. Moreover, at the reception device 520, the smaller the value of Cri 527-3 is (the smaller the capacity is), the greater the signals which can be extracted from the connection line 530 are. Also, at the reception device 520, the smaller the value of Rr 523-1 is (the lower the resistance is), the greater the signals which can be extracted from the connection line 530 are.

The lower the values of Rm 531 and Rm 533, which are resistance components of the connection line 530, are (the lower the resistances are), at the transmission device 510, the greater the signals which can be applied to the connection line 530 are. Also, the smaller the value of Cm 532, which is capacitance as to space of the connection line 530 is (the smaller the capacity is), at the transmission device 510, the greater the signals which can be applied to the connection line 530 are.

The size of a capacitor is generally proportionate to the surface area of an electrode, so generally, the grater the size of the electrodes is, the better, but simply increasing the sizes of the electrodes may also increase capacitance between the electrodes. Also, in the event that the size of the electrodes is exaggeratedly great, efficiency may deteriorate. Accordingly, the size and placement, etc., of the electrodes, need to be determined in the overall balance.

Note that the nature of the above-described communication device 500 is such that, at frequency bands where the frequency of the signal source 513-1 is high, this equivalent circuit can be understood in the light of impedance matching, and efficient communication is enabled by determining the parameters. Reactance can be ensured with even small capacitance, so the devices can be easily reduced in size.

Also, generally, the reactance of capacitors increases as the frequency drops. Conversely, the communication system 500 operates based on capacitance coupling, so the lower limit of the frequency of signals generated by the signal source 513-1 is determined thereby. Also, Rm 531, Cm 532, and Rm 533 form a low-pass filter from the positioning thereof, and the properties thereof determine the upper frequency limit.

Figure 10:
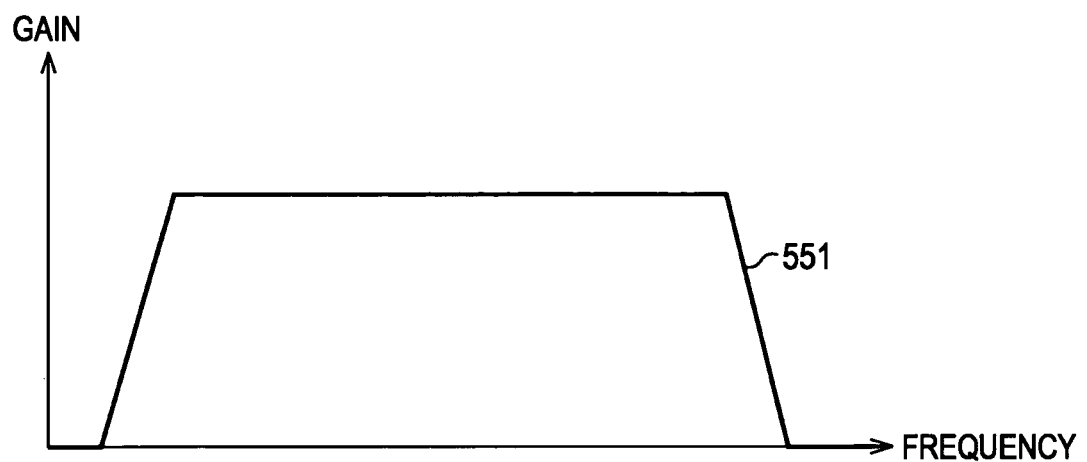
FIG. 10 is a diagram illustrating an example of frequency properties of the communication system shown in FIG. 9.

That is to say, the frequency properties of the communication system 500 are as shown by the curve 551 in the graph in FIG. 10. In FIG. 10, the horizontal axis represents frequency, and the vertical axis indicates the gain of the overall system.

Next, specific numerical values will be studied for the respective parameters of the communication system 500 shown in FIG. 9. Now, for the sake of facilitating description, we will assume that the communication system 400 (communication system 500) is disposed in the air. Also, we will say that the transmission signal electrode 411, transmission reference electrode 412, reception signal electrode 421, and reception signal reference electrode 422, of the communication system 400 (the transmission signal electrode 511, transmission reference electrode 512, and reception signal reference electrode 522 of the communication system 500) are each discs 5 cm in diameter.

In the communication system 400 in FIG. 5, the capacitance Cte 414 (the Cte 514 in FIG. 9) formed of the transmission signal electrode 411 and the communication medium 430 can be obtained from the following Expression 18, employing the above-described Expression (9), assuming that the gap dte therebetween is 5 mm.

$$Cte = \frac{(8.854 \times 10^{-12}) \times (2 \times 10^{-3})}{5 \times 10^{-3}} \approx 3.5 \ [pF] \quad (18)$$

With regard to the Ctb 417-1 which is the capacitance between electrodes (Ctb 517-1 in FIG. 9), we shall say that Expression (9) can be applied. Originally, the expression holds in cases wherein the area of electrodes is sufficiently great as compared to the gap, but here, this may be taken as an approximation. With the gap between the electrodes as 5 cm, Ctb 417-1 (Ctb 517-1 shown in FIG. 9) is as shown in Expression (19).

$$Ctb = \frac{(8.854 \times 10^{-12}) \times (2 \times 10^{-3})}{5 \times 10^{-2}} \approx 0.35 \; [pF] \quad (19)$$

The assumption here is that in the event that the gap between the transmission signal electrode 411 and the communication medium 430 is small, the coupling with space is weak, so the value of the Cth 417-2 (Cth 517-2 shown in FIG. 9) is sufficiently smaller than the value of Cte 414 (Cte 514), and is set to one tenth the value of Cte 414 (Cte 514) as shown in Expression (20).

$$Cth = \frac{Cte}{10} = 0.35 \; [pF] \quad (20)$$

Ctg 415 (Ctg 515 in FIG. 9) indicating the capacitance formed between the transmission reference electrode 412 and space is the same as in the case of FIG. 4 (Expression (12)), and can be obtained as with the following Expression (21).

$$Ctg = 8 \times 8.854 \times 10^{-12} \times 2.5 \times 10^{-2} \approx 1.8 \; [pF] \quad (21)$$

The value of Cti 417-3 (Cti 517-3 in FIG. 9) can be considered to be equivalent to Ctb 417-1 (Ctb 517-1 in FIG. 9), as shown next.

Cti=Ctb=0.35 pF

The parameters of the reception device 420 (reception device 520 in FIG. 9) can also be set the same as with the parameters of the transmission device 410 as follows, by setting the configuration of the electrodes (size, placement, etc.) so as to be the same as with the transmission device 410.

Cre=Cte=3.5 pF

Crb=Ctb=0.35 pF

Crh=Cth=0.35 pF

Crg=Ctg=1.8 pF

Cri=Cti=0.35 pF

Also, for the sake of description, we will say that the communication medium 430 (the connection line 530 in FIG. 9) is an object around the size of a human body, and having properties close to those of a human body. We will further say that the electrical resistance of the communication medium 430 at the position of the reception signal electrode 421 from the position of the transmission signal electrode 411 (the position of the reception signal electrode 521 from the position of the transmission signal electrode 511 in FIG. 9) is 1 MΩ, and that the values of Rm 431 and Rm 433 (Rm 531 and Rm 533 in FIG. 9) are each 500 KΩ. Also, we will say that the value of the capacitance Cm 432 (Cm 532 in FIG. 9) formed between the communication medium 430 and space is 100 pF.

Further, we will say that the signal source 413-1 (the signal source 513-1 in FIG. 9) is sine waves having a maximum value of 1 V and that the frequency is 10 MHz.

Figure 11:
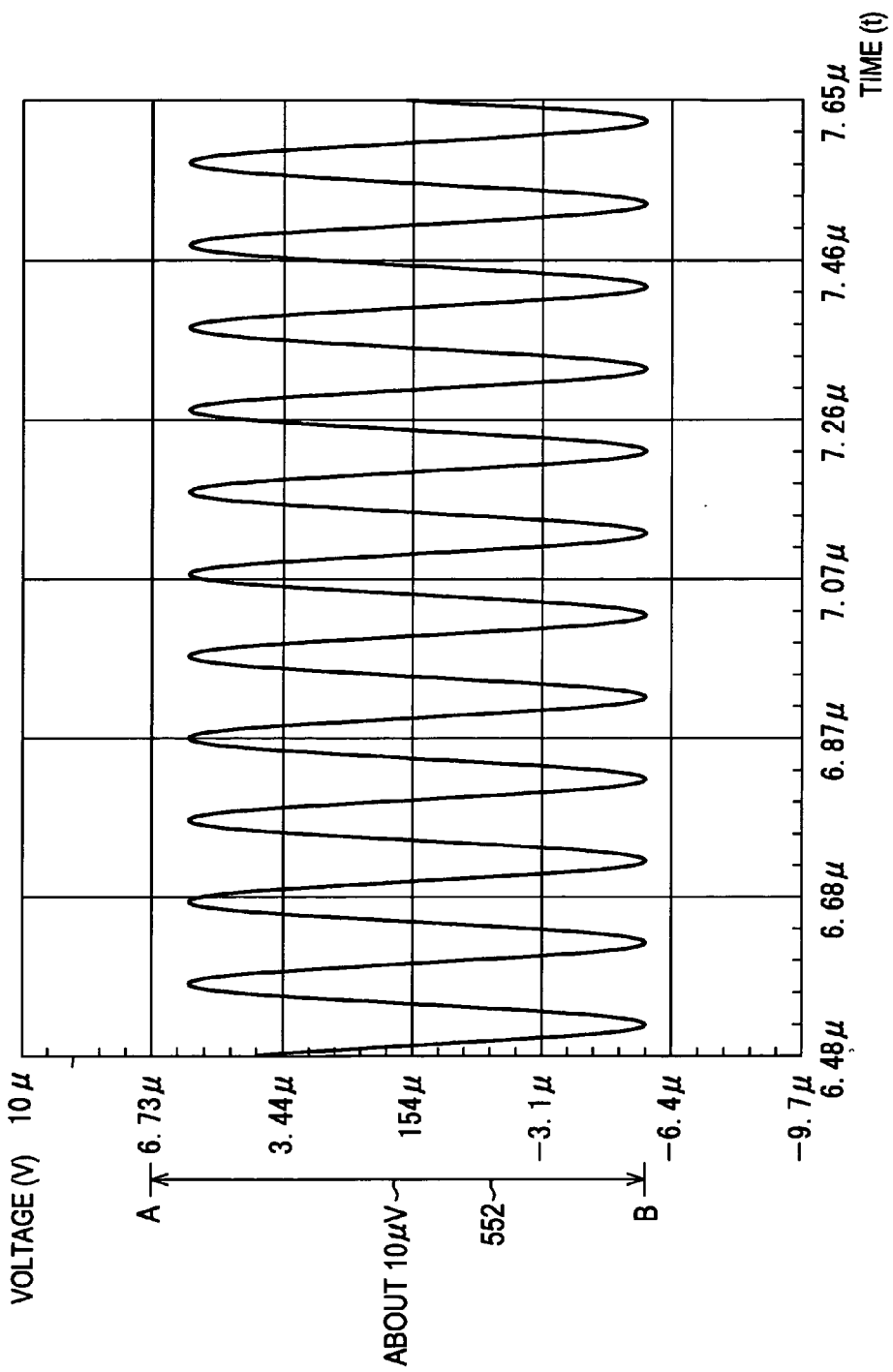
FIG. 11 is a diagram illustrating an example of signals received at a reception device.

Performing simulation using the above parameters yields simulation results for reception signals having a waveform such as shown in FIG. 11. With the graph shown in FIG. 11, the vertical axis represents the voltage at both ends of the Rr 423-1 (Rr 523-1) which is the reception load of the reception device 420 (reception device 520 in FIG. 9), and the horizontal axis represents time. As indicated by the arrows 552 in FIG. 11, the difference observed between the maximum value A and the minimum value B of the waveform of the reception signals (difference between peak values) is around 10 μV. Accordingly, amplifying this with an amplifier having a sufficient gain (detector 423-2) enables the transmission side signals (the signals generated at the signal source 413-1) to be reproduced at the reception side.

As described above, the communication system to which present invention has been applied does not need a physical reference point path, and communication can be realized with the communication signal conveyance path alone, so a communication environment which is not restricted by the usage environment, can be easily provided.

Next, the placement of the electrodes in the devices will be described. As described above, the electrodes each have different roles, and form capacitance with regard to the communication medium or to space. That is to say, the electrodes each electrostatically couple with different partners, and operate using the electrostatic coupling. Accordingly, way in which the electrodes are placed is an extremely important factor in effective electrostatic coupling of the electrodes with the target objects.

For example, with the communication system 400 shown in FIG. 5, there is the need to dispose the electrodes according to the following conditions in order to efficiently communicate between the transmission device 410 and the reception device 420. That is to say, there is the need to satisfy the conditions that, for example, the capacitance between the transmission signal electrode 411 and the communication medium 430, and the capacitance between the reception signal electrode 421 and the communication medium 430 are both sufficiently great, that the capacitance between the transmission reference electrode 412 and space, and the capacitance between the reception reference electrode 422 and space, are both sufficiently great, that the capacitance between the transmission reference electrode 411 and the transmission reference electrode 412, and the capacitance between the reception signal electrode 421 and the reception reference electrode 422 is as small as possible, and that the capacitance between the transmission signal electrode 411 and space and the capacitance between the reception signal electrode 421 and space are as small as possible.

Examples of placement examples of the electrodes are shown in FIGS. 12 through 18. Note that the electrode placement examples described below can be applied to either the transmission device or the reception device. Accordingly, in the following, description regarding the reception device will be omitted, and description will be made regarding the transmission device alone. Also, in the event of applying the examples shown below to the reception device, the transmission signal electrode is made to correspond to the reception signal electrode, and the transmission reference electrode is made to correspond to the reception reference electrode.

Figure 12:
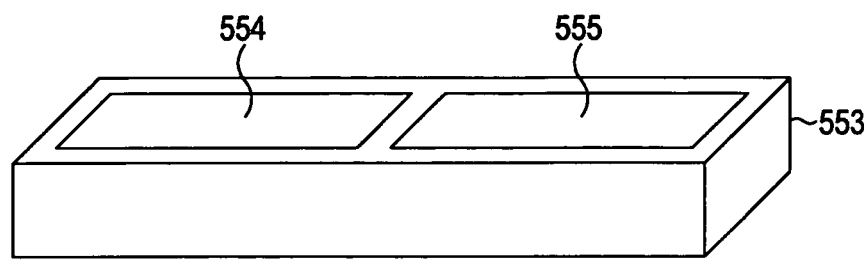
FIG. 12 is a diagram illustrating an example of placement of electrodes.

In FIG. 12, the two electrodes of the transmission signal electrode 554 and transmission reference electrode 555 are formed on the same flat face of a casing 553. With this configuration, the capacitance between the electrodes can be reduced as compared with a case wherein the two electrodes (transmission signal electrode 554 and transmission reference electrode 555) are disposed facing one another. In the event of using a transmission device with such a configuration, only one of the two electrodes is brought into proximity of the communication medium. For example, let us say that the casing 553 is formed of two units and a hinge portion such that the two units are connected by the hinge portion so as to be capable of assuming a relative angle, and is a clamshell type cellular telephone wherein the casing 553 can be folded around the middle portion in the longitudinal direction on the hinge portion. Applying the electrode placement shown in FIG. 12 to such a foldable clamshell type cellular telephone allows for placement of one of the electrodes on the back side of the unit where the operation buttons are situated, and the other electrode on the back face of the unit where the display unit is situated. Due to such a placement, the electrode situated at the operating button side unit is covered by the user's hand, and the electrode positioned on the back face of the display unit is placed facing space. That is to say, the two electrodes can be placed so as to satisfy the above-described conditions.

Figure 13:
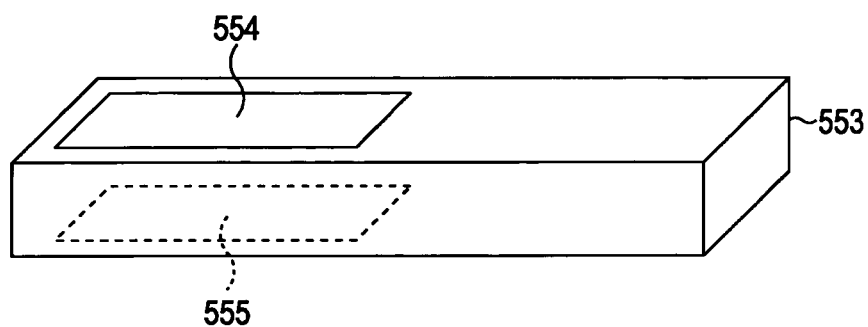
FIG. 13 is a diagram illustrating another example of placement of electrodes.

FIG. 13 illustrates an arrangement wherein the two electrodes (transmission signal electrode 554 and transmission reference electrode 555) are disposed facing one another across the casing 553. In this case, the electrostatic coupling of the two electrodes is stronger than in the case in FIG. 12, but is suitable for a case wherein the casing 553 is relatively small. The two electrodes in this case should be placed so as to be as far away from each other as much as possible in the casing 553.

Figure 14:
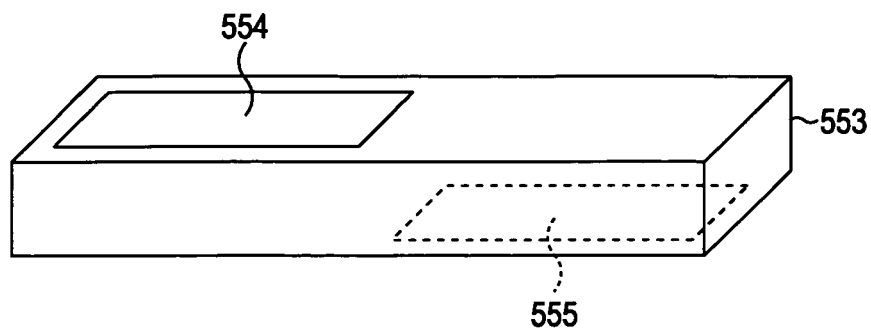
FIG. 14 is a diagram illustrating yet another example of placement of electrodes.

FIG. 14 illustrates an arrangement wherein the two electrodes (transmission signal electrode 554 and transmission reference electrode 555) are disposed on opposing faces of the casing 553 but so as to not directly face one another. The electrostatic coupling in this case is smaller than that of that shown in FIG. 13.

Figure 15:
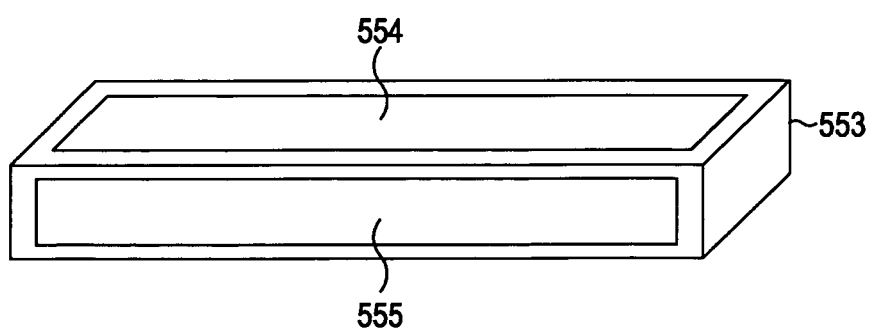
FIG. 15 is a diagram illustrating yet another example of placement of electrodes.

FIG. 15 illustrates an arrangement wherein the two electrodes (transmission signal electrode 554 and transmission reference electrode 555) are disposed perpendicular one to another in the casing 553. According to this configuration, in an application wherein the face of the transmission signal electrode 554 and the opposing face thereof come close to the communication medium, electrostatic coupling with space remains for the side face (the face on which the transmission reference electrode 555 is placed), so communication is enabled.

FIGS. 16A and 16B illustrate an arrangement wherein the placement shown in FIG. 13 is such that the transmission reference electrode 555, which is one of the electrodes, is placed within the casing 553. That is to say, as shown in FIG. 16A, only the transmission reference electrode 555 is provided within the casing 553. FIG. 16B is a diagram illustrating an example of the electrode position as viewed from the face 556 in FIG. 16A. As shown in FIG. 16B, the transmission signal electrode 554 is disposed on the surface of the casing 553, with only the transmission reference electrode 555 positioned within the casing 553. According to this configuration, even in the event that the casing 553 is broadly covered with the communication medium, there is space around the one electrode within the casing 553, so communication is enabled.

Figure 17B:
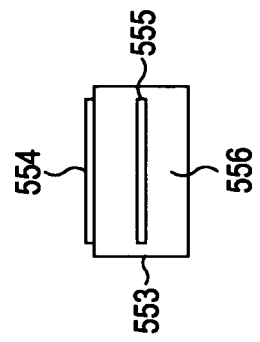
FIGS. 17A and 17B are diagrams illustrating yet another example of placement of electrodes.
Figure 17A:
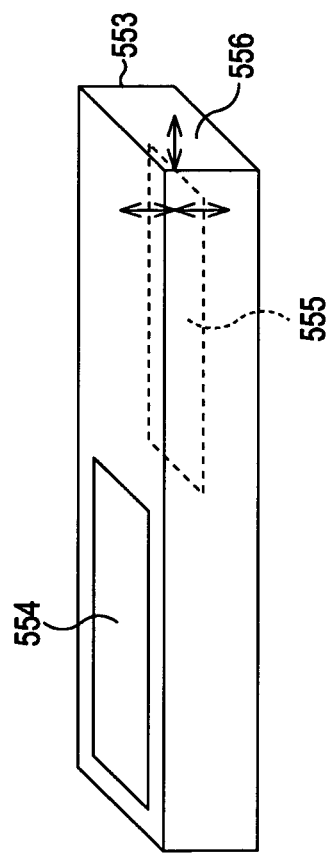

FIGS. 17A and 17B illustrate an arrangement wherein the placement shown in FIG. 12 or FIG. 14 is such that the transmission reference electrode 555, which is one of the electrodes, is placed within the casing 553. That is to say, as shown in FIG. 17A, only the transmission reference electrode 555 is provided within the casing 553. FIG. 17B is a diagram illustrating an example of the electrode position as viewed from the face 556 in FIG. 17A. As shown in FIG. 17B, the transmission signal electrode 554 is disposed on the surface of the casing 553, with only the transmission reference electrode 555 positioned within the casing 553. According to this configuration, even in the event that the casing 553 is broadly covered with the communication medium, there is space around the one electrode within the casing, so communication is enabled.

Figure 18B:
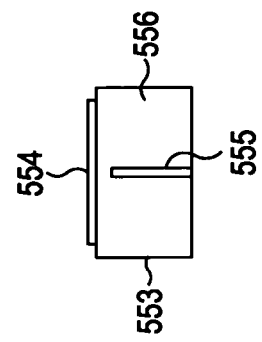
FIGS. 18A and 18B are diagrams illustrating yet another example of placement of electrodes.
Figure 18A:
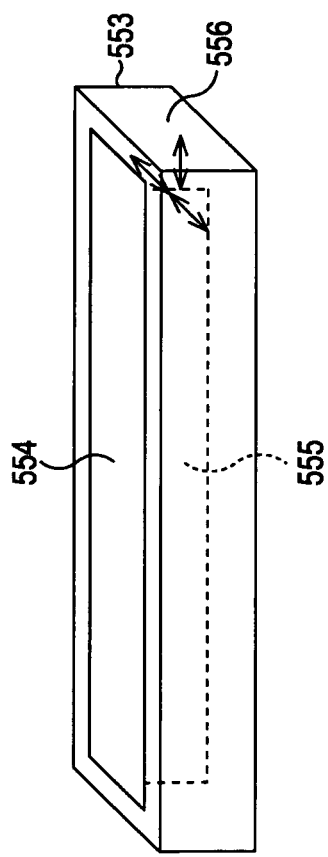

FIGS. 18A and 18B illustrate an arrangement wherein the placement shown in FIG. 15 is such that the transmission reference electrode 555, which is one of the electrodes, is placed within the casing 553. That is to say, as shown in FIG. 18A, only the transmission reference electrode 555 is provided within the casing 553. FIG. 18B is a diagram illustrating an example of the electrode position as viewed from the face 556 in FIG. 18A. As shown in FIG. 18B, the transmission signal electrode 554 is disposed on the surface of the casing 553, with only the transmission reference electrode 555 positioned within the casing 553. According to this configuration, even in the event that the casing 553 is broadly covered with the communication medium, there is space around the one electrode 555 within the casing, so communication is enabled.

All of the electrode placements described above have been made such that one electrode is closer to the communication medium than the other electrode, and such that the electrostatic coupling with space of the one electrode is strengthened. Also, each placement is preferably made such that the electrostatic coupling between the two electrodes is weakened.

Figure 19A:
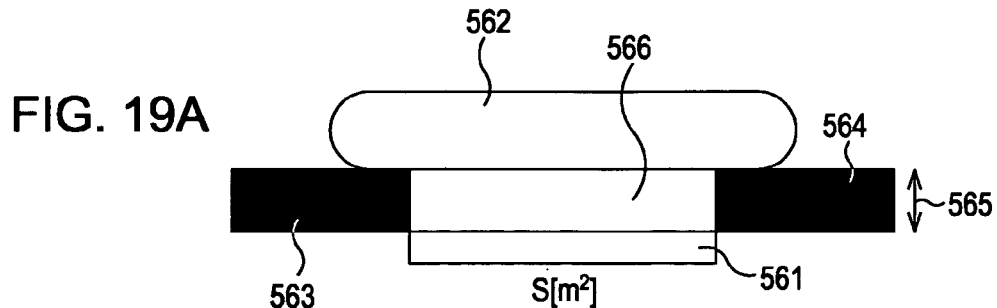
FIGS. 19A through 19C are diagrams illustrating configuration examples of an electrode.
Figure 19B:
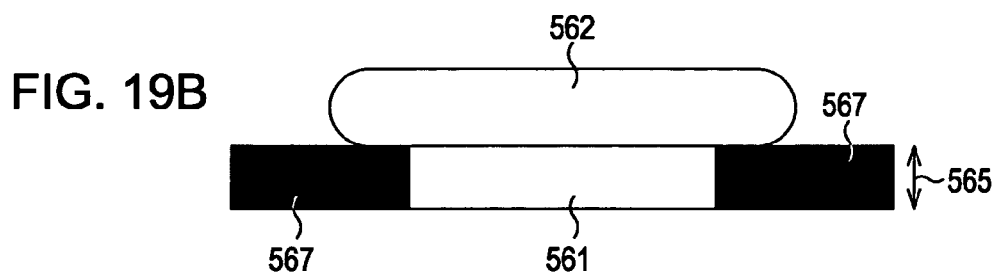
Figure 19C:
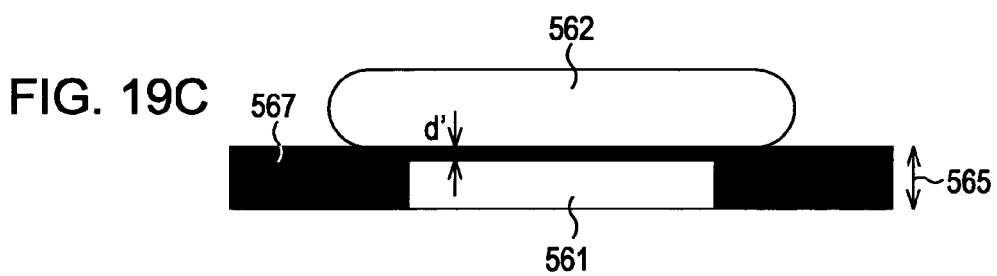

The transmission device or reception device may be assembled into some sort of casing. With the equipment according to the present invention, there are at least tow electrodes, and these are in an electrically insulated state, so the casing can be formed of an insulator having a certain thickness. FIGS. 19A through 19C are cross-sectional view of around the transmission signal electrode. The transmission reference electrode, reference signal electrode, and reception reference electrode, are all of similar configuration as the transmission signal electrode, and accordingly the following description can be applied thereto. Accordingly, description thereof will be omitted.

FIG. 19A illustrates a cross-sectional view of around the electrode. The casing 563 and casing 564 will always have a physical thickness (d m), indicated by the arrows 565, so there will be a gap between the electrode and communication medium (e.g., transmission electrode 561 and communication medium 562), or between the electrode and space, that is equivalent to this thickness, at the very least. As can be understood from the description so far, the capacitance is generally better to be increased between the electrode and communication medium or between the electrode and space.

Now, let us consider a case wherein the communication medium 562 is in close contact with the casing 563 and the casing 564. The capacitance C between the transmission reference electrode 561 and communication medium 562 in this case can be obtained by Expression (9), so the following Expression (22) holds.

$$C = (\varepsilon_r \times \varepsilon_0) \times \frac{S}{d} \ [F] \tag{22}$$

Here, $\in_0$ represents permittivity in a vacuum, which is the fixed value of $8.854 \times 10^{-12}$ F/m. $\in_r$ represents the relative permittivity in this case, and S the surface area of the transmission signal electrode 561. Disposing a dielectric material having a high relative permittivity in the space 566 formed above the transmission signal electrode 561 increases the capacitance, and accordingly performance can be improved.

Capacitance can also be increased regarding the surrounding space. Note that in the case of FIG. 19A, the dielectric material is inserted in the thickens portion of the casing (indicated by arrows 565), but this is not indispensable, and may be at an arbitrary position.

Conversely, FIG. 19B illustrates an example of a case wherein the electrode is embedded within the casing. In FIG. 19B, the transmission signal electrode 561 is positioned so as to be embedded within the casing 567 (so as to be a part of the casing 567). This way, at the same time the communication medium 562 comes into contact with the casing 567, the communication medium 562 also comes into contact with the transmission signal electrode 561. Also, an insulation layer may be formed on the surface of the transmission signal electrode 561, so as to realize a non-contact state between the communication medium 562 and the transmission signal electrode 561.

FIG. 19C illustrates a state wherein, as compared with that in FIG. 19B, the casing 567 is formed in a recessed shape such that there is a thickness d' to the surface of the electrode, and the transmission signal electrode 561 is embedded therein. In the event that the casing is integrally formed, this technique can suppress manufacturing costs and parts costs, and easily increase capacitance.

According to the above description, in a case wherein multiple electrodes are placed on a single plane such as shown in FIG. 12, communication can be performed by generating potential difference between the electrodes since the coupling of the transmission signal electrode 554 as to the communication medium is stronger even incases wherein both the transmission signal electrode 554 and the transmission reference electrode 555 couple with the communication medium, by inserting a dielectric matter to the transmission signal electrode 554 side (or by inserting a dielectric matter having higher permittivity than the transmission signal reference electrode 555 side to the transmission signal electrode 554 side).

Next, description will be made regarding the size of the electrodes. While there is the need for at least the transmission reference electrode and reception reference electrode to form sufficient capacitance with space in order to obtain sufficient potential for the communication medium, the transmission signal electrode and reception signal electrode can be formed to a suitable size, taking into consideration the electrostatic coupling thereof with the communication medium, and the nature of signals to be sent over the communication medium. Accordingly, normally, the larger the transmission reference electrode is made to be than the transmission signal electrode, the larger the reception reference electrode is made to be than the reception signal electrode. However, relations other than this may be employed so long as signals sufficient for communication can be obtained.

Particularly, in the event of matching the size of the transmission reference electrode with the size of the transmission signal electrode, and the size of the reception reference electrode with the size of the reception signal electrode, these electrodes can be viewed as having mutually equivalent properties from a reference point at a point of infinity. Accordingly, a feature thereof is that equivalent communication performance can be obtained regardless of which electrode is used as the reference electrode (signal electrode) (i.e., an arrangement wherein the reference electrode and signal electrode are interchangeable).

In other words, in the event of a design wherein the size of the reference electrode and signal electrode are different from each other, there is the feature that communication is enabled only in the event that one electrode (the electrode set to be the signal electrode) is brought into proximity of the communication medium.

Next, shielding of the circuit will be described. While in the above, the transmission unit and reception unit and the like, other than the electrodes, have been considered to be transparent existences, as far as the physical configuration of the communication system goes, in reality, these are generally configured of electronic parts, in order to realize this communication system. Electronic parts are configured of substances having some sort of electric nature, such as permittivity or the like, and since these are present in the vicinity of the electrodes, there will be some sort of effect thereupon. With the present invention, spatial capacitance and the like brings various effects, so the electronic circuits mounted on the boards are also subject to such effects. Accordingly, in the event that more stable operations are desired, the entirety is preferably shielded with a conductor.

While a shielded conductor can normally be though to be connected to the transmission reference electrode or reception reference electrode which forms the reference potential of a transmission/reception device, this may be connected to the transmission signal electrode or reception signal electrode, as long as there are no problems in operation. The conductor itself of this shield has a physical size, so along the line of the principle described so far, there is the need to take into consideration the fact that operations are made under the mutual relation with the other electrodes, communication medium, and space.

Figure 20:
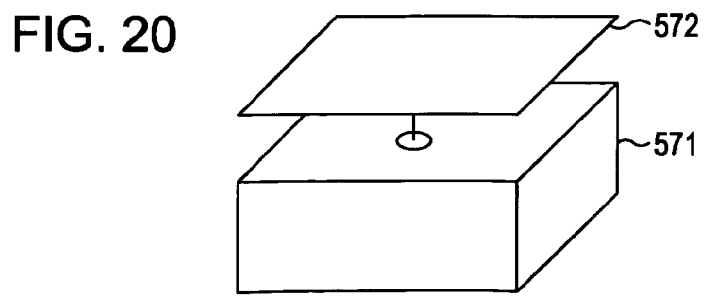
FIG. 20 is a diagram illustrating another configuration example of an electrode.

FIG. 20 illustrates an exemplary embodiment thereof. This example assumes that the equipment runs on batteries, with electronic parts including a battery being stored within a shield case 571, also serving as a reference electrode. An electrode 572 is a signal electrode.

Next, description will be made regarding the communication medium. While the examples so far has been made primarily regarding examples of conductors, communication may be made with dielectric matter having no conductivity as well. This is since an electric field injected from the transmission signal electrode to the communication medium is propagated by the polarization effect of the dielectric matter.

Specifically, while metals such as electric lines or the like can be conceived as conductors, and pure water or the like as dielectric matter, communication can also be made with organisms, normal saline solution, and so forth, having both natures. Also, vacuums and the atmosphere have permittivity, and accordingly allow communication as a communication medium.

Next, noise will be described. In the air, the potential fluctuates due to various factors, such as noise from AC power sources, fluorescent lamps, various home appliances and electrical equipment, charged particles in the air, and so forth. While such potential fluctuation has been ignored so far, these noises are imposed on the various components of the transmission device, communication medium, and reception device.

Figure 21:
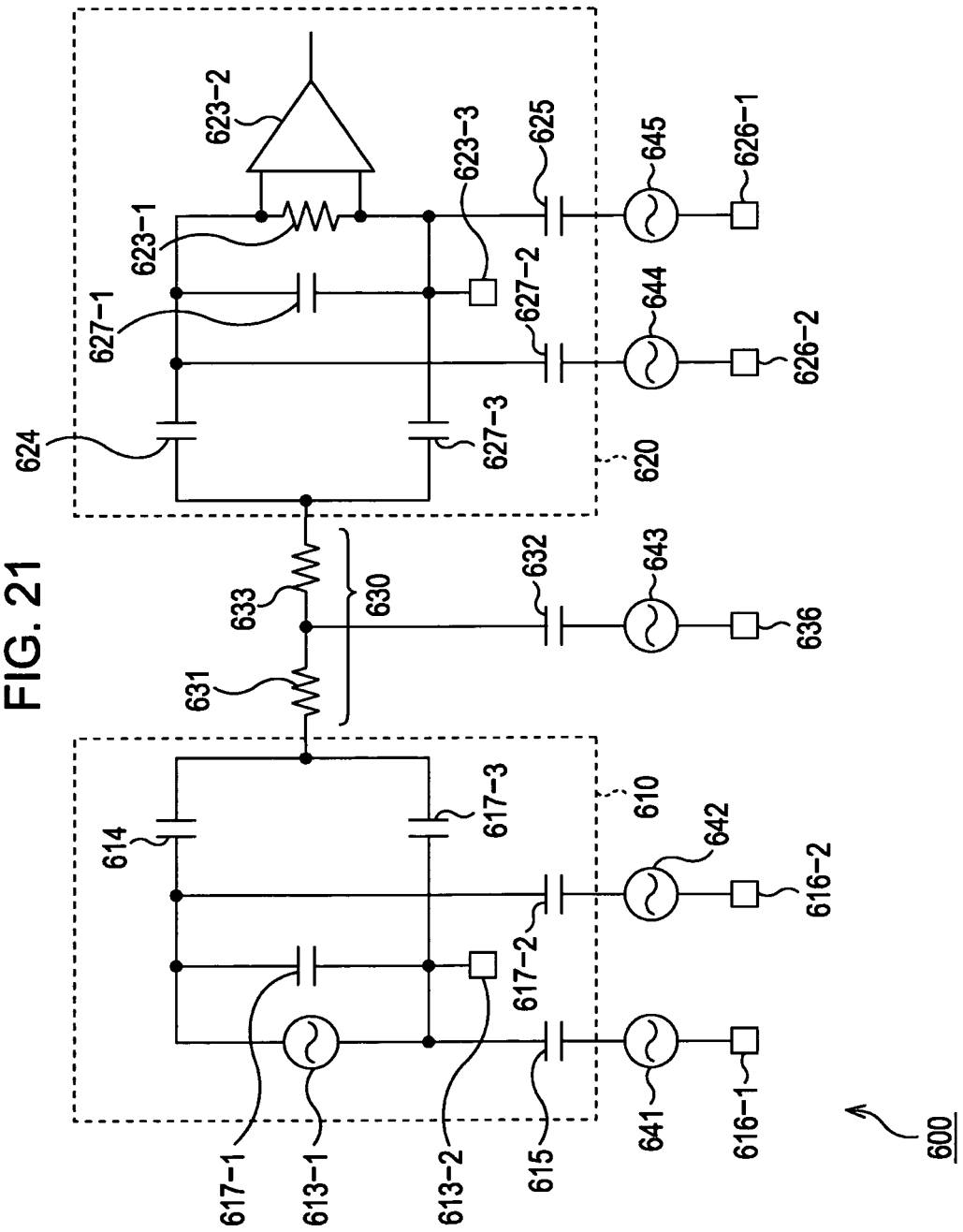
FIG. 21 is a diagram illustrating another example of the equivalent circuit of the model shown in FIG. 5.

FIG. 21 is a schematic diagram illustrating the communication system 100 shown in FIG. 1 as an equivalent circuit including noise components. That is to say, with the communication system 600 shown in FIG. 21, the transmission device 610 of the communication system 600 corresponds to the transmission device 510 of the communication system 500, the reception device 620 corresponds to the reception device 520, and the connection line 630 corresponds to the connection line 530.

In the transmission device 610, the signal source 613-1, in-transmission-device reference point 613-2, Cte 614, Ctg 615, reference point 616-1, reference point 616-2, Ctb 617-1, Cth 617-2, and Cti 617-3, correspond to the signal source 513-1, in-transmission-device reference point 513-2, Cte 514, Ctg 515, reference point 516-1, reference point 516-2, Ctb 517-1, Cth 517-2, and Cti 517-3, of the transmission device 510, respectively. What is different from FIG. 9 is that the transmission device 610 has two signal sources of noise 641 and noise 642 provided between the Ctg 615 and reference point 616-1, and between the Cth 617-2 and reference point 616-2, respectively.

In the reception device 620, the Rr 623-1, detector 623-2, in-reception-device reference point 623-3, Cre 624, Crg 625, reference point 626-1, reference point 626-2, Crb 627-1, Crh 627-2, and Cri 627-3, correspond to the Rr 523-1, detector 523-2, in-reception-device reference point 523-3, Cre 524, Crg 525, reference point 526-1, reference point 526-2, Crb 527-1, Crh 527-2, and Cri 527-3, of the reception device 520, respectively. What is different from FIG. 9 is that the reception device 610 has two signal sources of noise 644 and noise 645 provided between the Crh 627-2 and reference point 626-2, and between the Crg 625 and reference point 626-1, respectively.

In the connection line 630, Rm 631, Cm 632, Rm 633, and reference point 636, correspond to the Rm 531, Cm 532, Rm 533, and reference point 536, of the connection line 530, respectively. What is different from FIG. 9 is that the connection line 630 has a noise 643 made up of a signal source provided between Cm 632 and the reference point 636.

Each of the devices operate based on the in-transmission-device reference point 613-2 which is its own ground, and the in-reception-device reference point 623-2, so as long as the noise imposed thereupon is of the same relative component between the transmission device, communication medium, and reception device, there is no effect on operations. On the other hand, in cases wherein there is distance between the devices, or under environments with much noise, there is a higher possibility that there will be relative difference in noise between the devices. That means that the behavior of noise 641 through noise 645 will differ. Even this difference is not problematic as long as there is no temporal fluctuation, since the relative difference of signal levels to be used can be transmitted, but in the event that the fluctuation frequency of the noise overlaps the frequency band being used, there is need to determine the frequency and signal level to be used taking into consideration the noise properties. In other words, the communication system 600 is resistant to noise components, does not need a physical reference point path, and can realize communication only with the communication signal conveyance path, simply by setting the frequency and signal level to be used while taking into consideration noise properties, so a communication environment which is not restricted by the usage environment can be easily provided.

Next, the influence of the magnitude of distance between the transmission device and reception device on communication will be described. As described above, according to the principle of the present invention, as long as sufficient capacitance can be formed in the space between the transmission reference electrode and reception reference electrode, there is no need for a path through the earth around between the transmission and reception devices, or other electrical paths, and the system not dependent on the distance between the transmission signal electrode and the reception signal electrode. For example, as with the communication system 700 shown in FIG. 22, the transmission device 710 and reception device 720 can be placed at a long distance, and communication is enabled by electrostatically coupling the transmission signal electrode 711 and reception signal electrode 721 with the communication medium 730 having sufficient conductivity or permittivity. At this time, the transmission reference electrode 712 effects electrostatic coupling with the space outside the transmission device 710, and the reception reference electrode 722 effects electrostatic coupling with the space outside the reception device 720. Accordingly, there is no need for electrostatic coupling between the transmission reference electrode 712 and the reception reference electrode 722. However, as the communication medium 730 becomes longer and greater, capacitance as to the space also increases, which needs to be taken into consideration at the time of determining the parameters.

Figure 22:
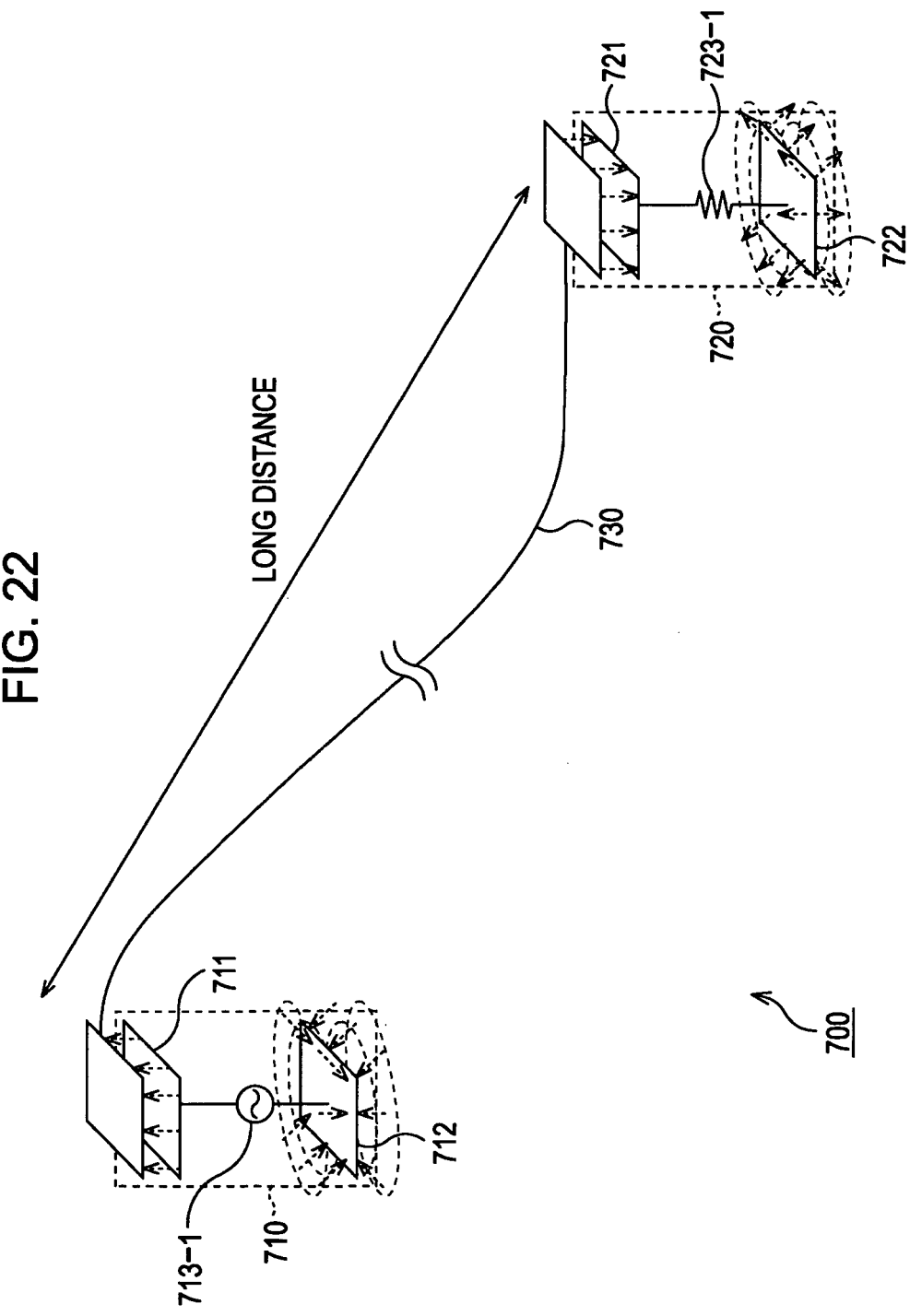
FIG. 22 is a diagram illustrating a layout example of the communication system shown in FIG. 1.

Note that the communication system 700 shown in FIG. 22 is a system corresponding to the communication system 100 shown in FIG. 1, wherein the transmission device 710 corresponds to the transmission device 110, the reception device 720 corresponds to the reception device 120, and the communication medium 730 corresponds to the communication medium 130.

In the transmission device 710, the transmission signal electrode 711, transmission reference electrode 712, and signal source 713-1, correspond to the transmission signal electrode 111, transmission reference electrode 112, and signal source 113 (or a part thereof), respectively. In the same way, in the reception device 720, the reception signal electrode 721, reception reference electrode 722, and signal source 723-1, correspond to the reception signal electrode 121, reception reference electrode 122, and signal source 123 (or a part thereof), respectively.

Accordingly, description of these components will be omitted.

As described above, the communication system 700 does not need a physical reference point path, and can realize communication only with the communication signal conveyance path, so a communication environment which is not restricted by the usage environment can be easily provided.

While description has been made above that the transmission signal electrode and reception signal electrode are not in contact with the communication medium, arrangements may be made not restricted to this, and the transmission signal electrode and reception signal electrode may be connected with a communication medium having conductivity, as long as sufficient capacitance can be obtained between the transmission reference electrode and reception reference electrode with the space around the respective devices.

Figure 23:
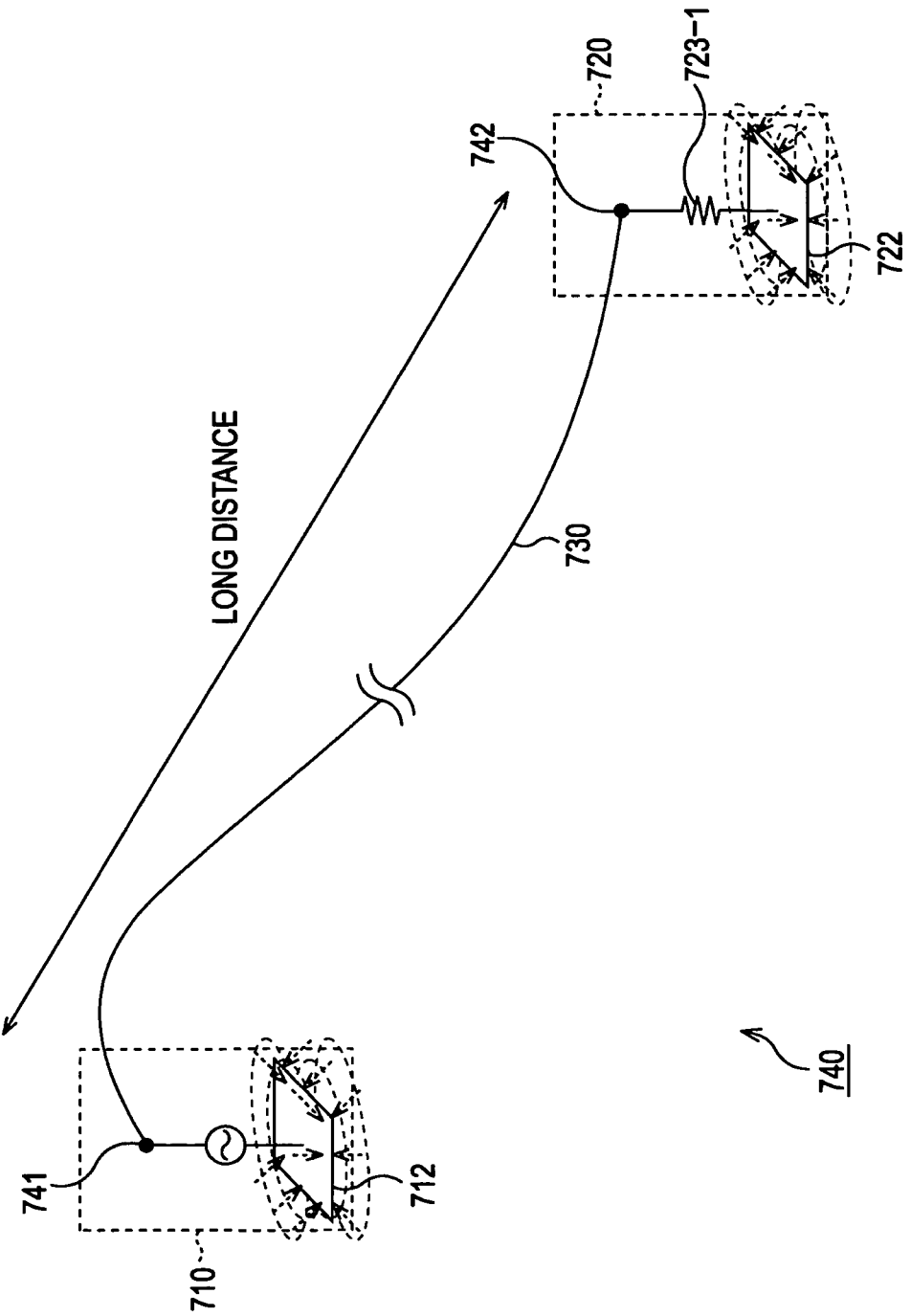
FIG. 23 is a diagram illustrating another configuration example of a communication system to which the present invention is applied.

FIG. 23 is a schematic diagram for describing an example of a communication system wherein the transmission reference electrode and reception reference electrode are connected via the communication medium.

In FIG. 23, the communication system 740 is a system corresponding to the communication system 700 shown in FIG. 22. Note that with the communication system 740 however, the transmission device 710 does not have a transmission signal electrode 711, and the transmission device 710 and the communication medium 730 are connected by a contact point 741. In the same way, the reception device 720 in the communication system 740 does not have a reception signal electrode 721, and the reception device 720 and the communication medium 730 are connected by a contact point 742.

While a normal cable communication system is configured having at least two signal lines, with communication being performed using the relative difference in the signal levels, this embodiment of the present invention allows communication to be performed with a single signal line.

That is to say, the communication system 740 also does not need a physical reference point path, and can realize communication only with the communication signal conveyance path, so a communication environment which is not restricted by the usage environment can be easily provided.

Figure 24:
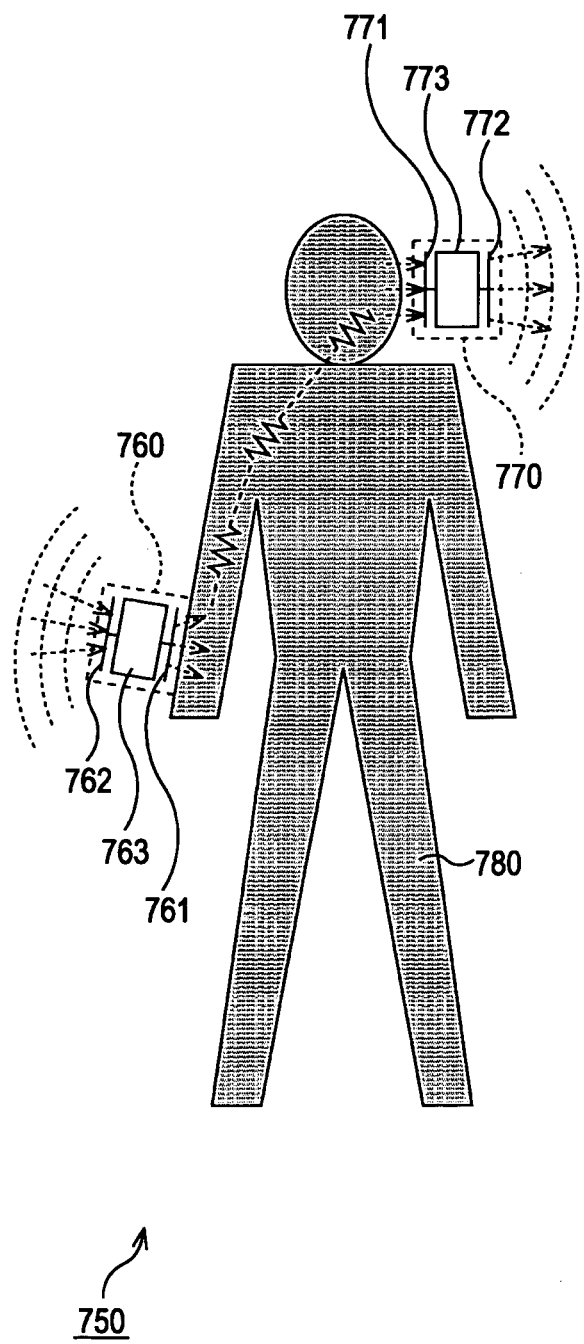
FIG. 24 is a diagram illustrating an actual usage example of an embodiment of a communication system to which the present invention is applied.

Next, a specific application example of the above communication system will be described. For example, the communication system such as described above can use an organism as the communication medium. FIG. 24 is a schematic diagram illustrating an example of a communication system in a case of performing communication via a human body. In FIG. 24, the communication system 750 is a system wherein music data is transmitted from a transmission device 760 attached to an arm of a human body, and the music data is received by a reception device 770 attached to the head of the human body and converted into audio, so as to be output for the user to listen to. This communication system 750 is a system corresponding to the above-described communication systems (e.g., communication system 100), and the transmission device 760 and reception device 770 correspond to the transmission device 110 and reception device 120, respectively. Also, in the communication system 750, the human body 780 is the communication medium, corresponding to the communication medium 130 in FIG. 1.

That is to say, the transmission device 760 has a transmission signal electrode 761, transmission reference electrode 762, and transmission unit 763, each corresponding to the transmission signal electrode 111, transmission reference electrode 112, and transmission unit 113, shown in FIG. 1. Also, the reception device 770 has a reception signal electrode 771, reception reference electrode 772, and reception unit 773, each corresponding to the reception signal electrode 121, reception reference electrode 122, and reception unit 123, shown in FIG. 1, respectively.

Accordingly, the transmission device 760 and reception device 770 are disposed such that the transmission signal electrode 761 and the reception signal electrode 771 are in contact with or close to the human body 780 which is the communication medium. That transmission reference electrode 762 and the reception reference electrode 772 only have to be in contact with space, so coupling with earth nearby and coupling between the transmission and reception devices (or electrodes) is unnecessary.

Figure 25:
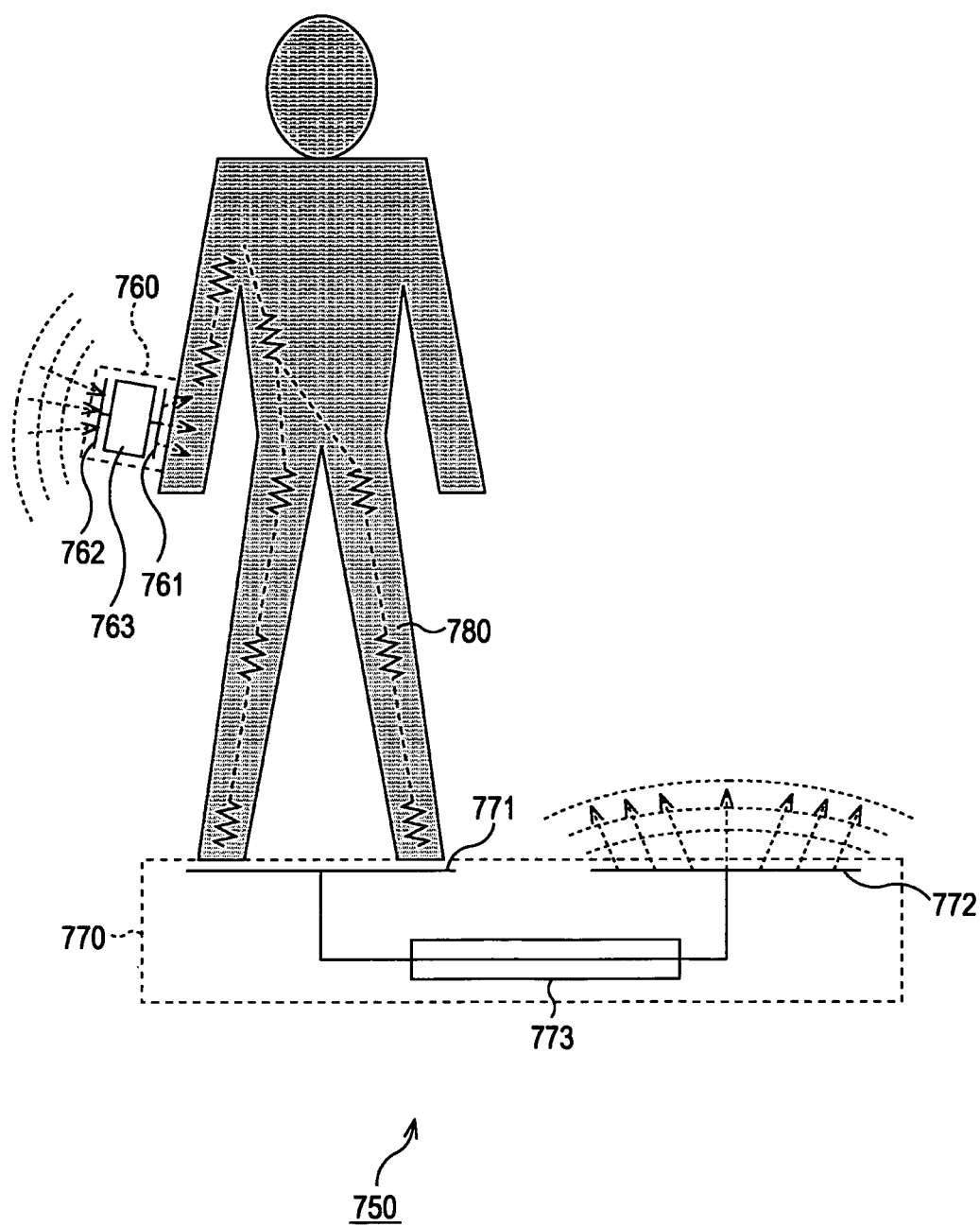
FIG. 25 is a diagram illustrating another usage example of an embodiment of a communication system to which the present invention is applied.

FIG. 25 is a diagram for describing another example for realizing the communication system 750. In FIG. 25, the reception device 770 is in contact with (or close to) the bottom of the feet of the human body 780, and communication is performed with the transmission device 760 attached to an arm of the human body 780. In this case as well, the transmission signal electrode 761 and the reception signal electrode 771 are disposed so as to be in contact with (or close to) the human body 780, and the transmission reference electrode 762 and the reception reference electrode 772 are provided facing space. This is in particular an application example which would be impossible to realize with techniques used heretofore which use the earth as a communication path.

That is to say, the communication system 750 as described above does not need a physical reference point path, and can realize communication only with the communication signal conveyance path, so a communication environment which is not restricted by the usage environment can be easily provided.

With such a communication system, there is no particular restriction on the modulation method for signals to be sent over the communication medium as long as both the transmission device and the reception device can handle it, so an optimal method can be selected based on the overall system properties of the communication system. Specific examples of modulation methods include analog signals subjected to base band, amplitude modulation, or frequency modulation, or digital signals subjected to base band, amplitude modulation, frequency modulation, or phase modulation, and any one of these, or a combination of a plurality thereof, may be used.

Further, an arrangement may be made with such a communication system wherein one communication medium is used to establish multiple communications, with full-duplex communication or communication between multiple communication devices of a single communication medium, or the like, being realized.

Examples of methods for realizing such multiplex communication will be described. A first is to apply spread spectrum technology. In this case, frequency bandwidth and a predetermined time-sequence code are determined between the transmission device and the reception device. The transmission device changes the original signal with regard to frequency according to the time-sequence code, and spreads the signals over the entire frequency band before transmitting. The reception device receives the spread components, and then integrates the received signals so as to decode the received signals.

The advantages of frequency spreading will be described. According to the Shannon-Hartley channel capacity theorem, the following Expression holds.

$$C = B \times \log_2\left(1 + \frac{S}{N}\right) [bps] \quad (23)$$

Wherein C, of which the increment is bps, represents channel capacity, representing the theoretically greatest data rate which can be sent over the communication path. B, of which the increment is Hz, represents the channel bandwidth, and S/N represents the signal/noise electric power ratio (SN ratio). A Maclaurin expansion of the above Expression for a low S/N ration allows the above Expression (23) to be approximated as in the following Expression (24).

$$C \approx \frac{S}{N} \times B [bps] \quad (24)$$

Accordingly, if we say that the S/N ratio is at a level of the noise floor or lower, S/N<<1 holds, but the channel capacity C can be raised to a desired level by widening the channel bandwidth B.

Setting a different time-sequence code for each communication path, and differentiating the behavior of frequency spreading, allows frequency spreading without mutual interference, and crosstalk is eliminated, so multiple communications can be held simultaneously.

Figure 26:
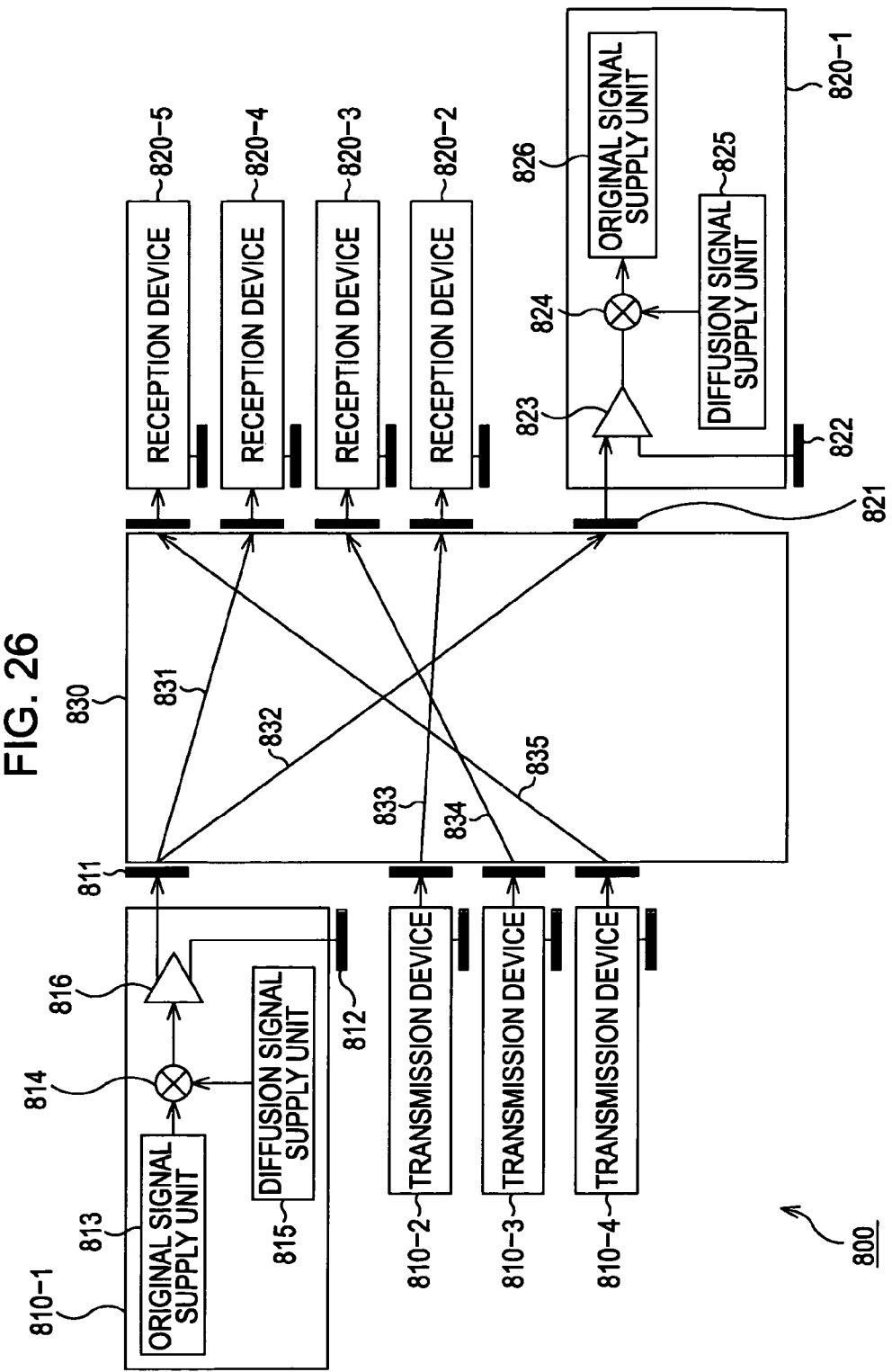
FIG. 26 is a diagram illustrating yet another configuration example of a communication system to which the present invention is applied.

FIG. 26 is a diagram illustrating another configuration example of a communication system to which the present invention is applied. With the communication system 800 shown in FIG. 26, four transmission devices 810-1 through 810-4 and five reception devices 820-1 through 820-5 perform multiple communication over the communication medium 830 using the spread spectrum technology.

The transmission device 810-1 corresponds to the transmission device 110 in FIG. 1, having a transmission signal electrode 811 and transmission reference electrode 812, and further has an original signal supply unit 813, multiplier 814, spread signal supply unit 815, and amplifier 816, as a configuration corresponding to the transmission unit 113.

The original signal supply unit 813 supplies original signals, which are signals prior to frequency spreading, to the multiplier 814, the spread signal supply unit 815 supplies spread signals for spreading the frequency to the multiplier 814. Note that there are two representative types of spreading with spread signals, which are direct sequence (hereafter referred to as "DS"), and frequency hopping (hereafter referred to as "FH"). The DS method is a method wherein the aforementioned time-sequence code with a frequency component higher than that of the original signal at least, is multiplied at the multiplier 814, and the multiplication results are carried by a predetermined carrier wave, amplified at the amplifier 815, and then output.

Also, the FH method changes the frequency of the carrier wave with the above time-sequence code so as to be used as spread signals, which are multiplied with the original signal supplied from the original signal supply unit 813 at the multiplier 814, amplified at the amplifier 815, and then output. One output of the multiplier 815 is connected to the transmission signal electrode 811, and the other is connected to the transmission reference electrode 812.

The transmission device 810-2 through transmission device 810-4 are of the same configuration, and the description of the above transmission device 810-1 is applicable thereto, so description thereof will be omitted.

The reception device 820-1 corresponds to the reception device 120 in FIG. 1, having a reception signal electrode 821 and reception reference electrode 822, and further has an amplifier 823, multiplier 824, spread signal supply unit 825, and an original signal supply unit 826, as a configuration corresponding to the transmission unit 123.

The reception device 820-1 first restores electric signals based on the method of the invention, and then restores the original signals (signals supplied from the original signal supply unit 813) by processing reverse to that of the transmission device 810-1.

Figure 27:
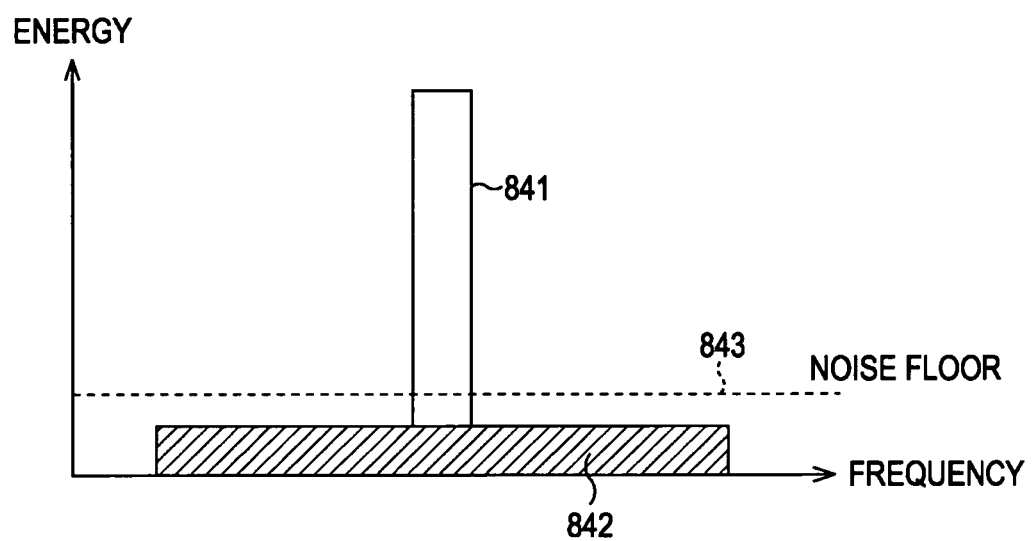
FIG. 27 is a diagram illustrating a distribution example of a frequency spectrum.

FIG. 27 shows a frequency spectrum according to this method. The horizontal axis represents frequency, and the vertical axis represents energy. The spectrum 841 is a spectrum of a type wherein the frequency is fixed, and energy is concentrated on a particular frequency. With this method, signals cannot be restored if the energy thereof drops below the noise floor 843. On the other hand, the spectrum 842 represents a spectrum spread type spectrum, with energy spread over a wide frequency band. The entire rectangular area in the diagram can be thought of as representing the overall energy, so the signals of the spectrum 842 can be restored to the original signals by integrating the energy over the entire frequency band and communication can be performed, despite the fact that the frequency components are all under the noise floor 843.

Performing communication with spectrum spreading as described above allows the communication system 800 to perform simultaneous communication using the same communication medium 830, as shown in FIG. 26. As can be seen in FIG. 26, path 831 through path 935 represent communication paths on the communication medium 830. Also, using spectrum spread means that the communication system 800 can perform many-to-one communication as indicated by path 831 and path 832, and many-to-many communication.

A second is to determine frequency bandwidths between a transmission device and reception device, and further divide this into multiple regions, thereby applying frequency division. In this case, the transmission device (or reception device) either follows certain rules for frequency allocation, or detects frequency bands that are available when starting communication and allocates frequency bands based on the detection results.

Figure 28:
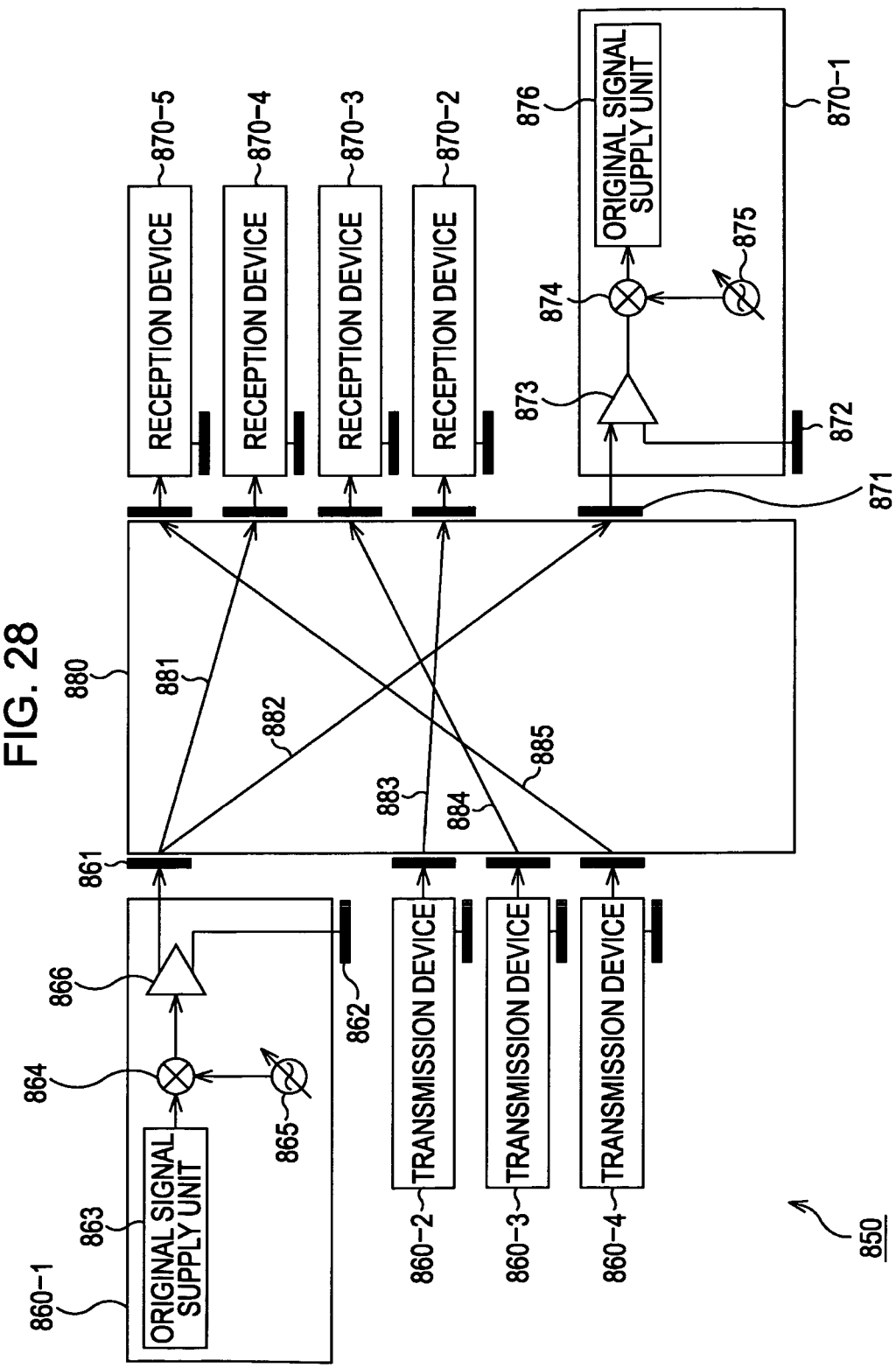
FIG. 28 is a diagram illustrating yet another configuration example of a communication system to which the present invention is applied.

FIG. 28 is a diagram illustrating another configuration example of a communication system to which the present invention is applied. With the communication system 850 shown in FIG. 28, four transmission devices 860-1 through 860-4 and five reception devices 870-1 through 870-5 perform multiplex communication over the communication medium 880 using frequency division.

The transmission device 860-1 corresponds to the transmission device 110 in FIG. 1, having a transmission signal electrode 861 and transmission reference electrode 862, and further has an original signal supply unit 863, a multiplier 864, a frequency-variable oscillator 865, and an amplifier 866, as a configuration corresponding to the transmission unit 113.

Oscillation signals generated by the frequency-variable oscillator 865 having predetermined frequency component are multiplied with the original signals supplied from the original signal supply unit 863 at the multiplier 864, amplified at the amplifier 866, and then output (filtered as suitable). One output of the multiplier 866 is connected to the transmission signal electrode 861, and the other is connected to the transmission reference electrode 862.

The transmission device 860-2 through transmission device 860-4 are of the same configuration, and the description of the above transmission device 860-1 is applicable thereto, so description thereof will be omitted.

The reception device 870-1 corresponds to the reception device 120 in FIG. 1, having a reception signal electrode 871 and reception reference electrode 872, and further has an amplifier 873, multiplier 874, frequency variable oscillator 875, and an original signal supply unit 876, as a configuration corresponding to the reception unit 123.

The reception device 870-1 first restores electric signals based on the method of the invention, and then restores the original signals (signals supplied from the original signal supply unit 863) by processing reverse to that of the transmission device 860-1.

Figure 29:
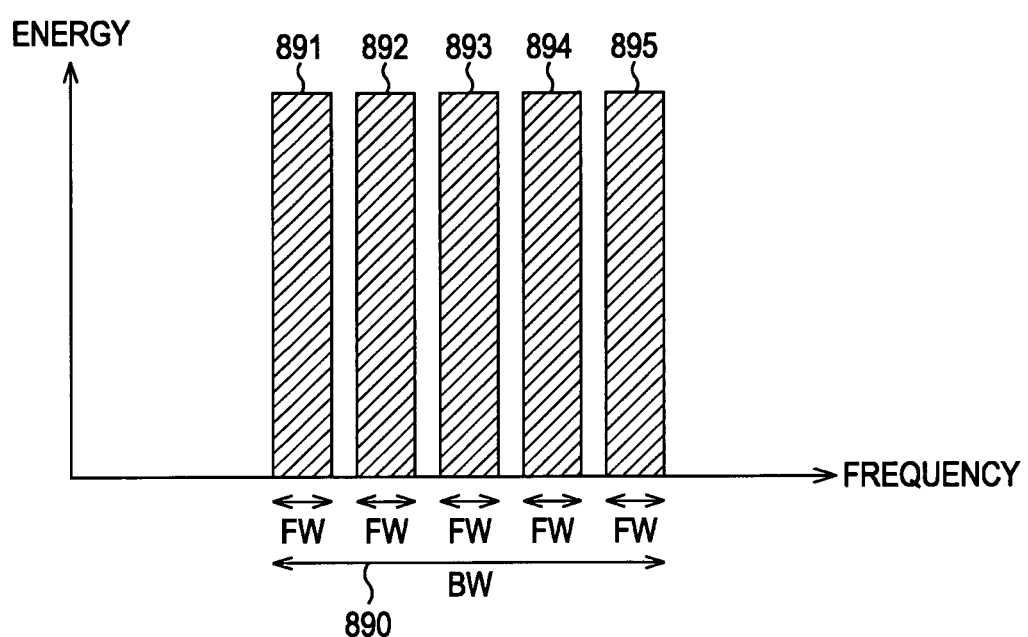
FIG. 29 is a diagram illustrating a distribution example of a frequency spectrum.

FIG. 29 shows a frequency spectrum according to this method. The horizontal axis represents frequency, and the vertical axis represents energy. Note that in order to facilitate description, an example is shown wherein the entire frequency bandwidth 890 (BW) has been divided into five bandwidths 891 through 895 (FW). The frequency bands thus divided are used for communication on differing communication paths. That is to say, the transmission device 860 (reception device 870) of the communication system 850 uses frequency bands differing for each communication path, so that crosstalk is suppressed and multiple communications can be performed over a single communication medium 880, as shown in FIG. 28. In FIG. 28, path 881 through path 885 represent communication paths on the communication medium 880. Also, using frequency division means that the communication system 850 can perform many-to-one communication as indicated by path 881 and path 882, and many-to-many communication.

Now, description has been made with the communication system 850 (transmission device 860 or reception device 870) being divided into five bandwidths 891 through 895, but the number of divisions is not restricted at all, and each of the bandwidths may be of differing sizes.

A third is a method applying time division, wherein communication time between the transmission device and reception device is divided into multiple times. In this case, the transmission device (or reception device) either follows certain rules for time division, or detects time regions that are available when starting communication and performs communication time division based on the detection results.

Figure 30:
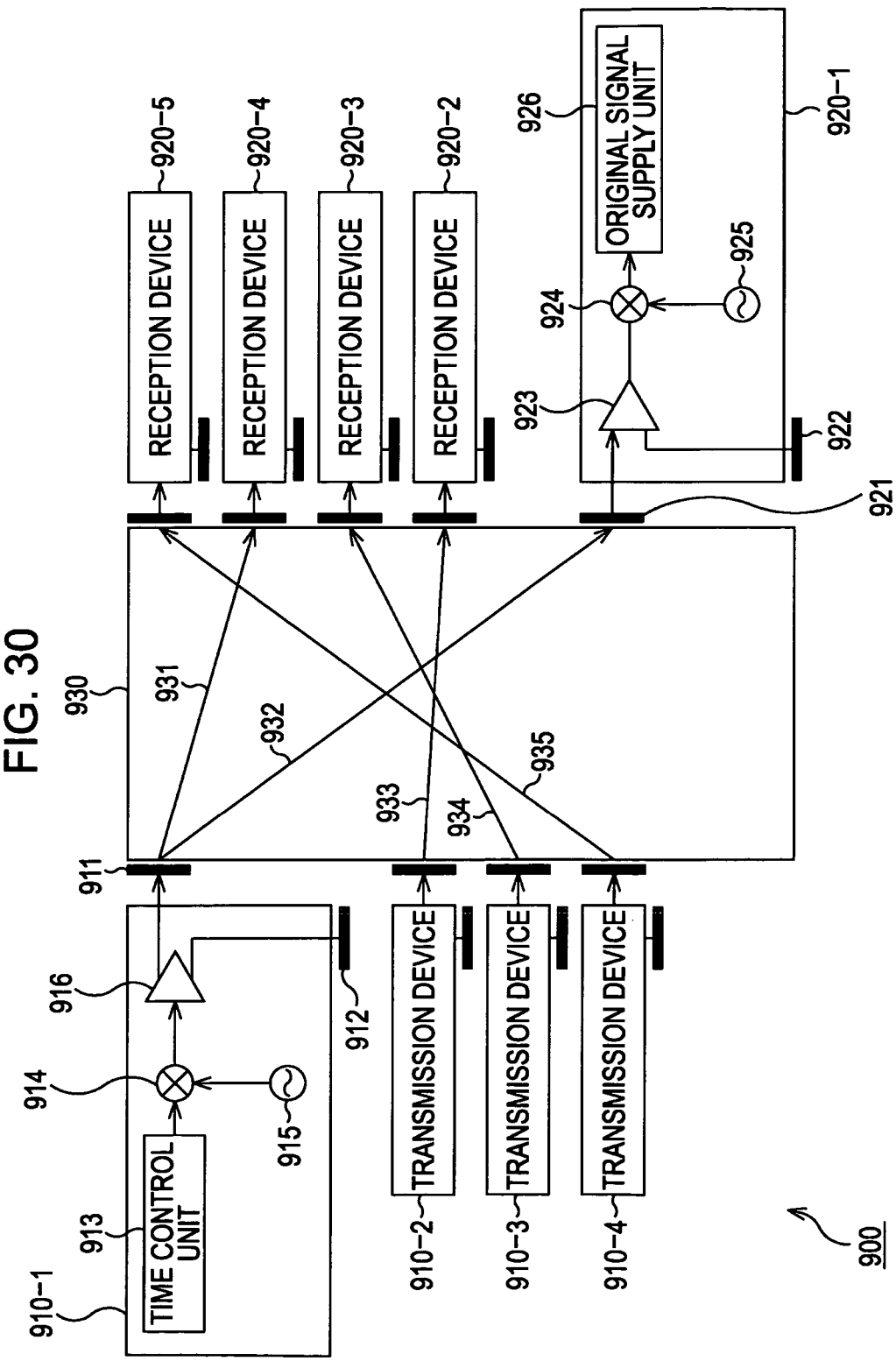
FIG. 30 is a diagram illustrating yet another configuration example of a communication system to which the present invention is applied.

FIG. 30 is a diagram illustrating another configuration example of a communication system to which the present invention is applied. With the communication system 900 shown in FIG. 30, four transmission devices 910-1 through 910-4 and five reception devices 920-1 through 920-5 perform multiplex communication over the communication medium 930 using time division.

The transmission device 910-1 corresponds to the transmission device 110 in FIG. 1, having a transmission signal electrode 911 and transmission reference electrode 912, and further has a time control unit 913, a multiplier 914, an oscillator 915, and an amplifier 916, as a configuration corresponding to the transmission unit 113.

The time control unit 913 outputs original signals at a predetermined time. The multiplier 914 multiplies the original signals with the oscillation signals generated by the oscillator 915 at the multiplier 914, which are then output from the amplifier 916 (filtered as suitable). One output of the multiplier 916 is connected to the transmission signal electrode 911, and the other is connected to the transmission reference electrode 912.

The transmission device 910-2 through transmission device 910-4 are of the same configuration, and the description of the above reception device 910-1 is applicable thereto, so description thereof will be omitted.

The reception device 920-1 corresponds to the reception device 120 in FIG. 1, having a reception signal electrode 921 and reception reference electrode 922, and further has an amplifier 923, multiplier 924, oscillator 925, and an original signal supply unit 926, as a configuration corresponding to the reception unit 123.

The reception device 920-1 first restores electric signals based on the method of the invention, and then restores the original signals (signals supplied from the original time control unit 913) by processing reverse to that of the transmission device 910-1.

Figure 31:
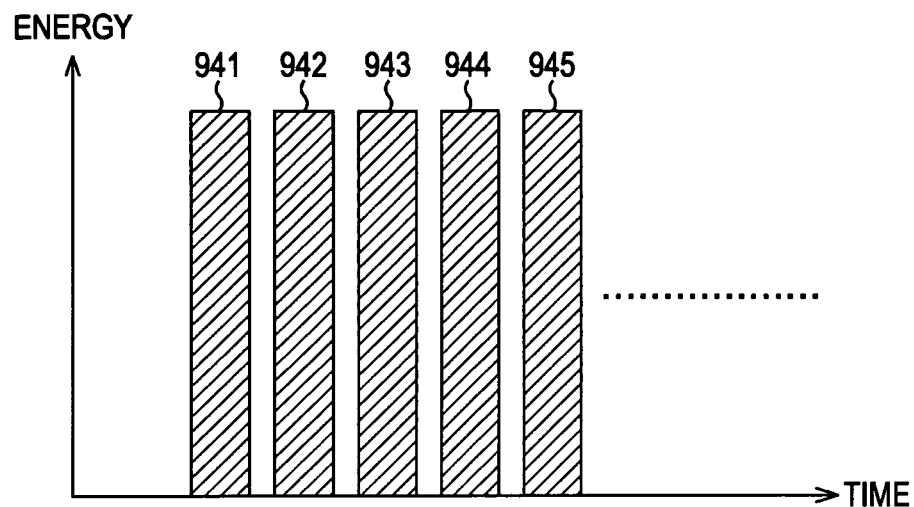
FIG. 31 is a diagram illustrating an example of temporal distribution of signals.

FIG. 31 shows a spectrum example on a time axis according to this method. The horizontal axis represents time, and the vertical axis represents energy. Note that in order to facilitate description, an example is shown wherein the entirety has been divided into five time regions 941 through 945, but in reality, subsequent time regions continue in the same way. The time regions thus divided are used for communication on differing communication paths. That is to say, the transmission device 910 (reception device 920) of the communication system 900 uses time regions differing for each communication path, so that crosstalk is suppressed and multiple communications can be performed over a single communication medium 930, as shown in FIG. 30. In FIG. 30, path 931 through path 935 represent communication paths on the communication medium 930. Also, using time division means that the communication system 900 can perform many-to-one communication as indicated by path 931 and path 932, and many-to-many communication.

Now, the time widths of the time regions which the communication system 900 (transmission device 910 or reception device 920) performs division of may be different from each other.

Further, as a method other than the above-described, two or more of the first through third communication methods may be combined.

The fact that the transmission device and reception device can perform simultaneous communication with multiple other devices is particularly important with particular applications. For example, assuming application to tickets for mass transit systems, various handy applications can be made, such as at the time of a user having both a device A holding information of a pass and a device B having an electronic money function pasting through an automatic wicket, communication can be simultaneously made with both device A and device B by using a method such as described above, so in the event that the route which the user has used includes a section other than that covered by the pass of the user, the difference in fee can be deducted from the electronic money in the device B.

Figure 32:
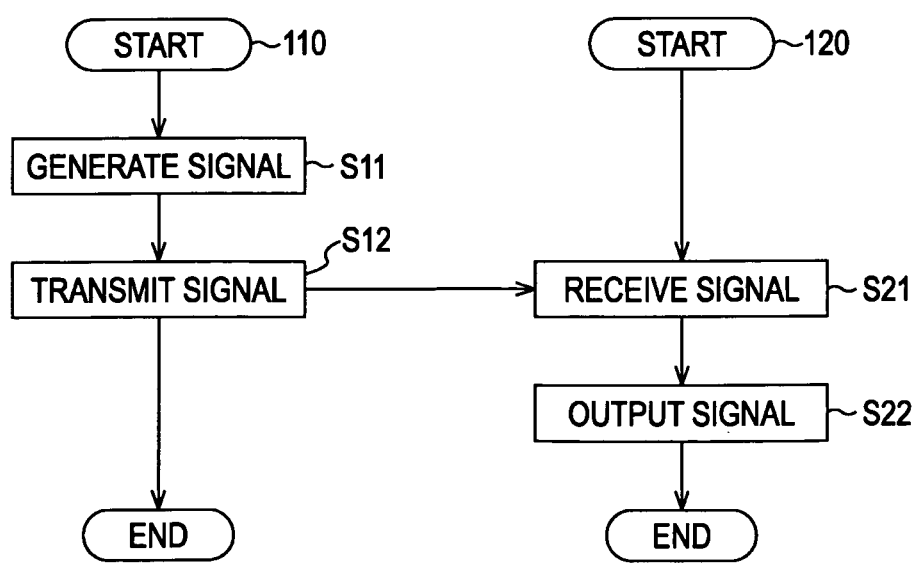
FIG. 32 is a flowchart illustrating an example of the flow of communication processing.

The flow of communication processing executed in the communication between the transmission device and reception device such as described above will be described with reference to the flowchart shown in FIG. 32, by way of an example of the transmission device 110 and reception device 120 of the communication system 100 shown in FIG. 1.

In step S1, the transmission unit 113 of the transmission device 110 generates a signal to be transmitted, and in step S2, the generated signal is transmitted onto the communication medium via the transmission signal electrode 111. The transmission unit 113 of the transmission device transmitting the signal ends communication processing. The signal transmitted from the transmission device 110 is supplied to the reception device 120 via the communication medium 130. The reception unit 123 of the reception device 120 receives the signal via the reception signal electrode 121 in step S21, and in step S22 outputs the received signal. The reception unit 123 which has output the received signal ends the communication processing.

As described above, the transmission device 110 and the reception device 120 do not need to have a closed circuit configured using reference electrodes, and stable communication processing can be easily performed without being affected by the environment, simply by exchanging signals via the signal electrodes. Note that the structure of communication processing is simple, so the communication system 100 can be easily used along with a wide variety of communication methods, such as modulation, encoding, encryption, multiplexing, and so forth.

Now, while description has been made in the above communication system that the transmission device and the reception device are configured as separate entities, other arrangements may be made, and the communication system may be configured using a transmission/reception device having both functions of the transmission device and the reception device.

Figure 33:
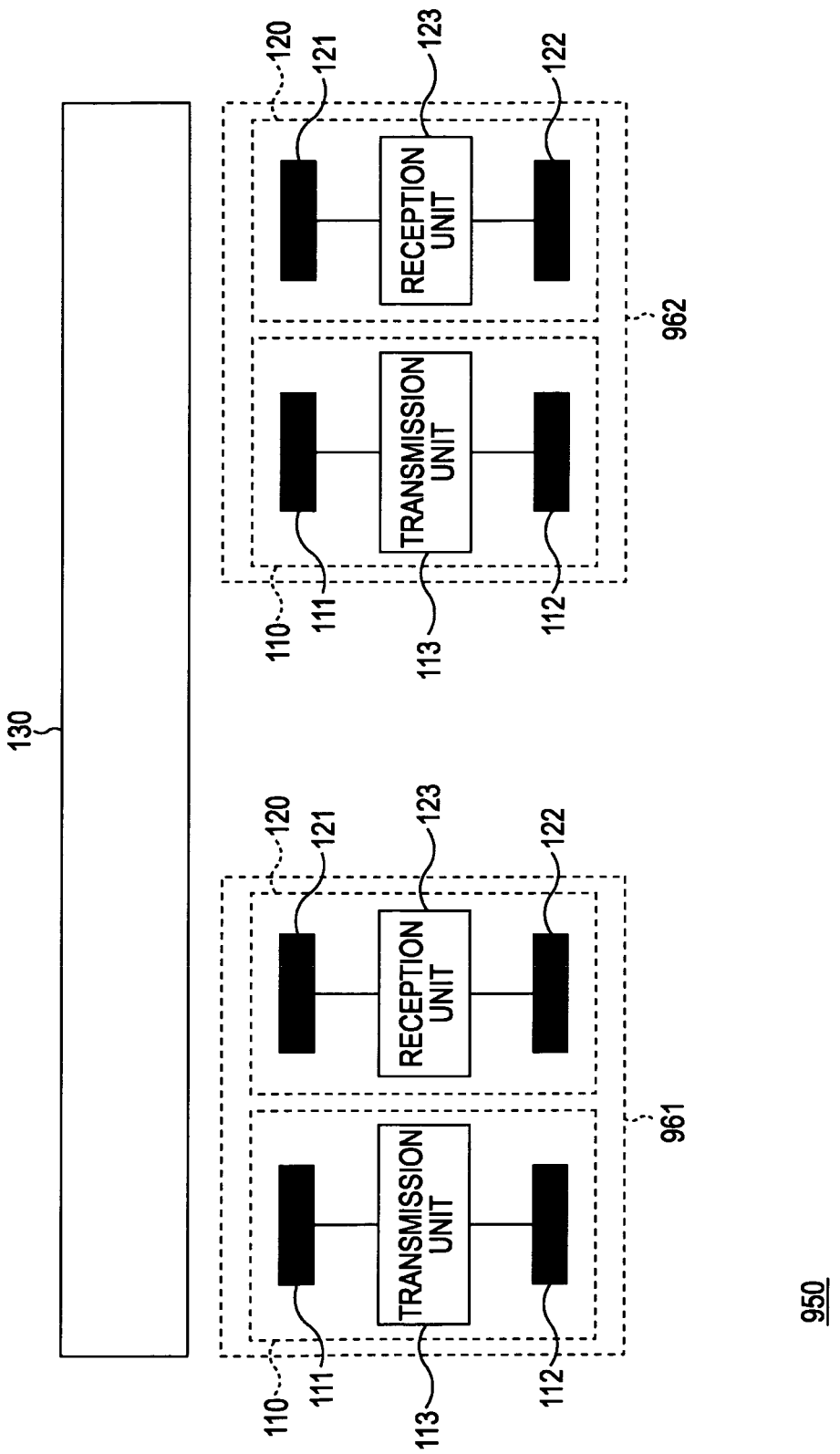
FIG. 33 is a diagram illustrating yet another configuration example of a communication system to which the present invention is applied.

FIG. 33 is a diagram illustrating another configuration example of the communication system to which the present invention is applied.

In FIG. 33, the communication system 950 has a transmission/reception device 961, a transmission/reception device 962, and a communication medium 130. The communication system 950 is a system wherein the transmission/reception device 961 and the transmission/reception device 962 bi-directionally exchange signals via the communication medium 130.

The transmission/reception device 961 has the configuration of both a transmission unit 110 the same as the transmission device 110 in FIG. 1, and a reception unit 120 the same as the reception device 120. That is to say, the transmission/reception device 961 has a transmission electrode 111, transmission reference electrode 112, transmission unit 113, reception electrode 121, reception reference electrode 122, and reception unit 123.

That is to say, the transmission/reception device 961 transmits signals over the communication medium 130 using the transmission unit 110, and receives signals supplied thereto via the communication medium 130 using the reception unit 120. As described above, multiplex communication can be made with the communication method of the present invention, so an arrangement may be made wherein communication by the transmission unit 110 and communication with the reception unit 120 occur simultaneously (temporally mostly overlapping).

The transmission/reception device 962 has the same configuration as the transmission/reception device 961, and operates in the same way, so description thereof will be omitted. That is to say, the transmission/reception device 961 and the transmission/reception device 962 communicate bi-directionally over the communication medium 130 with the same method as each other.

Thus, the communication system 950 (transmission/reception device 961 and transmission/reception device 962) can easily realize bi-directional communication not restricted by the usage environment.

Note that the transmission/reception device 961 and the transmission/reception device 962 may also be electrically connected to the communication medium by transmission signal electrodes and reception signals electrodes, as with the transmission device and reception device described with reference to FIG. 23 (provided as a contact point 741 or contact point 742). Also, through description has been made regarding a configuration wherein the transmission signal electrode 111, transmission reference electrode 112, reception signal electrode 121, and reception reference electrode 122, are configured as mutually separate entities, but arrangements may be made not restricted to this, and for example, the transmission signal electrode 111 and the reception signal electrode 121 may be configured as a single electrode, or the transmission reference electrode 112 and the reception reference electrode 122 may be configured as a single electrode (such that the transmission unit 113 and reception unit 123 share signal electrodes or reference electrodes).

Further, while description has been made above that the devices of the communication system to which the present invention is applied (transmission device, reception device, and communication device) each have the reference potential within the device connected to a reference electrode, but arrangements may be made not restricted to this, and may be configured of a differential circuit operating under two signals with different phases, or connecting one signal of a differential circuit to the signal electrode to effect transmission to the communication medium, and connecting the other signal of the differential circuit to the reference electrode, whereby transmission of information can also be enabled.

Figure 34:
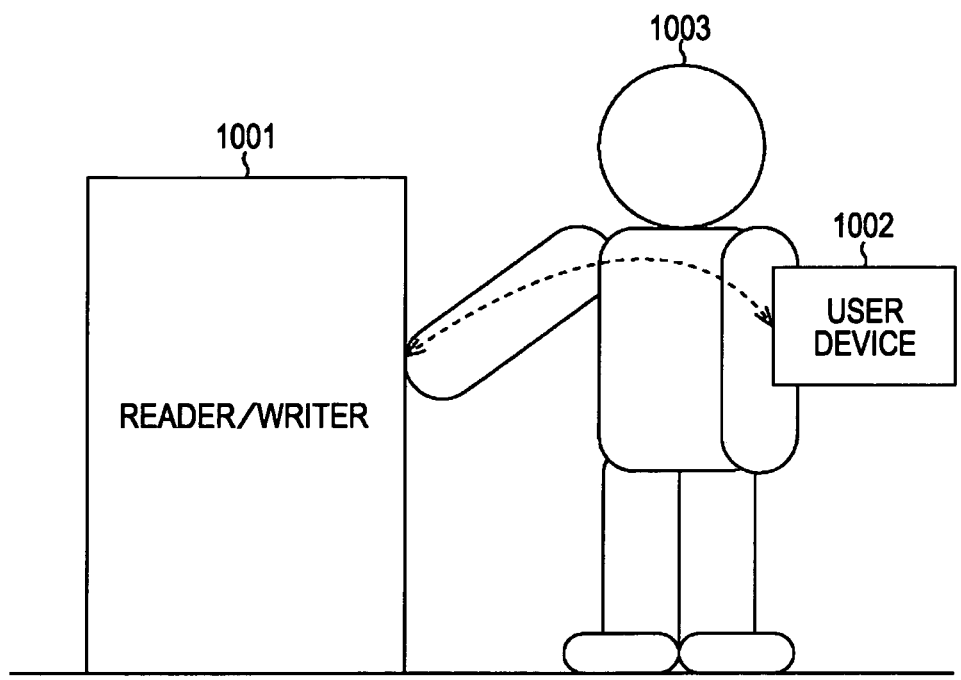
FIG. 34 is a diagram illustrating an actual usage example of an embodiment of a communication system to which the present invention is applied.

Next, a communication system to which the present invention is applied will be described. FIG. 34 is a diagram illustrating a configuration example according to an embodiment of the communication system to which the present invention is applied.

The communication system 1000 shown in FIG. 34 is a communication system wherein a reader/writer 1001 and a user device 1002 perform communication via a user 1003 (human body), and is a communication system such as described above, wherein there is no need to configured a closed circuit using reference electrodes, and stable communication processing unaffected by the environment can be easily performed simply by exchanging signals via the signal electrodes. That is to say, the communication system 1000 is a communication system which performs communication with the same method as that of the communication system 100 shown in FIG. 1.

The reader/writer 1001 is installed in various facilities, such as train stations, shops, banks, and so forth, and is a device for providing the user 1003 with predetermined services, such as for example, wicket processing, payment processing, balance inquiry processing, and so forth. The user device 1002 is a communication device which the user 1003 has, and is a communication device capable of performing communication with the reader/writer 1001 via the human body. The user device 1002 is, for example, fixed to the arm of the user 1003 with a belt of the like, so as to be capable of communication. As described later, the reader/writer 1001 performs communication with the user device 1002 via the user 1003 who has made contact with (including coming close to) a predetermined position on the reader/writer 1001 while holding the user device 1002, and provides predetermined services to the user 1003 (the user device 1002). It should be noted that in the subsequent description, the phrase "contact" is to be understood to include the concept of "approaching" (i.e., being positioned in a communicable range).

Figure 35:
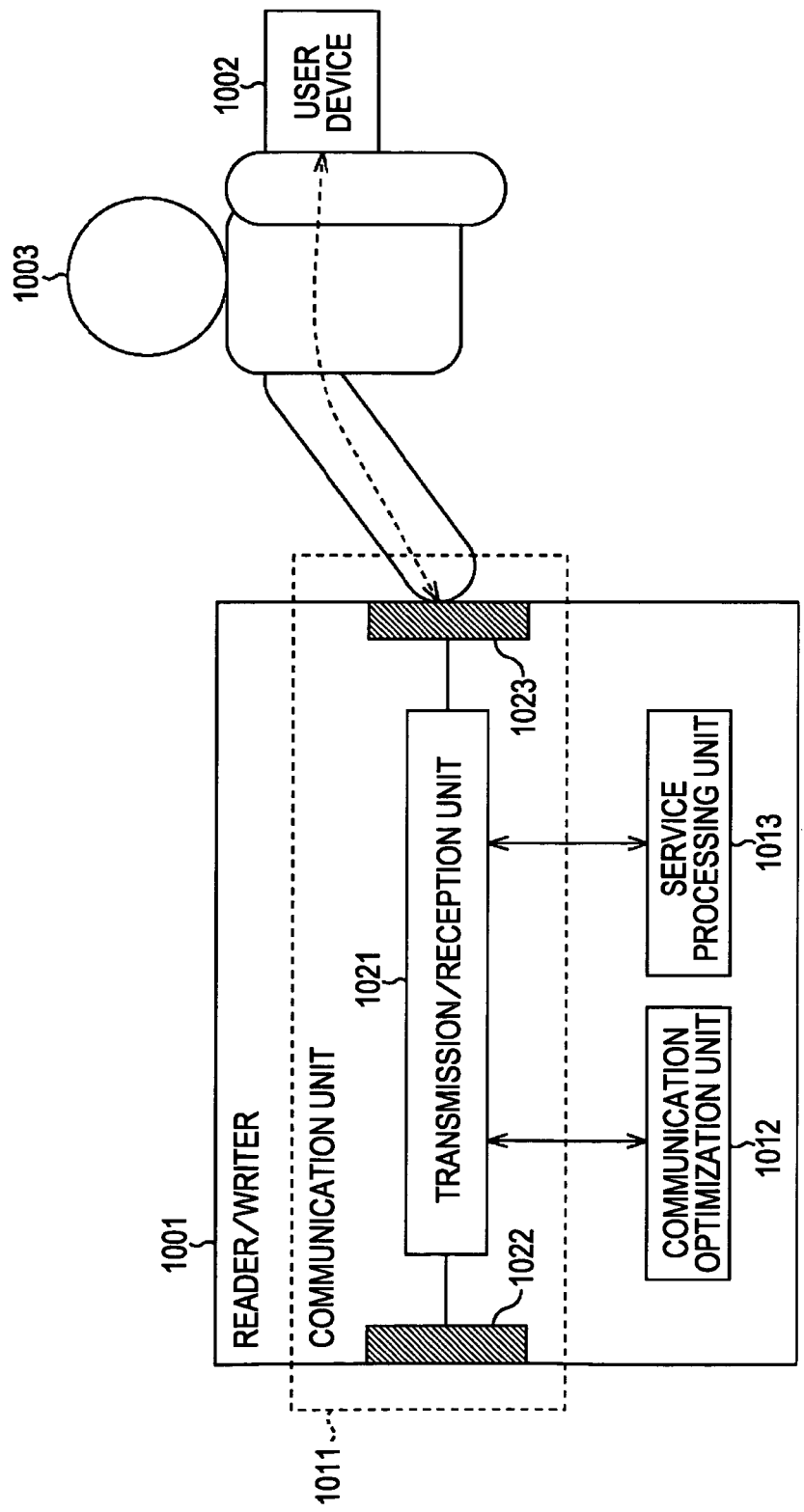
FIG. 35 is a block diagram illustrating a configuration example of within a reader/writer shown in FIG. 34.

FIG. 35 is a block diagram illustrating an internal configuration example of the reader/writer 1001.

The reader/writer 1001 includes a communication unit 1011, communication optimization unit 1012, and a service processing unit 1013.

The communication unit 1011 performs processing relating to communication with the user device 1002 which is performed via the human body (the user 1003 in the case of the example in FIG. 35). The communication unit 1011 has a transmission/reception unit 1021, reference electrode 1022, and signal electrode 1023, and performs communication with the user device 1002 of the user 1003 via the user 1003 in contact with the signal electrode 1023.

That is to say, for example, a message to the user 1003 to which a service is to be provided is displayed or inscribed on the casing to the reader/writer 1001, to come into contact with the signal electrode 1023 (one electrode of the two electrodes connected to the transmission/reception unit 1021), and the user 1003 who has the user device 1002 touches the signal electrode 1023 in accordance with the instruction. In this state, the communication unit 1011 of the reader/writer 1001 performs communication with the user device 1002 via the human body of the user 1003 from the signal electrode 1023.

That is to say, the transmission/reception unit 1021 in FIG. 35 corresponds to the transmission unit 113 and reception unit 123 for example, the reference electrode 1022 corresponds to the transmission reference electrode 112 and the reception reference electrode 122 for example, and the signal electrode 1023 corresponds to the transmission signal electrode 111 and the reception signal electrode 121. That is to say, the capacitance formed between the signal electrode 1023 and the human body to serve as the communication medium (the user 1003 in the case of the example in FIG. 35) is greater than the capacitance formed between the reference electrode 1022 and the communication medium (human body).

The transmission/reception unit 1021 performs actions such as generating transmission signals and detecting signals received from the signal electrode 1023. The communication optimization unit 1012 is connected to the transmission/reception unit 1021, to optimize settings relating to communication with the transmission/reception unit 1021 based on usage (processing contents) and functions, control the transmission/reception unit 1021 based on the optimized settings, and execute communication processing with a more preferable method (settings). Also, the service processing unit 1013 is connected to the transmission/reception unit 1021, to perform processing relating to services, provided using the communication processing regarding which the communication optimization unit 1012 has optimized, executed by the transmission/reception unit 1021.

Figure 36:
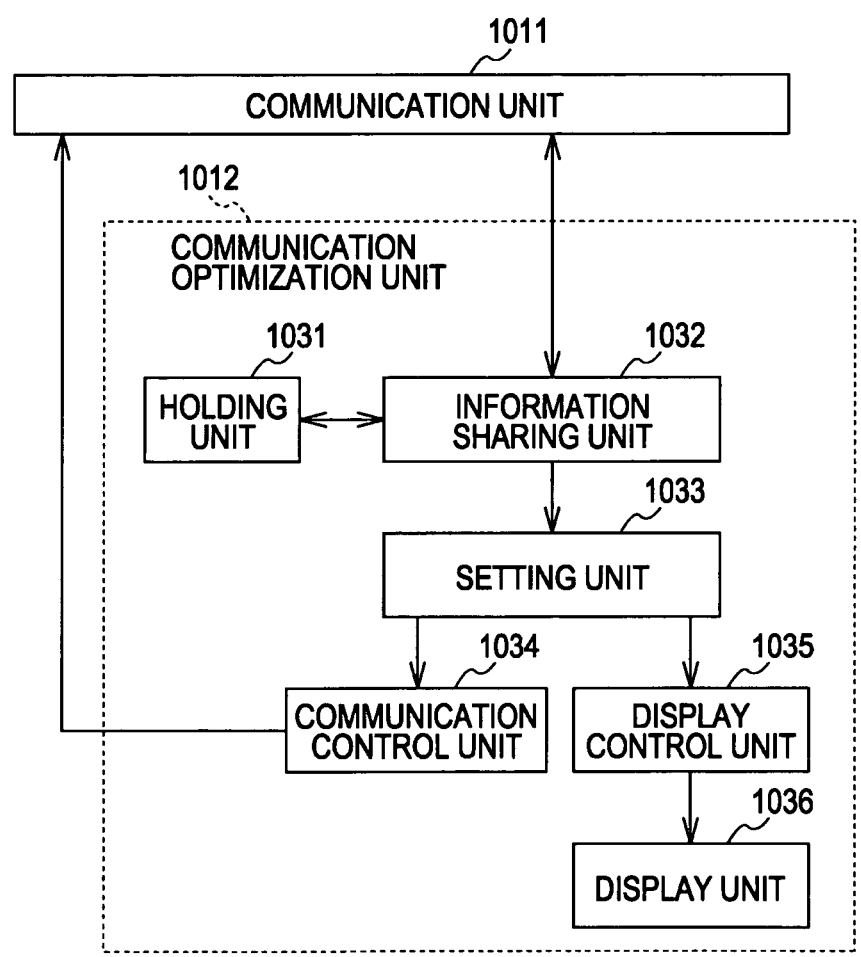
FIG. 36 is a block diagram illustrating a detailed configuration example of a communication optimizing unit shown in FIG. 35.

FIG. 36 is a block diagram illustrating a detailed configuration example of the communication optimization unit 1012.

In FIG. 36, the communication optimization unit 1012 has a holding unit 1031, information sharing unit 1032, setting unit 1033, communication control unit 1034, display control unit 1035, and display unit 1036.

The holding unit 1031 has recording media (storage region) such as semiconductor memory or a hard disk or the like for example, and holds reader/writer attribute information which is information relating to the functions, usage, etc., of the reader/writer 1001. The reader/writer attribute information will be described in detail later. The holding unit 1031 supplies the reader/writer attribute information held therein to the information sharing unit 1032, based on a request from the information sharing unit 1032, for example.

The information sharing unit 1032 performs processing for sharing attribute information with a user device 1002 which is in a communicable state with the reader/writer 1001. For example, the information sharing unit 1032 obtains the reader/writer attribute information held in the holding unit 1031 based on a request from the user device 1002, and supplies this to the user device 1002. Also for example, the information sharing unit 1032 requests user device attribute information, which is attribute information of the user device, from the user device 1002, obtains the user device attribute information supplied in response to the request, and supplies this to the setting unit 1033. Details of the information sharing unit 1032 will be described later.

The setting unit 1033 is a processing unit which performs settings regarding communication processing, wherein settings are made based on the user device attribute information supplied from the information sharing unit 1032, with the setting results being supplied to the communication control unit 1034 and display control unit 1035. Details of the setting unit 1033 will be described later.

The communication control unit 1034 controls the communication unit 1011 based on the setting values supplied from the setting unit 1033. Details of the communication control unit 1034 will be described later. Also, the display control unit 1035 controls the display unit 1036, and displays information (messages and the like) relating to the setting values supplied from the setting unit 1033, as necessary.

For example, in a case where communication processing needs to be performed in a stable manner, the display control unit 1035 displays a message to the user 1003 on the display unit 1036, such as "firmly press the card" or the like. Also, in the event that there is insufficient power supply of the user device 1002 (remaining power is small), the display control unit 1035 displays a message to the user 1003 on the display unit 1036, such as "Processing will take some time. Please wait" or the like.

The display unit 1036 has for example, an LCD (Liquid Crystal Display), organic EL (Electroluminescence) display, FED (Field Emission Display), PDP (Plasma Display Panel), electro chromic display, display device using fluorescent display tubes, CRT (Cathode Ray Tube) display devices, devices having display functions such as projectors, or the like, and displays message, images, etc., based on control of the display control unit 1035.

Next, a specific configuration example of the components shown in FIG. 36 will be described.

Figure 37:
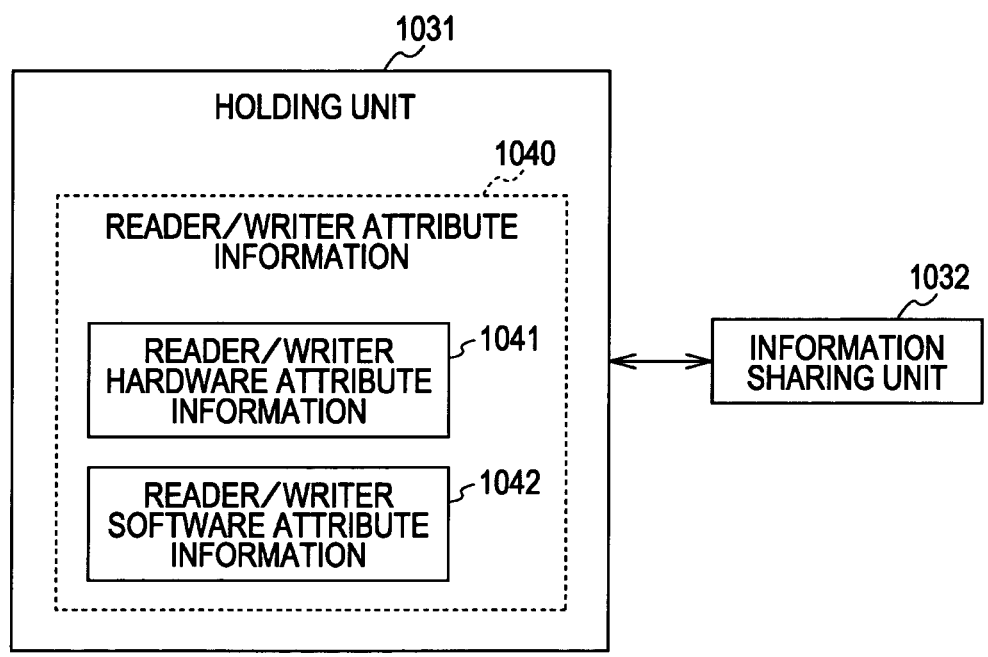
FIG. 37 is a schematic diagram illustrating a configuration example of information held by a holding unit shown in FIG. 36.

FIG. 37 is a schematic diagram illustrating a configuration example of the information which the holding unit 1031 holds.

In FIG. 37, the holding unit 1031 holds reader/writer attribute information 1040 which is information relating to the functions and usage and the like of the reader/writer 1001. The reader/writer attribute information 1040 includes reader/writer hardware attribute information 1041 which is information relating to the functions (hardware restrictions) of the reader/writer 1001, and reader/writer software attribute information 1042 which is information relating to the usage (software) of the reader/writer 1001.

The reader/writer attribute information 1041 is table information configured of item information and attribute values thereof, as shown in FIG. 38A for example. Items include the types of functions of the hardware, e.g., "processing speed" which indicates the capabilities relating to settings of the speed (operating frequency) for processing relating to communication, "transmission power" indicating signal transmission capabilities, "reception sensitivity" indicating signal reception capabilities, "power feed capability" indicating whether or not power can be supplied to the user device 1002. Values indicating the capabilities of each of the items (capability limits of hardware) are used for the attribute values, for example. In the case shown in FIG. 38A, attributes values are "0" indicating that the attribute value of the corresponding item is fixed to the lowest level (is a fixed value), "1" indicating that the attribute value of the corresponding item is fixed to a middle level (is a fixed value), "2" indicating that the attribute value of the corresponding item is fixed to the highest level (is a fixed value), and "3" indicating that the attribute value of the corresponding item is variable. Note that the sectioning method of sectioning with the values "0" through "3" does not apply to the attribute value corresponding to "power feed capability". For example, one of a value "0" indicating that there is no power feed capability, or a value "1" indicating that there is a power feed capability, is assigned.

Note that while FIG. 38A illustrates one example of values assigned as attribute values, each of the attribute values "0" through "3" in the case of FIG. 38) are assigned to each item. Of course, attribute values may be any sort of values, and the values may have any meaning assigned thereto. Moreover, what the attribute values assigned to each of the items mean may be different one from another. For example, in the example shown in FIG. 38A, an arrangement may be made wherein one of the values shown in FIG. 38A are assigned to the attribute values from the processing speed through reception sensitivity, with attribute value for the bottom item "power supply capability" alone having a different system, where "0" indicates no power supply capability and "1" indicate a power supply capability.

As shown in FIG. 38B, the reader/writer software attribute information 1042 is table information configured of item information and attribute values thereof. Item information is information indicating the types of services provided by the reader/writer 1001 (usage of the reader/writer 1001), i.e., information indicating the contents of software which the reader/writer 1001 executes. Examples include "wicket processing", "payment processing", "balance inquiry processing", as shown in FIG. 38B. This item information may indicate the overall services which the reader/writer 1001 provides for example, or may be information indicating detailed processing included in the services (e.g., communication, billing, display, etc.), or may include both (that is to say, the contents indicated by the items may be hierarchically organized).

As for attribute values, values indicating the hardware settings for each of the items (usages) are assigned (e.g., combinations of setting values, such as the above-described "processing speed", "transmission power", "reception sensitivity", "power feed capability", and so forth). That is to say, while in the example shown in FIG. 88B values indicating "processing speed low, transmission power low, reception sensitivity high, power feed capability: no" are assigned as attributes to the item "balance inquiry processing" of the reader/writer software attribute information 1042 these attribute values do not mean that the processing speed of this reader/writer 1001 is slow, but rather mean that the processing speed is set to slow for balance inquiry processing. Accordingly, the attribute values of the same elements differ according to the item (usage), such as the processing speed value being "low" or "high" depending on the usage.

This is due to the fact that the optimal processing method may not always be the same for different processing (usages) to be executed. For example, with "wicket processing", users will be passing through a wicket in rapid succession, so processing needs to be performed at high speed. Accordingly, in the example in FIG. 38B, the processing speed is set to high. Further, the transmission power and repletion sensitivity are set to high, so that the communicable range will be wider. Conversely, with "payment processing", the processing speed may be relatively slow, but sureness of communication processing is demanded. Also, the communication range is intentionally restricted, since there is the need to limit the user regarding which processing is to be performed, from the perspective of security. Accordingly, in the example in FIG. 38B, the processing speed is set to low, and the transmission power is set to low, but repletion sensitivity is set to high. Thus, the attribute values of the reader/writer software attribute information 1042 have setting values for optimizing the functions (elements) according to usage assigned beforehand.

Of course, the contents of the elements regarding which attribute values are to be set are not restricted to those shown in FIG. 38B, and further, the values to be assigned to the elements can also be optionally set.

Now, returning to FIG. 37, the holding unit 1031 holding the reader/writer attribute information 1040 including the reader/writer hardware attribute information 1041 and the reader/writer software attribute information 1042 provides such information based on requests from the information sharing unit 1032.

Note that the reader/writer attribute information only needs to include at least one of the reader/writer hardware attribute information 1041 and the reader/writer software attribute information 1042. Also, the holding unit 1031 may supply the information sharing unit 1032 with all of the reader/writer attribute information 1040 it holds, or just information requested from the information sharing unit 1032. That is to say, the holding unit 1031 can extract just a part of the reader/writer attribute information 1040 (a part of the reader/writer hardware attribute information 1041, a part of the reader/writer software attribute information 1042, or a combination thereof) and supply this to the information sharing unit 1032. Further, an arrangement may be made wherein the holding unit 1031 supplies information to the information sharing unit 1032 other than upon requests from the information sharing unit 1032, such as at predetermined timings or events.

Figure 39:
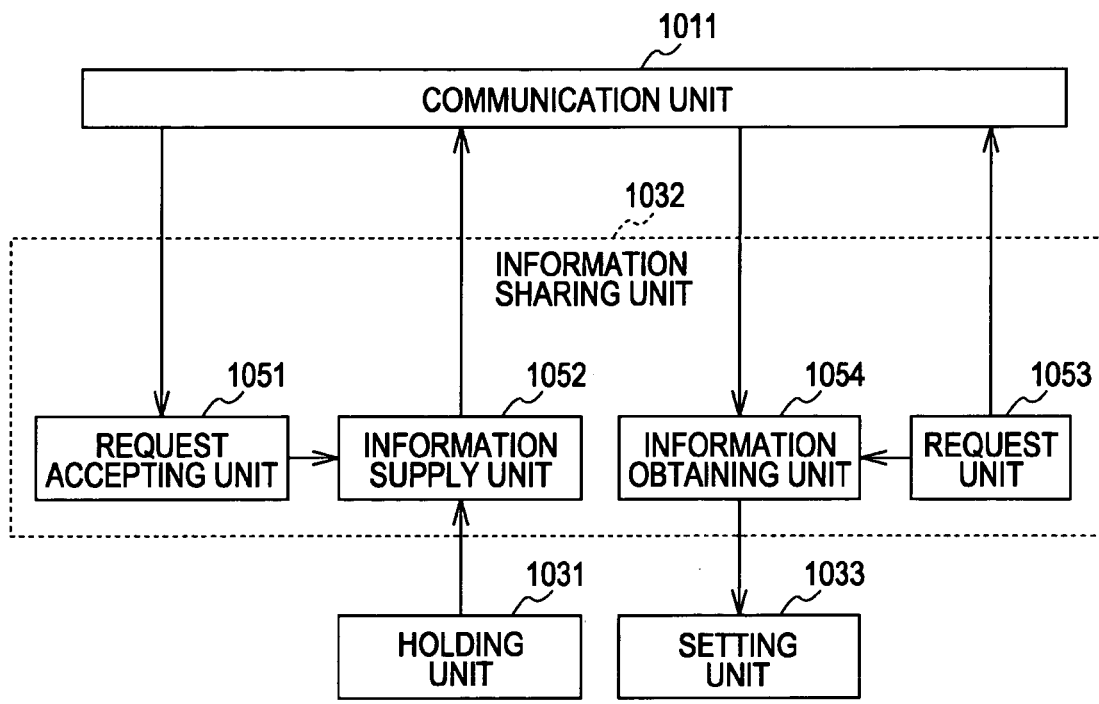
FIG. 39 is a block diagram illustrating a detailed configuration example of an information sharing unit shown in FIG. 36.

FIG. 39 is a block diagram illustrating a detailed configuration example of the information sharing unit 1032 shown in FIG. 36.

In FIG. 39, the information sharing unit 1032 includes a request accepting unit 1051, information supply unit 1052, request unit 1053, and information obtaining unit 1054.

The request accepting unit 1051 controls the communication unit 1011 to perform processing for accepting a request for reader/writer attribute information 1040 supplied from another device (in the case of the example shown in FIG. 34, the user device 1002). Once the request is accepted, the request accepting unit 1051 notifies the information supply unit to that effect.

The information supply unit 1052 controls the communication device 1011 to perform processing for supplying the reader/writer attribute information to another device (in the case of the example shown in FIG. 34, the user device 1002). For example, upon being notified from the request accepting unit 1051 that a request has been accepted for reader/writer attribute information 1040, the information supply unit 1052 reads out the reader/writer attribute information 1040 requested in the accepted request, from the information held by the holding unit 1031, and controls the communication unit 1011 so as to supply the reader/writer attribute information 1040 that has been read out to the requesting source (in the case of the example shown in FIG. 34, the user device 1002).

The request unit 1053 controls the communication unit 1011 at a predetermined timing so as to transmit the request for attribute information to another communicable device (in the case of the example shown in FIG. 34, the user device 1002). That timing at which the request unit 1053 transmits the attribute information request may be any sort of timing, and may be an arrangement wherein a request is transmitted being triggered by a predetermined event, or may be autonomously transmitted, periodically or non-periodically. Upon the request unit 1053 transmitting a request, the request unit 1053 makes a notification to the information obtaining unit 1054 to that effect.

Upon receiving the notification for the request unit 1053 for example, the information obtaining unit 1054 controls the communication unit 1011 so as to start obtaining of attribute information. Upon the attribute information being obtained via the communication unit 1011, this is supplied to the setting unit 1033.

Note that one or both of the request accepting unit 1051 and request unit 1053 may be omitted from the configuration. For example, an arrangement may be made wherein the request accenting unit 1051 is omitted, and the information supply unit 1052 obtains reader/writer attribute information 1040 from the holding unit 1031 at a predetermined timing or by being triggered by a predetermined event, with the communication unit 1011 being controlled so as to transmit the reader/writer attribute information 1040 to another device (in the case of the example shown in FIG. 34, the user device 1002). Also, an arrangement may be made wherein the request unit 1053 is omitted, with the information obtaining unit 1054 constantly controlling the communication unit 1011 so as to accept attribute information (user device attribute information) of another device (in the case of the example shown in FIG. 34, the user device 1002), and the attribute information supplied from the other device being obtained and supplied to the setting unit 1033.

Further, the information obtaining unit 1054 may be arranged to obtain reader/writer attribute information 1040 held by the holding unit 1031, and supply this to the setting unit 1033. That is to say, in this case, the setting unit 1033 performs settings for communication using not only the attribute information of the other device (e.g., user device attribute information), but also uses the attribute information of the reader/writer 1001 itself (reader/writer attribute information 1040).

Figure 40:
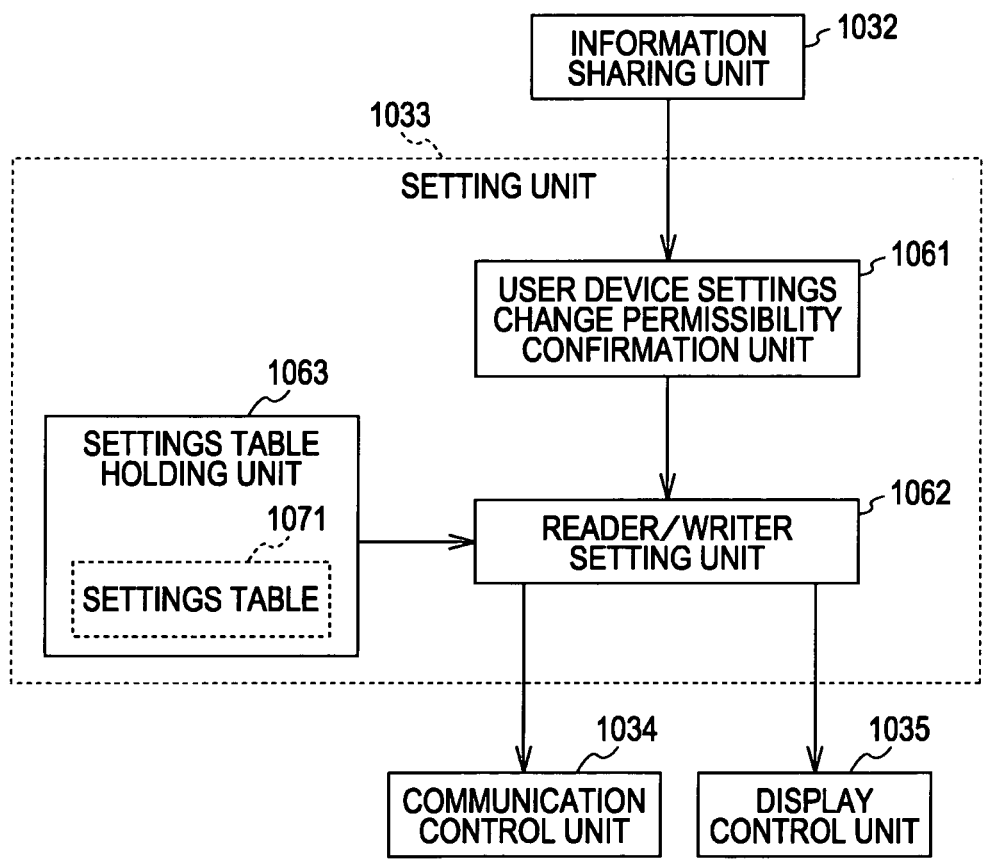
FIG. 40 is a block diagram illustrating a detailed configuration example of a setting unit shown in FIG. 36.

FIG. 40 is a block diagram illustrating a detailed configuration example of the setting unit 1033 shown in FIG. 36.

In FIG. 40, the setting unit 1033 has a user device settings change permissibility confirmation unit 1061, and reader/writer setting unit 1062, and a settings table holding unit 1063.

The user device settings change permissibility confirmation unit 1061 confirms whether or not the user device, which is another device serving as the other part of communication, is capable of changing settings, based on the attribute information of the other device supplied from the information sharing until 1032 (user device attribute information), or both the other device attribute information and the attribute information of the reader/writer 1001 itself.

For example, in the event that the processing speed of the user device 1002 is unchangeable, there may be cases wherein restrictions are needed on the setting range of processing speed of the reader/writer 1001, in order to perform communication processing in a sure manner. For example, even in cases wherein the transmission power setting value of the user device 1002 is too low for example, and the setting value of the user device 1002 is a fixed value, there may be cases wherein the reception sensitivity of the reader/writer 1001 needs to be raised instead of increasing the transmission power of the user device 1002.

Thus, the setting method of the attribute values of the reader/writer 1001 may change, depending on whether the attribute values of the other device (user device) are changeable or not. Accordingly, the user device settings change permissibility confirmation unit 1061 confirms whether or not the settings of the user device are changeable, and supplies the confirmation results to the reader/writer setting until 1062 along with the user device attribute information.

Note that as described above, at the time of the user device settings change permissibility confirmation unit 1061 confirming whether or not the settings of the user device are changeable, reference may be made to the reader/writer attribute information 1040 of the reader/writer 1001 itself, so as to further confirm whether or not settings corresponding to the attribute values are changeable at the reader/writer side. In this case, the user device settings change permissibility confirmation unit 1061 supplies confirmation results to the reader/writer setting unit 1062 along with the user device attribute information and the reader/writer attribute information 1040.

The reader/writer setting unit 1062 obtains the settings table 1071 held in the settings table holding unit 1063, and performs settings based on the settings table 1071 and the user device attribute information and the settings change permissibility confirmation results supplied from the user device settings change permissibility confirmation unit 1061. As described later, the settings table 1071 is table information for selecting setting values according to conditions, and the reader/writer setting unit 1062 selects settings corresponding to the user device attribute information and the settings change permissibility confirmation results from the settings table 1071. The reader/writer setting until 1062 supplies the setting results to at least one of the communication control unit 1034 and the display control unit 1035, as necessary.

Note that in the event that the user device settings change permissibility confirmation unit 1061 supplies the user device attribute information and the reader/writer attribute information 1040 along with the configuration results, the reader/writer setting unit 1062 may perform settings based on both the user device attribute information and the reader/writer attribute information 1040 (or select one and take the selected attribute information), and the settings table 1071.

The settings table holding unit 1063 has recording media (storage region) such as semiconductor memory or a hard disk or the like for example, and holds the settings table 1071 which is table information for performing settings regarding communication of the reader/writer 1001, as illustrated in FIG. 41.

FIG. 41 is a table diagram illustrating a configuration example of the settings table 1071.

In the case of the example shown in FIG. 41, the settings table 1071 is classified in the vertical direction in the drawing according to the usage this time, with the three usages of "wicket processing", "payment processing", and "balance inquiry processing" being shown. Also, the settings table 1071 is classified by hardware restrictions of the user device 1002 in the horizontal direction in the drawing, classified into the three hardware restrictions of "external power source type user device" which has no power source, "internal power source type user device (with sufficient power)" wherein there is a power source with sufficient power, and "internal power source type user device (with insufficient power)" wherein there is a power source but not sufficient power.

Setting values are assigned to each of the states classified according to the conditions. The reader/writer setting unit 1062 uses the settings table 1071 to select the communication settings. At this time, the reader/writer setting unit 1062 selects the communication settings while also taking into consideration the settings change permissibility confirmation results and the capabilities of the reader/writer 1001 itself as well.

Thus, the reader/writer 1001 can perform suitable power supply control, such as supplying power to the user device 1002 which has no power source, and stopping power supply to the user device 1002 which has a power source built in, thereby suppressing power consumption.

Also, the reader/writer 1001 can perform settings such that even in the event that the user device 1002 does not have a power source or is low on power, such that the processing speed is lower or transmission power is stronger or the reception sensitivity is stronger, thereby enabling communication even if the processing speed of the user device 1002 is slow and the transmission power and reception sensitivity are weak.

Further, in the event that the usage (content of processing) is balance inquiry processing for example, the reader/writer 1001 can restrict the communication range by making the reception sensitivity weaker or the like.

By making such setting processing, the reader/writer 1001 can select optimal settings based on the usage and hardware restrictions and the like, thereby suppressing electric power consumption of the reader/writer 1001 or the user device 1002, improving surety of communication, improving security of communication by restricting the communication range, reducing the communication processing time, and so forth, for example.

That is to say, the reader/writer 1001 can use communication processing optimized by the communication optimizing unit 1012 to provide services.

Now, which effects are optimal for communication may differ according to each communication. For example, in the case of payment processing, sureness and security are more important than processing speed, but in the case of wicket processing, high-speed processing is demanded. Also, depending on the type of the user device 1002, the a mount of electric power consumption may be important. Further, even in cases wherein control is made to perform communication in a sure manner, there are cases wherein the processing speed is more preferably reduced, cases wherein the transmission power is more preferably increased, cases wherein the reception sensitivity is more preferably increased, and so forth, so it can be understood that the optimal method may depend on the situation. Preset optimal communication settings for each such arbitrary condition are registered in the settings table 1071.

That is to say, the evaluation elements registered in the settings table 1071 as described above are but one example, and other evaluation elements may be registered such as real-time factors of the communication or device manufacturing costs or the like, or evaluation elements may differ for each condition. The contents set in the settings table 1071 are not restricted in any manner so long as they are assigned to the conditions beforehand, and may yield effects for any sort of evaluation elements.

Also note that the setting table holding unit 1063 does not need to hold all of the above-described settings table 1071, rather it is sufficient to hold the portion thereof corresponding to the hardware functions of the reader/writer 1001 itself, and usages (software to be executed). For example, in the event that a reader/writer 1001 is provided at a wicket device and only performs wicket processing (i.e., a case wherein no payment processing or balance inquiry processing is to be performed), the setting table holding unit 1063 only needs to hold the row of "wicket processing", which is the first item row from the top in the settings table 1071 shown in FIG. 41, and the second row "payment processing" and third row "balance inquiry processing" are unnecessary. This is because the reader/writer 1001 is incapable of performing "payment processing" and "balance inquiry processing", so settings cannot be made regarding these (the second and third rows in the table cannot be selected).

Also, in the event that the reader/writer 1001 does not have power supply functions to other devices, communication cannot be made with external power type user devices (i.e., the settings of the first column from the left cannot be selected). Accordingly, in this case, the setting table holding unit 1063 can omit the first column from the left, which is "external power source type user device" (i.e., only the second column "internal power source type user device (with sufficient power)" and "internal power source type user device (with insufficient power)" need to be held). That is to say, the various devices in the communication system 1000 (the reader/writer 1001 and the user device 1002) may have different contents in the settings tables held thereby.

Figure 42:
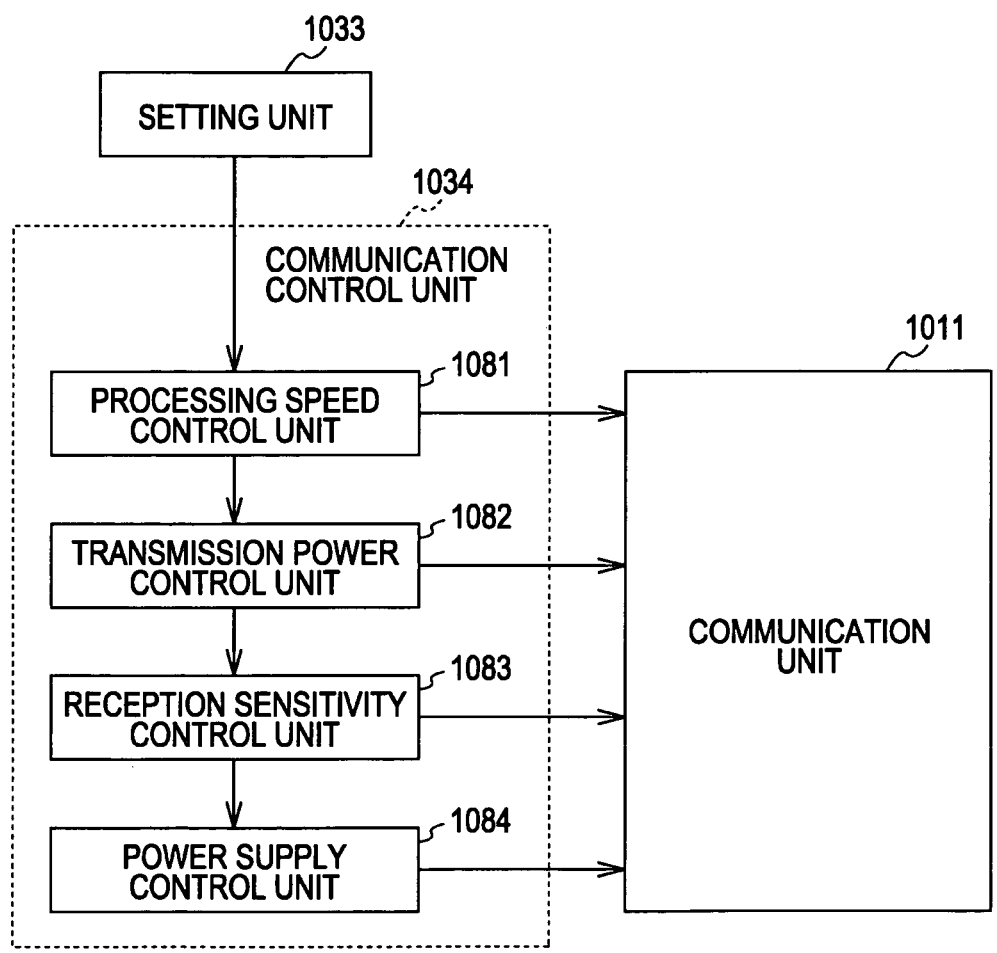
FIG. 42 is a block diagram illustrating a detailed configuration example of a communication control unit shown in FIG. 36.

FIG. 42 is a block diagram illustrating a detailed configuration example of the communication control unit 1034.

In FIG. 42, the communication control unit 1034 has a processing speed control unit 1081 for controlling the communication unit 1011 with regard to processing speed, a transmission power control unit 1082 for controlling the communication unit 1011 with regard to transmission power, a reception sensitivity control unit 1083 for controlling the communication unit 1011 with regard to reception sensitivity, and a power supply control unit 1084 for controlling the communication unit 1011 with regard to power supply.

That is to say, the communication control unit 1034 is a processing unit for controlling the communication unit 1011 based on the setting results (the settings selected based on the settings table 1071 supplied from the setting unit 1033, and has processing units for performing control processing corresponding to the elements of setting results (processing speed, transmission power, reception sensitivity, power supply, etc.) supplied from the setting unit 1033. That is to say, the detailed configuration of the communication control unit 1034 shown in FIG. 42 (processing speed control unit 1081, transmission power control unit 1082, reception sensitivity control unit 1083, and power supply control unit 1084) are but one example, and part or all of these may be omitted and the communication control unit 1034 may have other configurations, as long as corresponding to the setting results supplied from the setting unit 1033.

Figure 43:
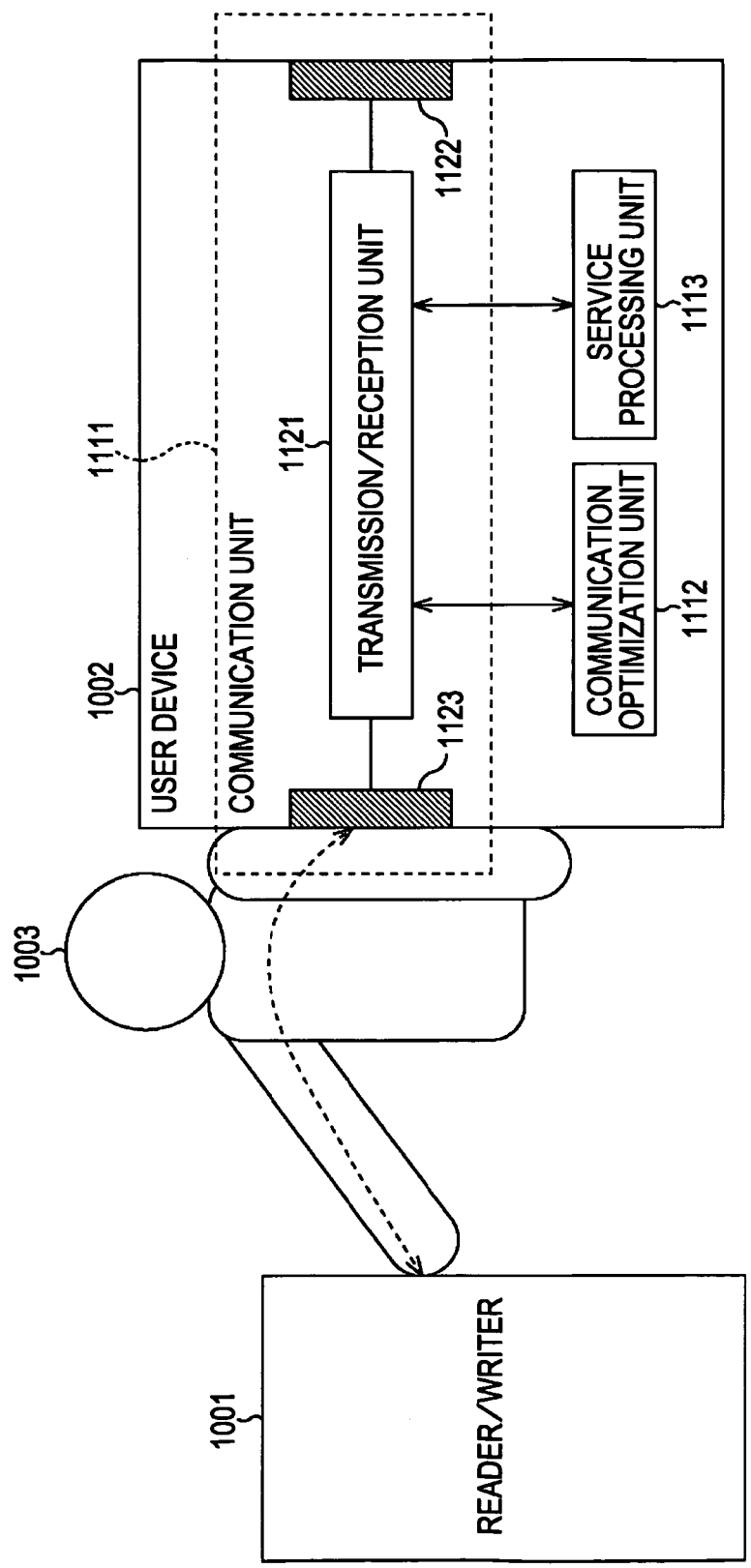
FIG. 43 is a block diagram illustrating a detailed configuration example of a user device shown in FIG. 34.

FIG. 43 is a block diagram illustrating a detailed configuration example of the user device 1002 shown in FIG. 34.

In FIG. 43, the user device 1002 has the same basic configuration as that of the reader/writer 1001 shown in FIG. 35, including a communication unit 1111, communication optimization unit 1112, and service processing unit 1113.

The communication unit 1111 performs processing relating to communication with the user device 1002 which is performed via the human body (the user 1003 in the case of the example in FIG. 35). The communication unit 1111 has a transmission/reception unit 1121, reference electrode 1122, and signal electrode 1123. The user device 1002 is disposed (worn by the user 1003) such that the transmission signal electrode 1123 is in contact with the user 1003. Upon the user 1003 coming into contact with a predetermined position on the reader/writer 1001 (e.g., the signal electrode 1023 shown in FIG. 35), the communication unit 1111 performs communication with the reader/writer 1001 via the user 1003.

That is to say, the transmission/reception unit 1121 shown in FIG. 43 corresponds to the transmission unit 113 and reception unit 123 for example, the reference electrode 1122 corresponds to the transmission reference electrode 112 and the reception reference electrode 122 for example, and the signal electrode 1123 corresponds to the transmission signal electrode 111 and the reception signal electrode 121. That is to say, the capacitance formed between the signal electrode 1123 and the human body to serve as the communication medium (the user 1003 in the case of the example in FIG. 35) is greater than the capacitance formed between the reference electrode 1122 and the communication medium (human body).

The transmission/reception unit 1121 performs actions such as generating transmission signals and detecting signals received from the signal electrode 1123. The transmission optimization unit 1112 is basically the same as the communication optimization unit 1012 in the reader/writer 1001 and is connected to the transmission/reception unit 1121, to optimize settings relating to communication with the transmission/reception unit 1121 based on usage (processing contents) and functions, control the transmission/reception unit 1121 based on the optimized settings, and execute communication processing with a more preferable method (settings). Also, the service processing unit 1113 is basically the same as the service processing unit 1013 in the reader/writer 1001 and is connected to the transmission/reception unit 1121, to perform processing relating to services, provided using the communication processing regarding which the communication optimization unit 1112 has optimized, executed by the transmission/reception unit 1121.

Figure 44:
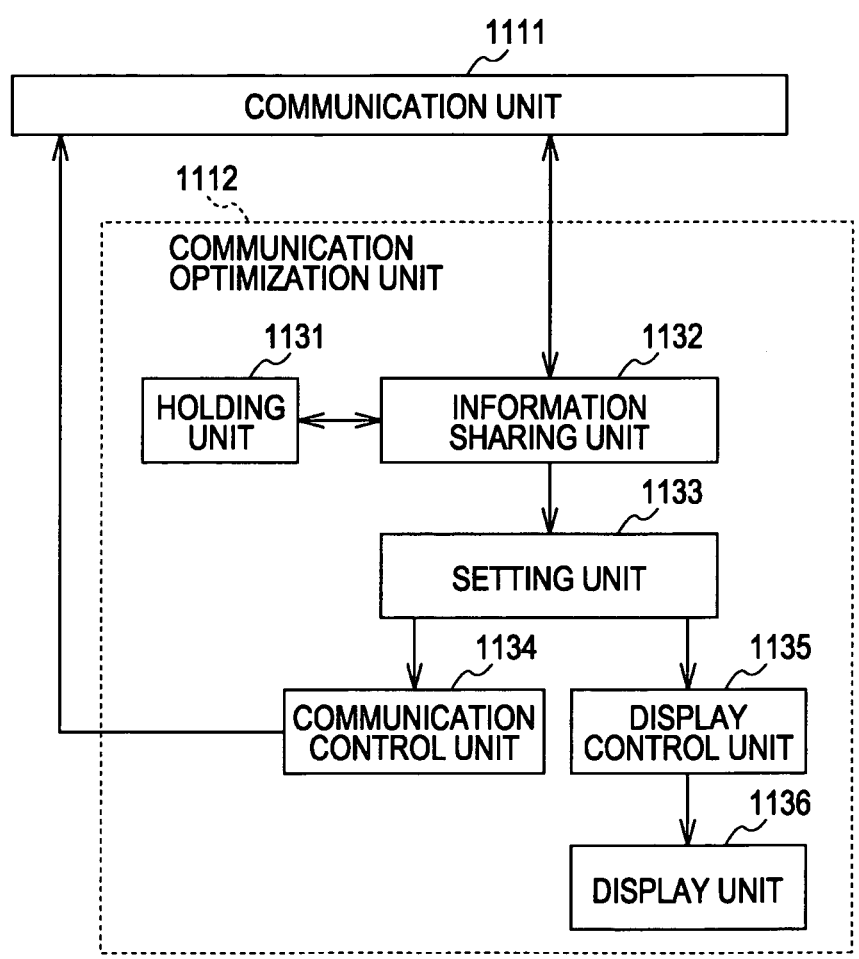
FIG. 44 is a block diagram illustrating a detailed configuration example of a communication optimizing unit shown in FIG. 43.

FIG. 44 is a block diagram illustrating a detailed configuration example of the communication optimization unit 1112 shown in FIG. 43.

In FIG. 44, the communication optimization unit 1112 has a holding unit 1131, information sharing unit 1132, setting unit 1133, communication control unit 1134, display control unit 1135, and display unit 1136.

The holding unit 1131 has recording media (storage region) such as semiconductor memory or a hard disk or the like for example, and holds user device attribute information which is information relating to the functions, usage, etc., of the user device 1002. The user device attribute information will be described in detail later. The holding unit 1131 supplies the user device attribute information held therein to the information sharing unit 1132, based on a request from the information sharing unit 1132, for example.

The information sharing unit 1132 performs processing for sharing attribute information with the reader/writer 1001. For example, the information sharing unit 1132 obtains the user device attribute information held in the holding unit 1131 based on a request from the reader/writer 1001, and supplies this to the reader/writer 1001. Also for example, the information sharing unit 1132 requests reader/writer attribute information from the reader/writer 1001, obtains the reader/writer attribute information supplied in response to the request, and supplies this to the setting unit 1133. Details of the information sharing unit 1132 will be described later.

The setting unit 1133 is a processing unit which performs settings regarding communication processing, wherein settings are made based on the user device attribute information supplied from the information sharing unit 1132, with the setting results being supplied to the communication control unit 1134 and display control unit 1135. Details of the setting unit 1133 will be described later.

The communication control unit 1134 controls the communication unit 1111 based on the setting values supplied from the setting unit 1133. Details of the communication control unit 1134 will be described later. Also, the display control unit 1135 controls the display unit 1136, and displays information (messages and the like) relating to the setting values supplied from the setting unit 1133, as necessary.

For example, in a case where communication processing needs to be performed in a stable manner, the display control unit 1135 displays a message to the user 1003 on the display unit 1136, such as "firmly press the card" or the like. Also, in the event that there is insufficient power supply of the user device 1002 (remaining power is small), the display control unit 1135 displays a message to the user 1003 on the display unit 1136, such as "Processing will take some time. Please wait" or the like.

The display unit 1136 has for example, an LCD (Liquid Crystal Display), organic EL (organic Electroluminescence) display, FED (Field Emission Display), PDP (Plasma Display Panel), electro chromic display, display device using fluorescent display tubes, CRT (Cathode Ray Tube) display devices, devices having display functions such as projectors, or the like, and displays message, images, etc., based on control of the display control unit 1135.

Note that while the above description has been made regarding an arrangement wherein information (messages and the like) relating to the setting values set by the setting unit 1133 are displayed on the display unit 1136 by the display control unit, but the information (messages and the like) relating to the setting values set by the setting unit 1133 may be displayed at the reader/writer 1001 side.

In this case, the setting unit 1133 supplies setting results to the reader/writer 1001 via the communication unit 1111. Upon obtaining the setting results, the communication unit 1011 of the reader/writer 1001 supplies these to the display control unit 1035. The display control unit 1035 displays information (messages and the like) relating to the supplied setting results on the display unit 1036. Thus, all information (messages and the like) to the user can be displayed on the display unit 1036 of the reader/writer 1001, whether it be information relating to the settings of the reader/writer 1001 or information relating to the settings of the user device 1002. Accordingly, the user can easily confirm messages, since the number of locations where messages need to be confirmed is smaller.

Next, a specific configuration example of the components shown in FIG. 44 will be described.

Figure 45:
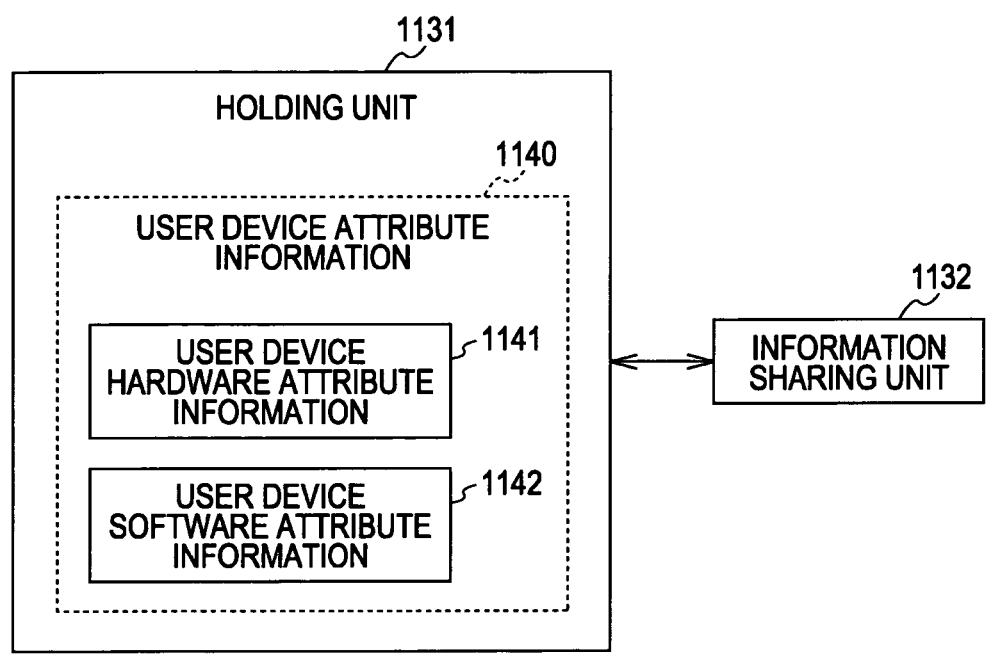
FIG. 45 is a schematic diagram illustrating a configuration example of information held by a holding unit shown in FIG. 44.

FIG. 45 is a schematic diagram illustrating a configuration example of the information which the holding unit 1131 shown in FIG. 44 holds.

In FIG. 45, the holding unit 1131 holds user device attribute information 1140 which is information relating to the functions and usage and the like of the user device 1002. The user device attribute information 1140 includes user device hardware attribute information 1141 which is information relating to the functions (hardware restrictions) of the user device 1002, and user device software attribute information 1142 which is information relating to the usage (software) of the user device 1002.

The configuration of the user device hardware attribute information 1141 and user device software attribute information 1142 is the same as that of the reader/writer hardware attribute information 1041 or reader/writer software attribute information 1042 described with reference to FIGS. 38A and 38B, and the description thereof can be applied, so description thereof will be omitted.

It should be noted that the content of the items or attributes of the user device hardware attribute information 1141 or user device software attribute information 1142 can be arranged so as to be different from the reader/writer hardware attribute information 1041 or reader/writer software attribute information 1042.

The holding unit 1131 holding the user device attribute information 1140 including the user device hardware attribute information 1141 and user device software attribute information 1142 described above provides the information based on requests from the information sharing unit 1132.

Note that the user device attribute information 1140 only needs to include at least one of the user device hardware attribute information 1141 and the user device software attribute information 1142. Also, the holding unit 1131 may supply the information sharing unit 1132 with all of the user device attribute information 1140 it holds, or just information requested from the information sharing unit 1132. That is to say, the holding unit 1131 can extract just a part of the user device attribute information 1140 (a part of the user device hardware attribute information 1141, a part of the user device software attribute information 1142, or a combination thereof) and supply this to the information sharing unit 1132. Further, an arrangement may be made wherein the holding unit 1131 supplies information to the information sharing unit 1132 other than upon requests from the information sharing unit 1132, such as at predetermined timings or events.

Figure 46:
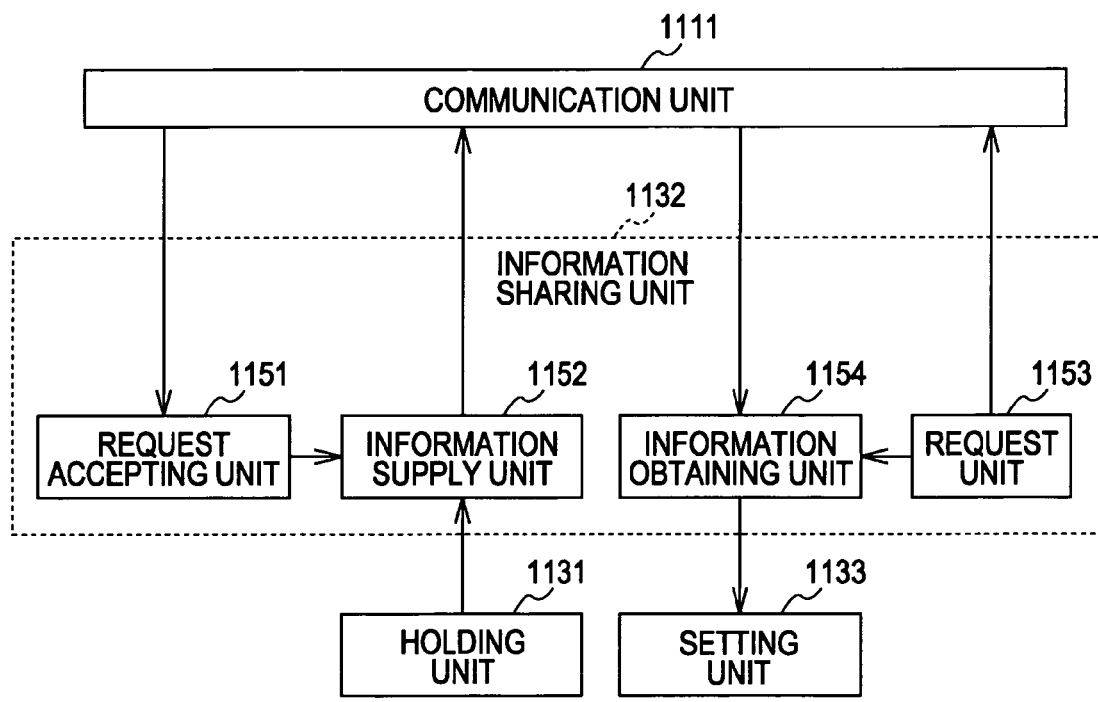
FIG. 46 is a block diagram illustrating a detailed configuration example of an information sharing unit shown in FIG. 44.

FIG. 46 is a block diagram illustrating a detailed configuration example of the information sharing unit 1132 shown in FIG. 44.

In FIG. 46, the information sharing unit 1132 includes a request accepting unit 1151, information supply unit 1152, request unit 1153, and information obtaining unit 1154.

The request accepting unit 1151 controls the communication unit 1111 to perform processing for accepting a request for user device attribute information 1140 supplied from another device (in the case of the example shown in FIG. 43, the reader/writer 1001). Once the request is accepted, the request accepting unit 1151 notifies the information supply unit to that effect.

The information sharing unit 1152 controls the communication device 1111 to perform processing for supplying the user device attribute information to another device (in the case of the example shown in FIG. 43, the reader/writer 1001). For example, upon being notified from the request accepting unit 1151 that a request has been accepted for user device attribute information 1140, the information sharing unit 1152 reads out the user device attribute information 1140 requested in the accepted request, from the information held by the holding unit 1131, and controls the communication unit 1111 so as to supply the user device attribute information 1140 that has been read out to the requesting source (in the case of the example shown in FIG. 43, the reader/writer 1001).

The request unit 1153 controls the communication unit 1111 at a predetermined timing so as to transmit the request for attribute information to another communicable device (in the case of the example shown in FIG. 43, the reader/writer 1001). That timing at which the request unit 1153 transmits the attribute information request may be any sort of timing, and may be an arrangement wherein a request is transmitted being triggered by a predetermined event, or may be autonomously transmitted, periodically or non-periodically. Upon the request unit 1153 transmitting a request, the request unit 1153 makes a notification to the information obtaining unit 1154 to that effect.

Upon receiving the notification from the request unit 1153 for example, the information obtaining unit 1154 controls the communication unit 1111 so as to start obtaining of attribute information. Upon the attribute information being obtained via the communication unit 1111, this is supplied to the setting unit 1133.

Note that one or both of the request accepting unit 1151 and request unit 1153 may be omitted from the configuration. For example, an arrangement may be made wherein the request accepting unit 1151 is omitted, and the information supply unit 1152 obtains user device attribute information 1140 from the holding unit 1131 at a predetermined timing or by being triggered by a predetermined event, with the communication unit 1111 being controlled so as to transmit the user device attribute information 1140 to another device (in the case of the example shown in FIG. 43, the reader/writer 1001). Also, an arrangement may be made wherein the request unit 1153 is omitted, with the information obtaining unit 1154 constantly controlling the communication unit 1111 so as to accept attribute information (reader/writer attribute information) of another device (in the case of the example shown in FIG. 43, the reader/writer 1001), and the attribute information supplied from the other device being obtained and supplied to the setting unit 1133.

Figure 47:
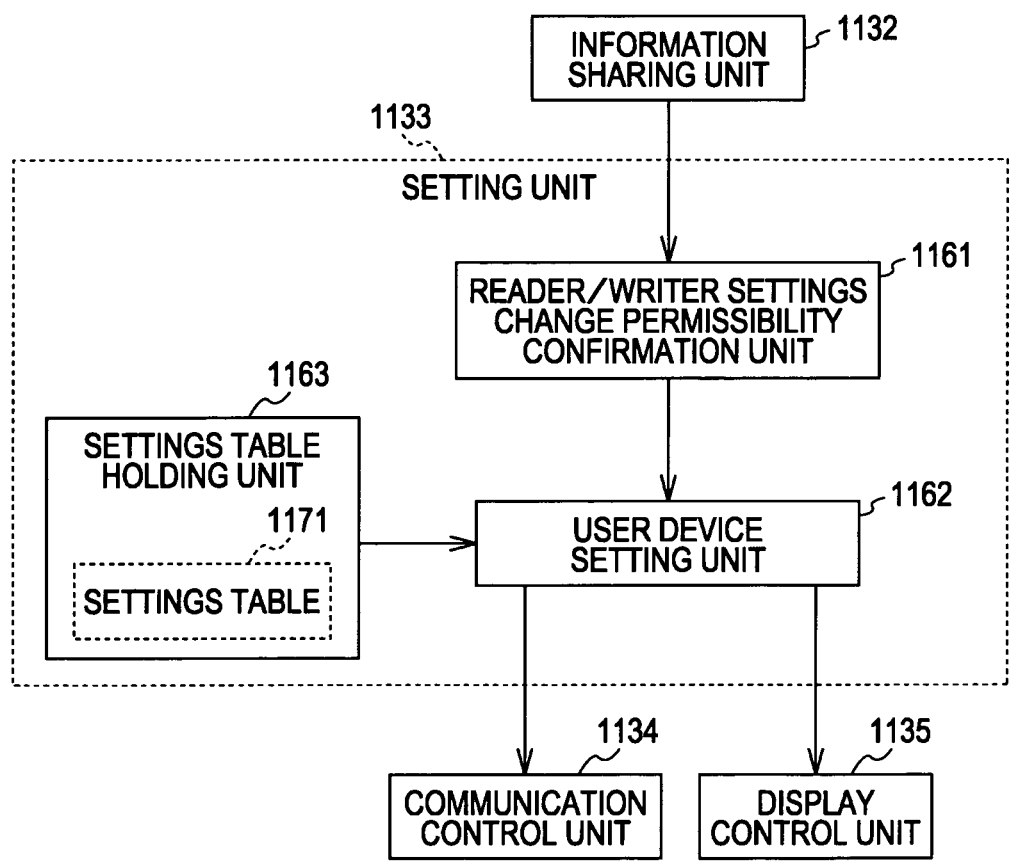
FIG. 47 is a block diagram illustrating a detailed configuration example of a setting unit shown in FIG. 44.

FIG. 47 is a block diagram illustrating a detailed configuration example of the setting unit 1133 shown in FIG. 44.

In FIG. 47, the setting unit 1133 has a reader/writer settings change permissibility confirmation unit 1161, and user device setting unit 1162, and a settings table holding unit 1163.

The reader/writer settings change permissibility confirmation unit 1161 confirms whether or not the reader/writer, which is another device serving as the other part of communication, is capable of changing settings, based on the attribute information of the other device supplied from the information sharing unit 1132 (reader/writer attribute information).

For example, in the event that the setting of the processing speed of the reader/writer 1001 is unchangeable, there may be cases wherein restrictions are needed on the setting range of processing speed of the user device 1002, in order to perform communication processing in a sure manner. For example, even in cases wherein the transmission power setting value of the reader/writer 1001 is set at a low value due to reasons such as restricting the communication range for example, there may be cases wherein the reception sensitivity of the user device 1002 needs to be raised instead of increasing the transmission power of the reader/writer 1001.

Thus, the setting method of the attribute values of the user device 1002 may change, depending on whether the attribute values of the other device for communication (reader/writer 1001) are changeable or not. Accordingly, the user device settings change permissibility confirmation unit 1161 confirms whether or not the settings of the reader/writer 1001 are changeable, and supplies the confirmation results to the reader/writer setting unit 1162 along with the reader/writer attribute information 1040.

The user device setting unit 1162 obtains the settings table 1171 held in the settings table holding unit 1163, and performs settings based on the settings table 1171 and the user device attribute information and the settings change permissibility confirmation results supplied from the reader/writer settings change permissibility confirmation unit 1161. The settings table 1171 is table information for selecting setting values according to conditions, and the user device setting unit 1162 selects settings corresponding to the reader/writer attribute information and the settings change permissibility confirmation results from the settings table 1171. The user device setting unit 1162 supplies the setting results to at least one of the communication control unit 1134 and the display control unit 1135, as necessary.

The settings table holding unit 1163 has recording media (storage region) such as semiconductor memory or a hard disk or the like for example, and holds the settings table 1171 which is table information for performing settings regarding communication of the user device 1002. Note that the settings table 1171 is of the same configuration as the settings table 1071 described with reference to FIG. 41, so detailed description thereof will be omitted.

Thus, the user device 1002 can perform suitable power supply control by making settings with such a settings table 1171, such as reducing processing speed or reducing transmission power or reception sensitivity, based on usage or the hardware capabilities of the reader/writer 1001, thereby suppressing power consumption. Also, in the event that the user device 1002 itself does not have a power source, or has a power source but the remaining capacity is low and power supply is insufficient (little remaining), the user device 1002 can reduce processing speed or reduce transmission power or reception sensitivity for example, thereby suppressing power consumption.

By performing such setting processing, the user device 1002 can select optimal settings based on the usage and hardware restrictions and the like, thereby not only suppressing electric power consumption of the reader/writer 1001 and user device 1002, but also improving surety of communication, improving security of communication by controlling the communication range, reducing the communication processing time, and so forth, for example.

That is to say, the user device 1002 can use communication processing optimized by the communication optimizing unit 1112 to perform processing regarding provided services.

The contents set in the settings table 1171 are not restricted in any manner so long as they are assigned to the conditions beforehand, and may yield effects for any sort of evaluation elements.

Also note that the setting table holding unit 1163 does not need to hold all of the above-described settings table 1171, rather it is sufficient to hold the portion thereof corresponding to the hardware functions of the user device 1002 itself, and usages (software to be executed). For example, in the event that a user device 1002 is to correspond only to wicket processing (i.e., a case wherein no payment processing or balance inquiry processing can be performed), the setting table holding unit 1163 only needs to hold the setting candidate of "wicket processing", and setting candidates corresponding to "payment processing" and "balance inquiry processing" do not need to be held.

Also, in the event that the user device 1002 itself is an external power source type user device which does not have a power source, the setting table holding unit 1063 only needs to hold setting candidates corresponding to "external power source type user device" (i.e., there is no need to hold setting candidates corresponding to "internal power source type user device (with sufficient power)" and "internal power source type user device (with insufficient power)").

Figure 48:
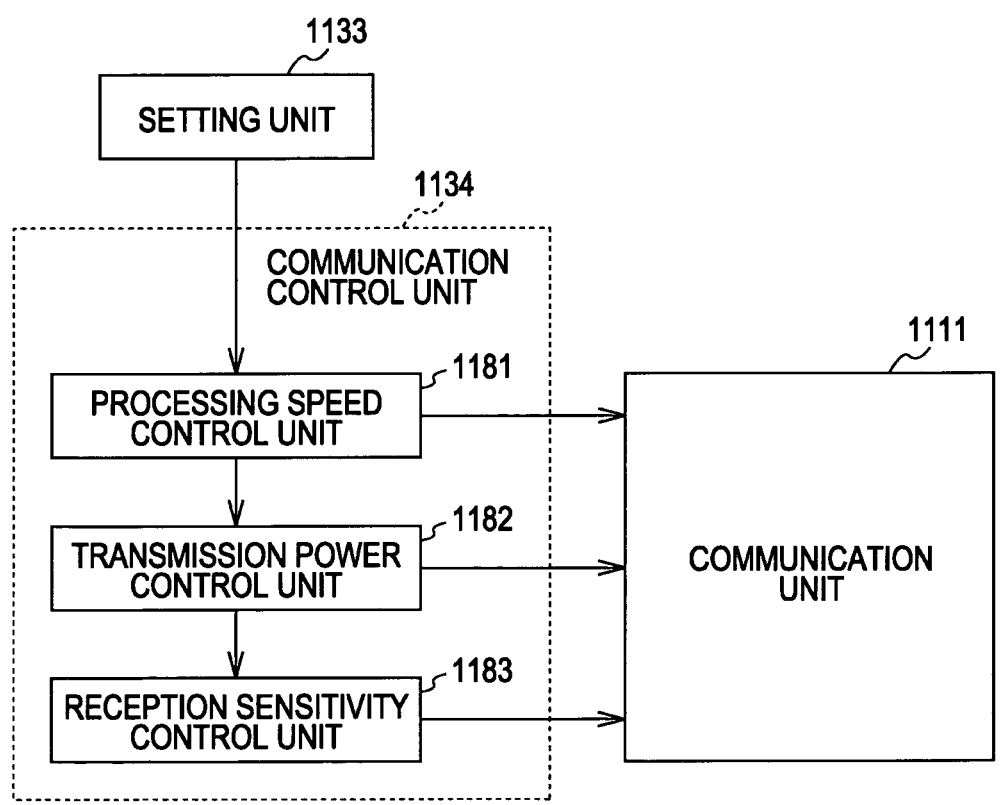
FIG. 48 is a block diagram illustrating a detailed configuration example of a communication control unit shown in FIG. 44.

FIG. 48 is a block diagram illustrating a detailed configuration example of the communication control unit 1134 shown in FIG. 44.

In FIG. 48, the communication control unit 1134 has a processing speed control unit 1181 for controlling the communication unit 1111 with regard to processing speed, a transmission power control unit 1182 for controlling the communication unit 1111 with regard to transmission power, and a reception sensitivity control unit 1183 for controlling the communication unit 1111 with regard to reception sensitivity.

That is to say, the communication control unit 1134 is a processing unit for controlling the communication unit 1111 based on the setting results (the settings selected based on the settings table 1171) supplied from the setting unit 1133, and has processing units for performing control processing corresponding to the elements of setting results (processing speed, transmission power, reception sensitivity, power supply, etc.) supplied from the setting unit 1133. That is to say, the detailed configuration of the communication control unit 1134 shown in FIG. 48 (processing speed control unit 1181, transmission power control unit 1182, reception sensitivity control unit 1183) are but one example, and part or all of these may be omitted and the communication control unit 1134 may have other configurations, as long as corresponding to the setting results supplied from the setting unit 1133.

Next, the flow of the processing performed by the reader/writer 1001 shown in FIG. 35 will be described.

First, an example of the flow of communication optimization processing executed by the communication optimization unit 1012 of the reader/writer 1001 will be described.

Upon the communication optimization unit 1012 of the reader/writer 1001 starting the communication optimization processing, the information sharing unit 1032 of the communication optimization 1012 executes reader/writer attribute information supplying processing in step S1 to control the communication unit 1011 and supply the reader/writer attribute information 1040 to the user device 1002 which the user 1003 has, via the user 1003 in contact with the signal electrode 1023.

In step S2, the information sharing unit 1032 executes user device attribute information obtaining processing, to control the communication unit 1011 so as to obtain the user device attribute information of the user device 1002. Details of the user device attribute information will be described later.

In step S3, the setting unit 1033 performs setting processing, for optimal settings according to functions and usage. Details of the setting processing will be described later.

In step S4, the communication control unit 1034 performs processing for controlling the communication unit 1011 based on the setting results of the settings made in the setting processing of step S3. Also, the display control unit 1035 controls the display unit 1036 to display messages and images relating to the setting results of the settings made in the setting processing of step S3.

Upon the processing of step S4 ending, the communication optimization unit 1012 ends the communication optimization processing.

Next, an example of the detailed flow of reader/writer attribute information supply processing executed in step S1 of FIG. 49 will be described with reference to the flowchart shown in FIG. 50.

Upon the reader/writer attribute information supply processing starting, the request accepting unit 1051 of the information sharing unit 1032 controls the communication unit 1011 in step S21 to perform request accepting processing for requesting the reader/writer attribute information 1040, and in step S22 determines whether or not the request has been accepted from the user device 1002. In the event that determination is made that the request of the reader/writer attribute information 1040 has not been accepted, the request accepting unit 1051 returns the flow to step S21, and request accepting processing is repeated. In the event that determination is made in step S22 that a request for the reader/writer attribute information has been accepted, the request accepting unit 1051 makes notification to the information supply unit 1052 to that effect, and the flow proceeds to step S23.

In step S23, the information supply unit 1052 accesses the holding unit 1031, reads out the reader/writer attribute information 1040 which the holding unit 1031 holds, and in step S24 controls the communication unit 1011 to output the reader/writer attribute information that has been read out. The information supply unit 1052 which has output the reader/writer attribute information 1040 ends the reader/writer attribute information supply processing, thereby ending the processing of step S1 in FIG. 49, and proceeds to execution of the processing of step S2 and the subsequent steps.

Due to such processing, the reader/writer 1001 can supply the reader/writer attribute information to the user device 1002 based on requests from the user device 1002.

Next, an example of the detailed flow of user device attribute information obtaining processing, which is executed in step S2 of FIG. 49, will be described with reference to the flowchart in FIG. 51.

Upon the user device attribute information supply processing starting, the request unit 1053 of the information sharing unit 1032 controls the communication unit 1011 in step S41 to request user device attribute information 1040 to the user device 1002, notification is made to the information obtaining unit 1054 to that effect, and the flow proceeds to step S42.

In step S42, the information obtaining unit 1054 controls the communication unit 1011 to perform obtaining processing of the user device attribute information 1140 supplied in response to the request of the request unit 1053. In step S43, the information obtaining unit 1054 determines whether or the user device attribute information 1040 has been obtained, and in the event that determination is made that this has not been obtained, the flow returns to step S42, and user device attribute information 1140 obtaining processing is executed again. That is to say, the information obtaining unit 1054 repeatedly executes the user device attribute information 1140 obtaining processing (step S42) until determination is made in step S43 that the user device attribute information has been obtained.

Figure 49:
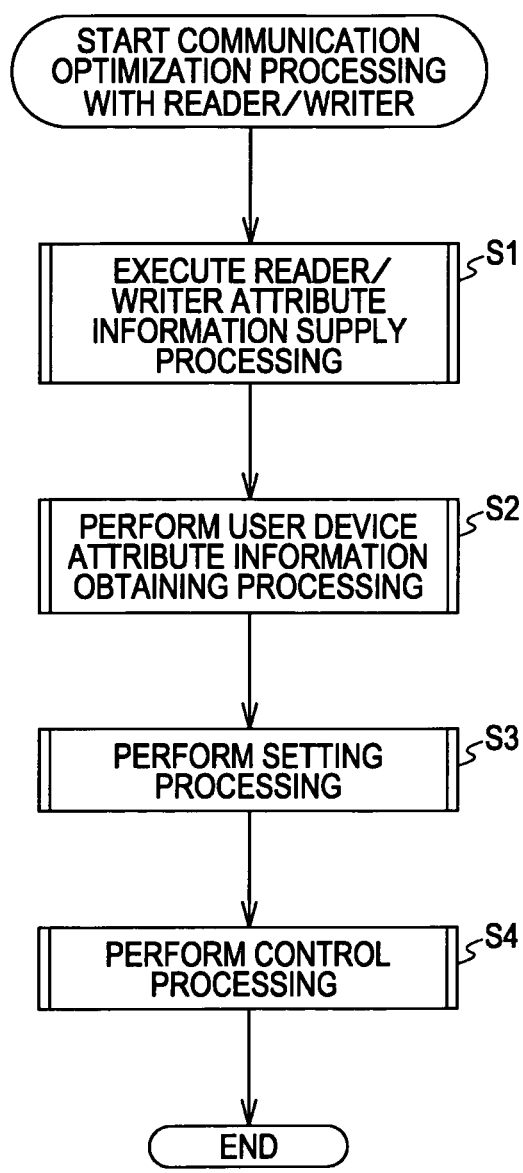
FIG. 49 is a flowchart for describing an example of the flow of communication optimization processing.

In the event that determination is made in step S43 that the user device attribute information 1140 has been obtained, the information obtaining unit 1054 supplies the user device attribute information 1140 to the setting unit 1033, and ends the user device attribute information obtaining processing, thereby ending the processing of step S2 in FIG. 49, and proceeds to execution of the processing of step S3 and the subsequent steps.

Due to such processing, the reader/writer 1001 can request and obtain user device writer attribute information 1140 from the user device 1002.

Figure 52:
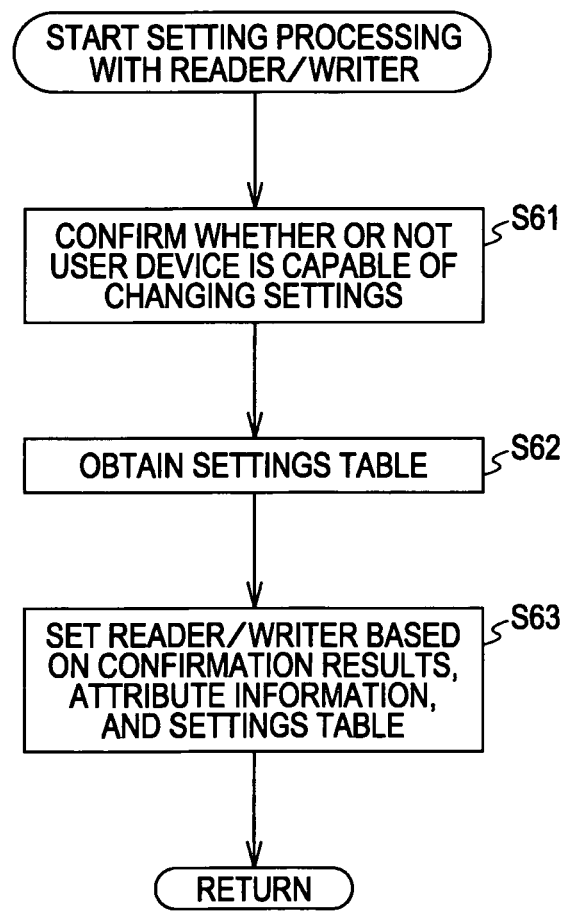
FIG. 52 is a flowchart for describing an example of the flow of setting processing.

Next, an example of the detailed flow of setting processing, which is executed in step S3 of FIG. 49, will be described with reference to the flowchart in FIG. 52.

Upon processing being started, in step S61 the user device settings change permissibility confirmation unit 1061 of the setting unit confirms whether or not settings of the user device 1002 are changeable, based on the user device attribute information 1140 supplied from the information supply unit 1032. Upon confirming whether or not settings of the user device 1002 are changeable, the user device settings change permissibility confirmation unit 1061 supplies the confirmation results and the user device attribute information 1140 to the reader/writer setting unit 1062, and the processing proceeds to step S62.

In step S62, the reader/writer setting unit 1062 which has been supplied with the confirmation results and the user device attribute information 1140 accesses the settings table holding unit 1063, and obtains the settings table 1071 which the settings table holding unit 1063 holds. Upon obtaining the settings table 1071, the reader/writer setting unit 1062 performs reader/writer 1001 settings in step S63, based on the confirmation results, user device attribute information 1140, and the settings table 1071. Upon the settings of the reader/writer 1001 ending, the reader/writer setting unit 1062 supplies the setting results to the communication control unit 1034 and the display control unit 1035, and ends the setting processing, thereby ending the processing of step S3 in FIG. 49, and proceeds to execution of the processing of step S4 and the subsequent steps.

Due to performing such processing, the reader/writer 1001 can set the reader/writer 1001 based on the confirmation results, user device attribute information 1140, and the settings table 1071. Thus, the reader/writer 1001 can provide services using the communication processing optimized by the communication optimization unit 1012.

Next, an example of the detailed flow of control processing, which is executed in step S4 of FIG. 49, will be described with reference to the flowchart in FIG. 53.

Upon the control processing starting, the processing speed control unit 1081 of the communication control unit 1034 determines in step S81 whether or not to control the processing speed, and in the event that determination is made to control the processing speed, the flow proceeds to step S82, where the processing speed of each of the processes to be executed is controlled, by changing the operating frequency for example, based on the setting results supplied from the setting unit 1033. Upon control of the processing speed ending, the processing speed control unit 1081 supplies the setting results to the transmission power control unit 1082, and the flow proceeds to step S83. Also, in the event that determination is made not to control the processing speed in step S81, the processing speed control unit 1081 omits the processing of step S82 and supplies the setting results to the transmission power control unit 1082, and the flow proceeds to step S83.

In step S83, the transmission power control unit 1082 determines whether or not to control the transmission power, and in the event that determination is made to control the transmission power, the flow proceeds to step S84, where the communication unit 1011 is controlled such that transmission power (magnitude of transmission output) is controlled, based on the setting results supplied from the processing speed control unit 1081. Upon control of the processing speed ending, the transmission power control unit 1082 supplies the setting results to the reception sensitivity control unit 1083, and the flow proceeds to step S85. Also, in the event that determination is made not to control the transmission power in step S83, the transmission power control unit 1082 omits the processing of step S84 and supplies the setting results to the reception sensitivity control unit 1083, and the flow proceeds to step S85.

In step S85, the reception sensitivity control unit 1083 determines whether or not to control the reception sensitivity, and in the event that determination is made to control the reception sensitivity, the flow proceeds to step S86, where the communication unit 1011 is controlled such that reception sensitivity (magnitude of reception gain) is controlled, based on the setting results supplied from the transmission power control unit 1082. Upon control of the reception sensitivity ending, the reception sensitivity control unit 1083 supplies the setting results to the power supply control unit 1084, and the flow proceeds to step S87. Also, in the event that determination is made not to control the reception sensitivity in step S85, the reception sensitivity control unit 1083 omits the processing of step S86 and supplies the setting results to the power supply control unit 1084, and the flow proceeds to step S87.

In step S87, the power supply control unit 1084 determines whether or not to supply power to the user device 1002, and in the event that determination is made to supply power supply, the flow proceeds to step S88, where the communication unit 1011 is controlled such that power is supplied to the user device 1002, based on the setting results supplied from the reception sensitivity control unit 1083. Upon power supplying ending, the power supply control unit 1084 proceeds to step S89. Also, in the event that determination is made not to supply power in step S87, the power supply control unit 1084 omits the processing of step S88 and proceeds to step S89.

In step S89, the display control unit 1084 which has been supplied with the setting results from the setting unit 1003 determines whether or not to display information relating to the setting results on the display unit 1036. In the event that determination is made to display information relating to the setting results on the display unit 1036, the flow proceeds to step S90. In the processing of step S90, the display control unit 1035 controls the display unit 1036 so as to display information relating to the setting results thereupon.

For example, in the event that communication processing should be executed in a more stable manner, the display control unit 1035 displays on the display unit 1036 messages to the user 1003, such as "Bring the user device 1002 firmly into contact with the body", or "Firmly touch the indicated position on the reader/writer 1001".

Also, in the event that the remaining power of the user device 1002 is low, the display control unit 1035 lowers the operation frequency of the processing speed control unit 1081 and displays a message to the user 1003 on the display unit 1036, such as "Processing will take some time. Please wait" or the like.

Thus, the display control device 1035 displays messages to the user 1003 on the display unit 1036, based on setting results. Of course, the contents of the messages, the display timing, the layout of display screens, and so forth, are all optional, and further arrangements may be made wherein symbols, pictures (patterns), and so forth, are displayed along with the above messages, or instead of the messages.

Upon the processing in step S90 ending, the display control unit 1035 ends control processing, thereby ending the processing of step S4 in FIG. 49, and also ending the communication optimization processing.

Figure 53:
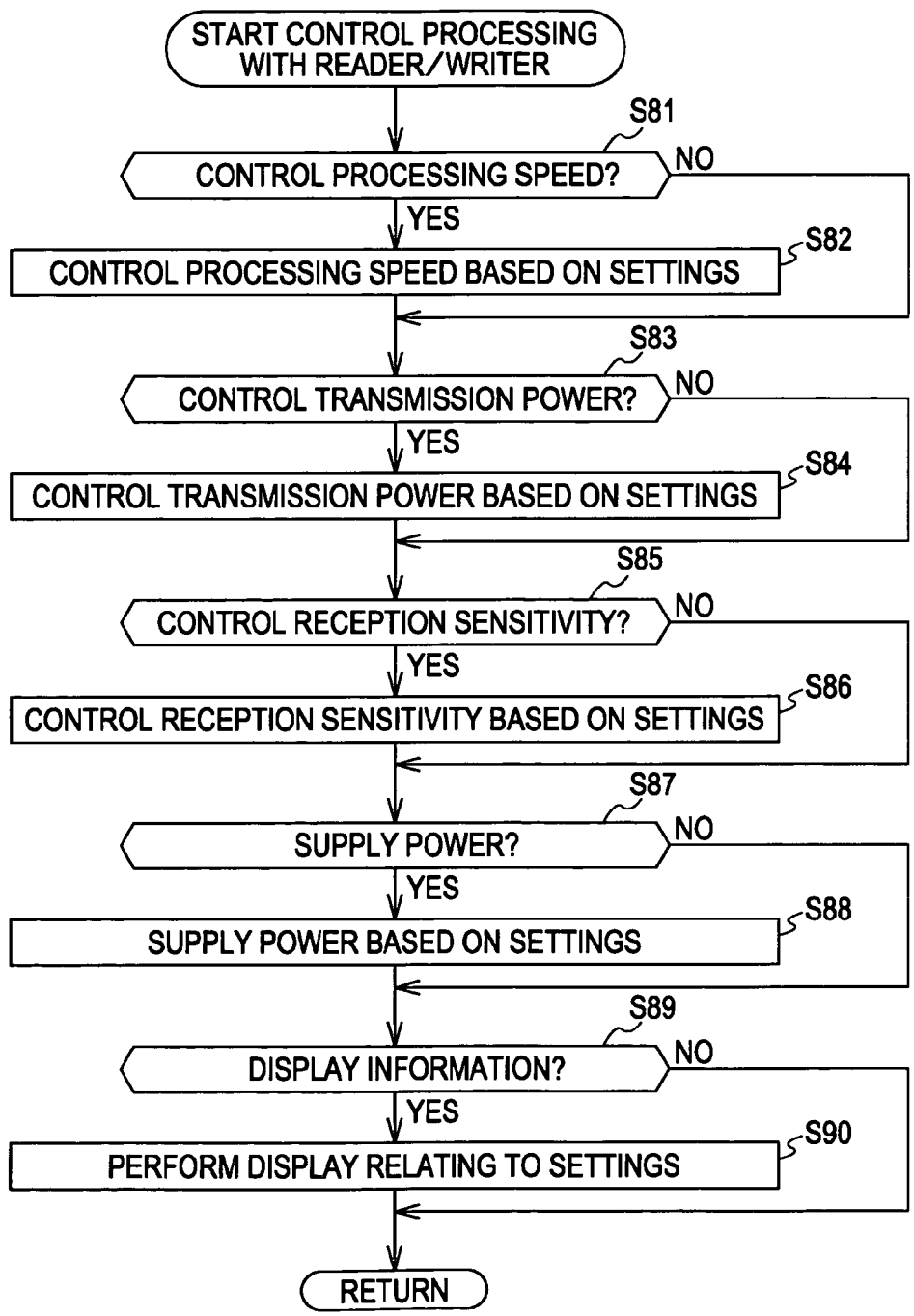
FIG. 53 is a flowchart for describing an example of the flow of control processing.

Also, in the event that determination is made in step s89 in FIG. 53 that information relating to the setting results are to not be displayed on the display unit 1036, the display control unit 1035 omits the processing of step S90 and ends the control processing, thereby ending the processing of step S4 in FIG. 49, and also ending the communication optimization processing.

Due to such processing, the reader/writer 1001 can control communication processing based on the setting results made by the setting unit 1033. Accordingly, the reader/writer 1001 can perform communication under more suitable communication settings, according to the usage of the communication processing. That is to say, the reader/writer 1001 can provide services using communication processing carried out under more suitable settings.

Next, the flow of the processing executed by the user device 1002 shown in FIG. 43 will be described.

First, an example of the flow of communication optimization processing executed at the communication optimization unit 1112 of the user device 1002 will be described with reference to the flowchart shown in FIG. 54.

Upon the communication optimization unit 1112 of the user device 1002 starting communication optimization processing, the information sharing unit 1132 of the communication optimization unit 1112 executes user device attribute information supply processing in step S101, thereby controlling the communication unit 1111 to supply the user device attribute information 1140 to the reader/writer 1001 with which the user 1003 is in contact, via the user 1003 in contact with the signal electrode 1123. Details of the user device attribute information supply processing will be described later.

In step S102, the information sharing unit 1132 executes reader/writer attribute information obtaining processing, thereby controlling the communication unit 1111 to obtain reader/writer attribute information 1040 of the reader/writer 1001.

In step S103, the setting unit 1133 performs setting processing, to make optimal settings according to functions and usage. Details of setting processing will be described later.

In step S104, the communication control unit 1134 performs processing for controlling the communication unit 1111 based on the setting results of the settings made in the setting processing in step S103. Also, the display control unit 1135 controls the display unit 1136 to display messages and images relating to the setting results set in the setting processing in step S103.

Upon the processing of step S104 ending, the communication optimization unit 1112 ends communication optimization processing.

Next, an example of the detailed flow of user device attribute information supply processing executed in step S101 of FIG. 54 will be described with reference to FIG. 55.

Upon the user device attribute information supply processing starting, the request accepting unit 1151 of the information sharing unit 1132 controls the communication unit 1111 in step S121 to perform request accepting processing for requesting the user device attribute information 1140, and in step S122 determines whether or not the request has been accepted from the reader/writer 1001. In the event that determination is made that the request of the user device attribute information 1140 has not been accepted, the request accepting unit 1151 returns the flow to step S121, and request accepting processing is repeated. In the event that determination is made in step S122 that a request for the reader/writer attribute information has been accepted, the request accepting unit 1151 makes notification to the information supply unit 1152 to that effect, and the flow proceeds to step S123.

In step S123, the information supply unit 1152 accesses the holding unit 1131, reads out the user device attribute information 1140 which the holding unit 1131 holds, and in step S124 controls the communication unit 1111 to output the reader/writer attribute information that has been read out. The information supply unit 1152 which has output the user device attribute information 1140 ends the reader/writer attribute information supply processing, thereby ending the processing of step S101 in FIG. 54, and proceeds to execution of the processing of step S102 and the subsequent steps.

Due to such processing, the user device 1002 can supply the user device attribute information 1140 to the reader/writer 1001 based on requests from the reader/writer 1001.

Next, an example of the detailed flow of user device attribute information obtaining processing, which is executed in step S12 of FIG. 54, will be described with reference to the flowchart in FIG. 56.

Upon the reader/writer attribute information supply processing starting, the request unit 1153 of the information sharing unit 1132 controls the communication unit 1111 in step S141 to request the reader/writer attribute information 1040, notification is made to the information obtaining unit 1154 to that effect, and the flow proceeds to step S142.

In step S142, the information obtaining unit 1154 controls the communication unit 1111 to perform obtaining processing of the reader/writer attribute information 1040 supplied in response to the request of the request unit 1153. In step S143, the information obtaining unit 1154 determines whether or the reader/writer attribute information 1040 has been obtained, and in the event that determination is made that this has not been obtained, the flow reruns to step S142, and reader/writer attribute information 1040 obtaining processing is executed again. That is to say, the information obtaining unit 1154 repeatedly executes the reader/writer attribute information 1040 obtaining processing (step S142) until determination is made in step S143 that the reader/writer attribute information 1040 has been obtained.

Figure 54:
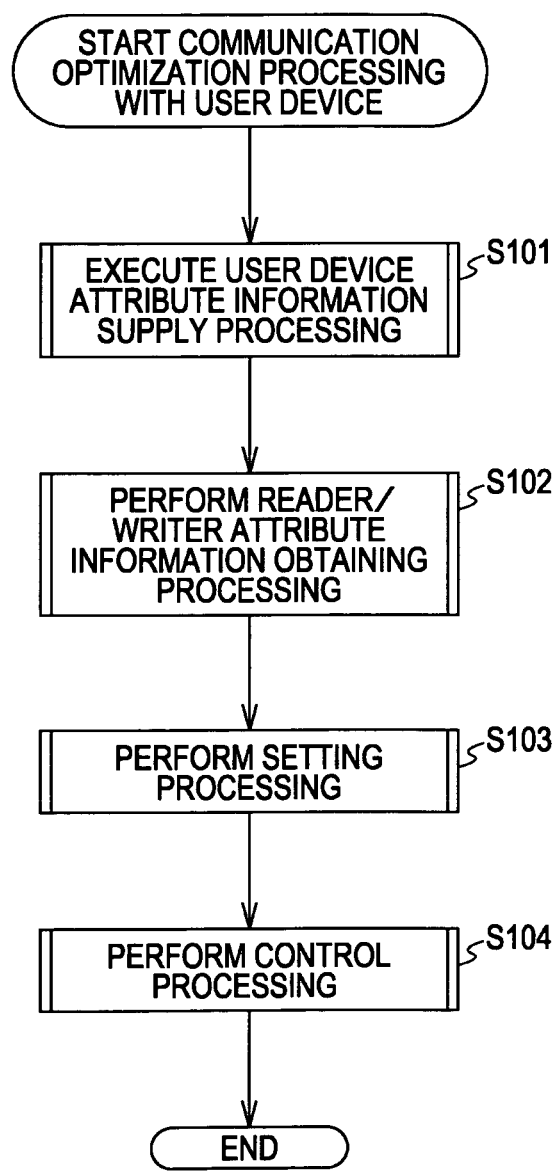
FIG. 54 is a flowchart for describing an example of the flow of user device attribute information supplying processing.

In the event that determination is made in step S143 that the reader/writer attribute information 1040 has been obtained, the information obtaining unit 1154 supplies the reader/writer attribute information 1040 to the setting unit 1133, and ends the reader/writer attribute information obtaining processing, thereby ending the processing of step S102 in FIG. 54, and proceeds to execution of the processing of step S103 and the subsequent steps.

Due to such processing, the user device 1002 can request and obtain reader/writer writer attribute information 1040 from the reader/writer 1001.

Next, an example of the detailed flow of setting processing, which is executed in step S103 of FIG. 54, will be described with reference to the flowchart in FIG. 57.

Upon processing being started, in step S161 the reader/writer settings change permissibility confirmation unit 1161 of the setting unit confirms whether or not settings of the reader/writer 1001 are changeable, based on the reader/writer attribute information 1040 supplied from the information supply unit 1132. Upon confirming whether or not settings of the reader/writer 1001 are changeable, the reader/writer settings change permissibility confirmation unit 1161 supplies the configuration results and the reader/writer attribute information 1040 to the user device setting unit 1162, and the processing proceeds to step S162.

In step S162, the user device setting unit 1162 which has been supplied with the configuration results and the reader/writer attribute information 1040 accesses the settings table holding unit 1163, and obtains the settings table 1171 which the settings table holding unit 1163 holds. Upon obtaining the settings table 1171, the reader/writer setting unit 1162 performs user device 1102 settings in step S163, based on the configuration results, reader/writer attribute information 1040, and the settings table 1171. Upon the settings of the user device 1002 ending, the user device setting unit 1162 supplies the setting results to the communication control unit 1134 and the display control unit 1135, and ends the processing, thereby ending the processing of step S103 in FIG. 54, and proceeds to execution of the processing of step S104 and the subsequent steps.

Due to performing such processing, the user device 1102 can set the user device 1002 based on the configuration results, reader/writer attribute information 1040, and the settings table 1171. Thus, the user device 1002 can make communication settings that are more suitable, according to the usage of the communication processing.

Next, an example of the detailed flow of control processing, which is executed in step S14 of FIG. 54, will be described with reference to the flowchart in FIG. 58.

Upon the control processing starting, the processing speed control unit 1181 of the communication control unit 1134 determines in step S181 whether or not to control the processing speed, and in the event that determination is made to control the processing speed, the flow proceeds to step S182, where the processing speed of each of the processes to be executed is controlled, by changing the operating frequency for example, based on the setting results supplied from the setting unit 1133. Upon control of the processing speed ending, the processing speed control unit 1181 supplies the setting results to the transmission power control unit 1182, and the flow proceeds to step S183. Also, in the event that determination is made not to control the processing speed in step S181, the processing speed control unit 1181 omits the processing of step S182 and supplies the setting results to the transmission power control unit 1182, and the flow proceeds to step S183.

In step S183, the transmission power control unit 1182 determines whether or not to control the transmission power, and in the event that determination is made to control the transmission power, the flow proceeds to step S184, where the communication unit 1111 is controlled such that transmission power (magnitude of transmission output) is controlled, based on the setting results supplied from the processing speed control unit 1181. Upon control of the processing speed ending, the transmission power control unit 1182 supplies the setting results to the reception sensitivity control unit 1183, and the flow proceeds to step S185. Also, in the event that determination is made not to control the transmission power in step S183, the transmission power control unit 1182 omits the processing of step S184 and supplies the setting results to the reception sensitivity control unit 1183, and the flow proceeds to step S185.

In step S185, the reception sensitivity control unit 1183 determines whether or not to control the reception sensitivity, and in the event that determination is made to control the reception sensitivity, the flow proceeds to step S186, where the communication unit 1111 is controlled such that reception sensitivity (magnitude of reception gain) is controlled, based on the setting results supplied from the transmission power control unit 1182. Upon control of the reception sensitivity ending, the reception sensitivity control unit 1183 proceeds to step S187. Also, in the event that determination is made not to control the reception sensitivity in step S183, the reception sensitivity control unit 1183 omits the processing of step S186 and proceeds to step S187.

In step S187, the display control unit 1135 which has been supplied with the setting results from the setting unit 1133 determines whether or not to display information relating to the setting results on the display unit 1136. In the event that determination is made to display information relating to the setting results on the display unit 1136, the flow proceeds to step S188. In the processing of step S188, the display control unit 1135 controls the display unit 1136 so as to display information relating to the setting results thereupon.

For example, in the event that communication processing should be executed in a more stable manner, the display control unit 1135 displays on the display unit 1136 messages to the user 1003, such as "Bring the user device 1002 firmly into contact with the body", or "Firmly touch the indicated position on the reader/writer 1001".

Also, in the event that the display control unit 1135 lowers the operation frequency of the processing speed control unit 1181, the display control unit 1135 displays a message to the user 1003 on the display unit 1136, such as "Processing will take some time. Please wait" or the like.

Thus, the display control device 1135 displays messages to the user 1003 on the display unit 1136, based on setting results. Of course, the contents of the messages, the display timing, the layout of display screens, and so forth, are all optional, and further arrangements may be made wherein symbols, pictures (patterns), and so forth, are displayed along with the above messages, or instead of the messages.

Upon the processing in step S188 ending, the display control unit 1135 ends control processing, thereby ending the processing of step S104 in FIG. 54, and also ending the communication optimization processing.

Figure 58:
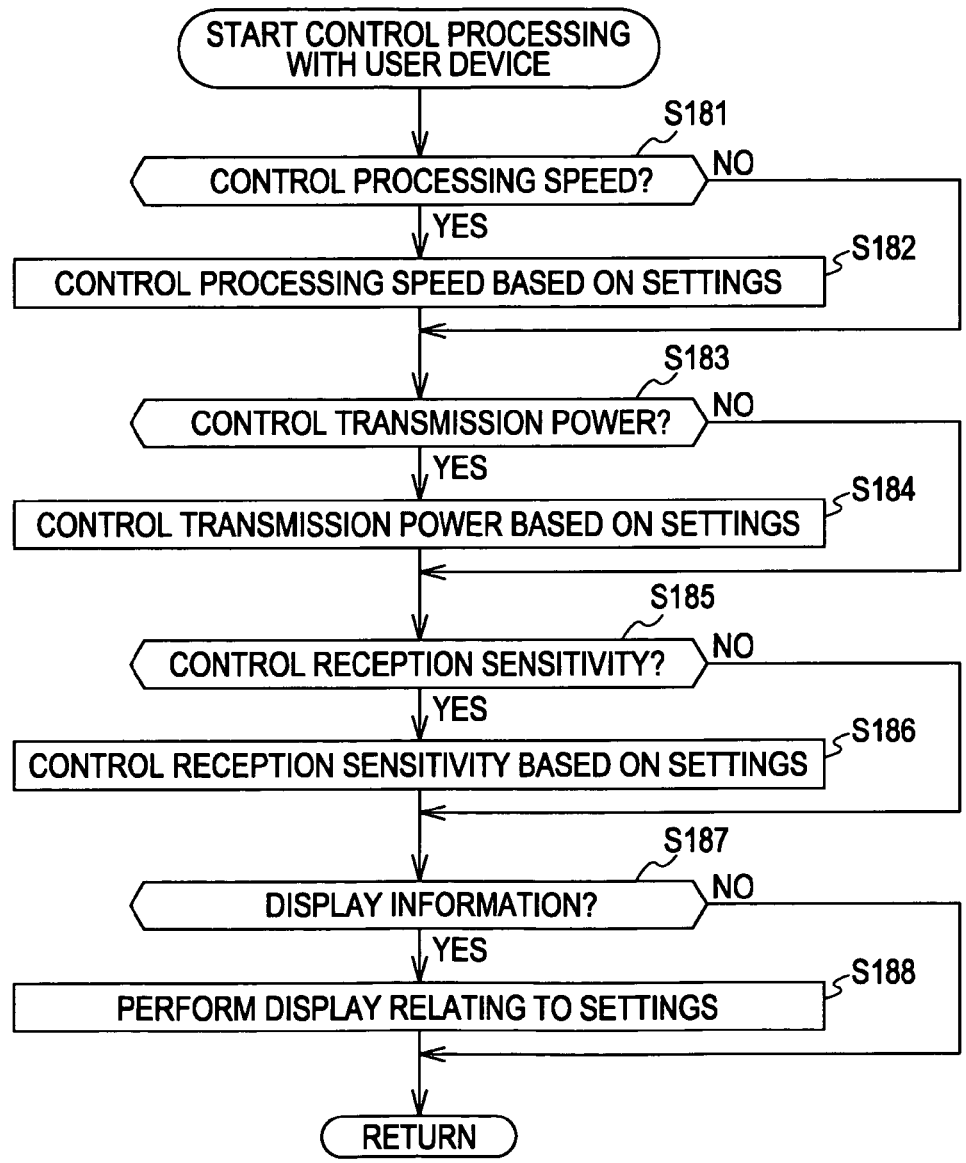
FIG. 58 is a flowchart for describing another example of the flow of control processing.

Also, in the event that determination is made in step S189 in FIG. 58 that information relating to the setting results are to not be displayed on the display unit 1136, the display control unit 1135 omits the processing of step S188 and ends the control processing, thereby ending the processing of step S104 in FIG. 54, and also ending the communication optimization processing.

Due to such processing, the user device 1002 can control communication processing based on the setting results made by the setting unit 1133. Accordingly, the user device 1002 can perform communication under more suitable communication settings, according to the usage of the communication processing. That is to say, the user device 1002 can perform processing regarding provided services, using communication processing carried out under more suitable settings.

The execution timing of each of the processes described above may be any time, and for example may be performed at the time of establishing communication, or may be repeatedly executed, periodically or non-periodically, during communication. Also, which the devices have been described as supplying attribute information in response to requests from the device with which communication is being made, the arrangement is not restricted to this, and for example, an arraignment may be made wherein, for example, attribute information is periodically or non-periodically supplied, or attribute information is supplied being triggered by a predetermined event, or an arrangement may be made wherein, at the time of transmitting other information, attribute information is attached to that information.

Figure 50:
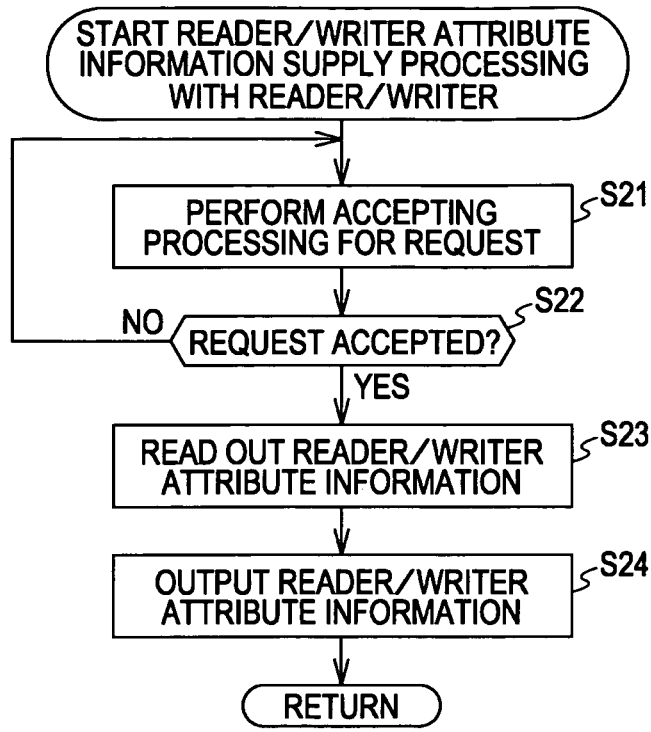
FIG. 50 is a flowchart for describing an example of the flow of reader/writer attribute information supplying processing.
Figure 51:
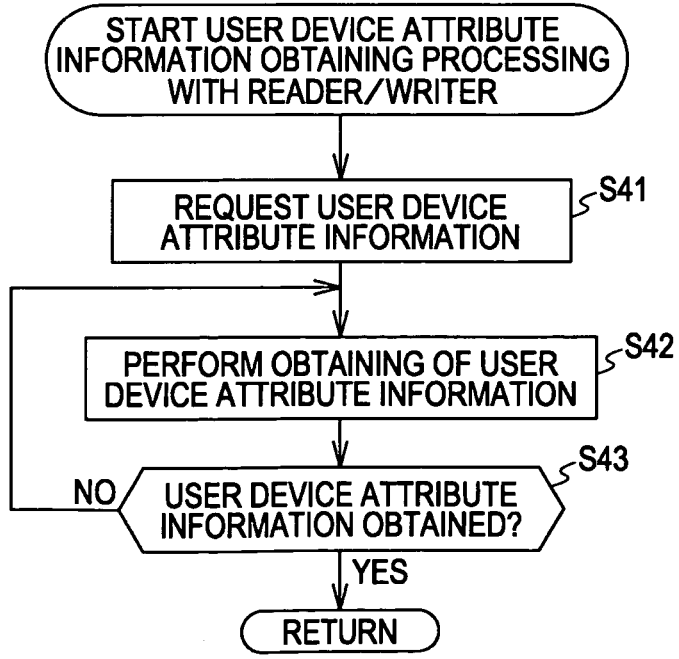
FIG. 51 is a flowchart for describing an example of the flow of user device attribute information obtaining processing.
Figure 55:
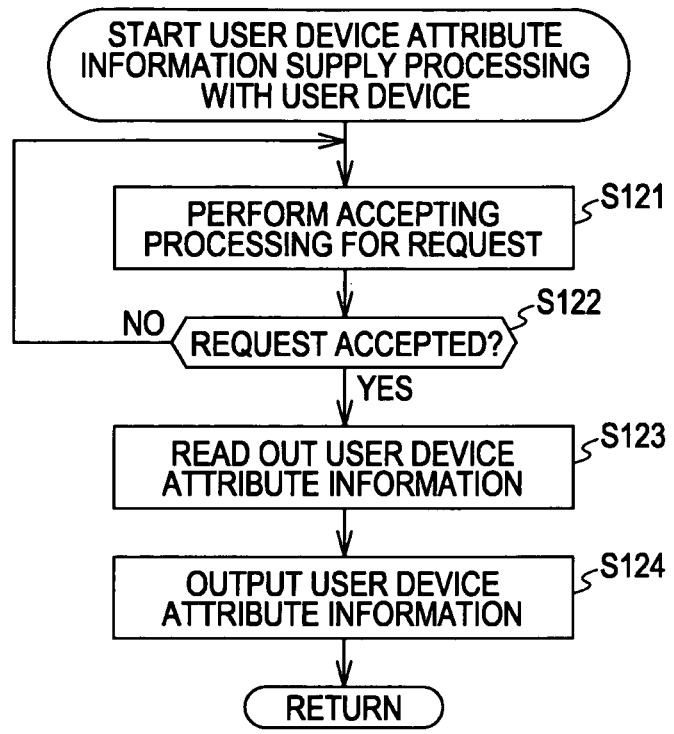
FIG. 55 is a flowchart for describing another example of the flow of communication optimization processing.
Figure 56:
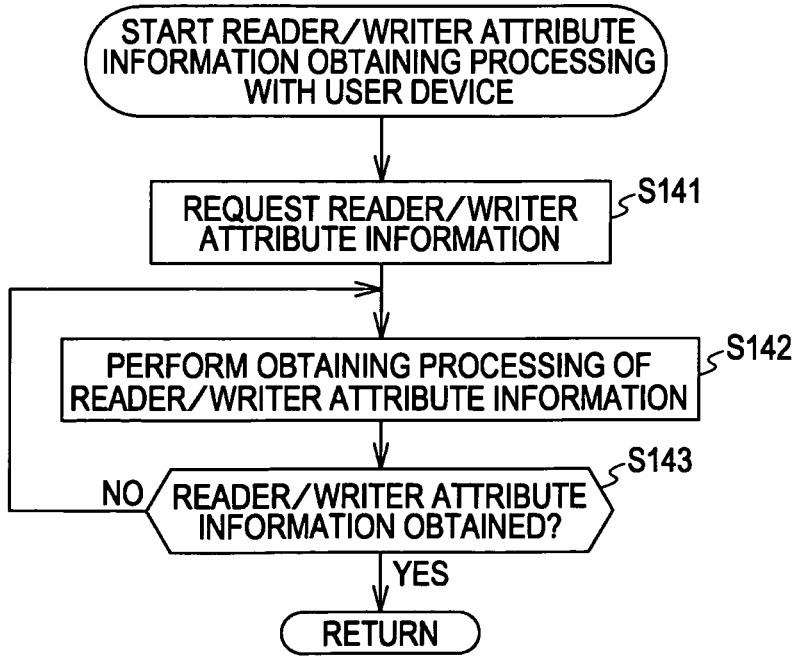
FIG. 56 is a flowchart for describing an example of the flow of reader/writer attribute information obtaining processing.

That is to say, the request accepting unit 1051 and request unit 1053 of the information sharing unit 1032 in FIG. 39, the request accepting unit 1151 and request unit 1153 of the information sharing unit 1132 in FIG. 46, the processing of step S21 and step S22 in the reader/writer attribute information supply processing in FIG. 50, the processing of step S41 in FIG. 51, the processing of step S121 and step S122 in FIG. 55, and the processing of step S141 in FIG. 56, can be omitted.

Figure 59:
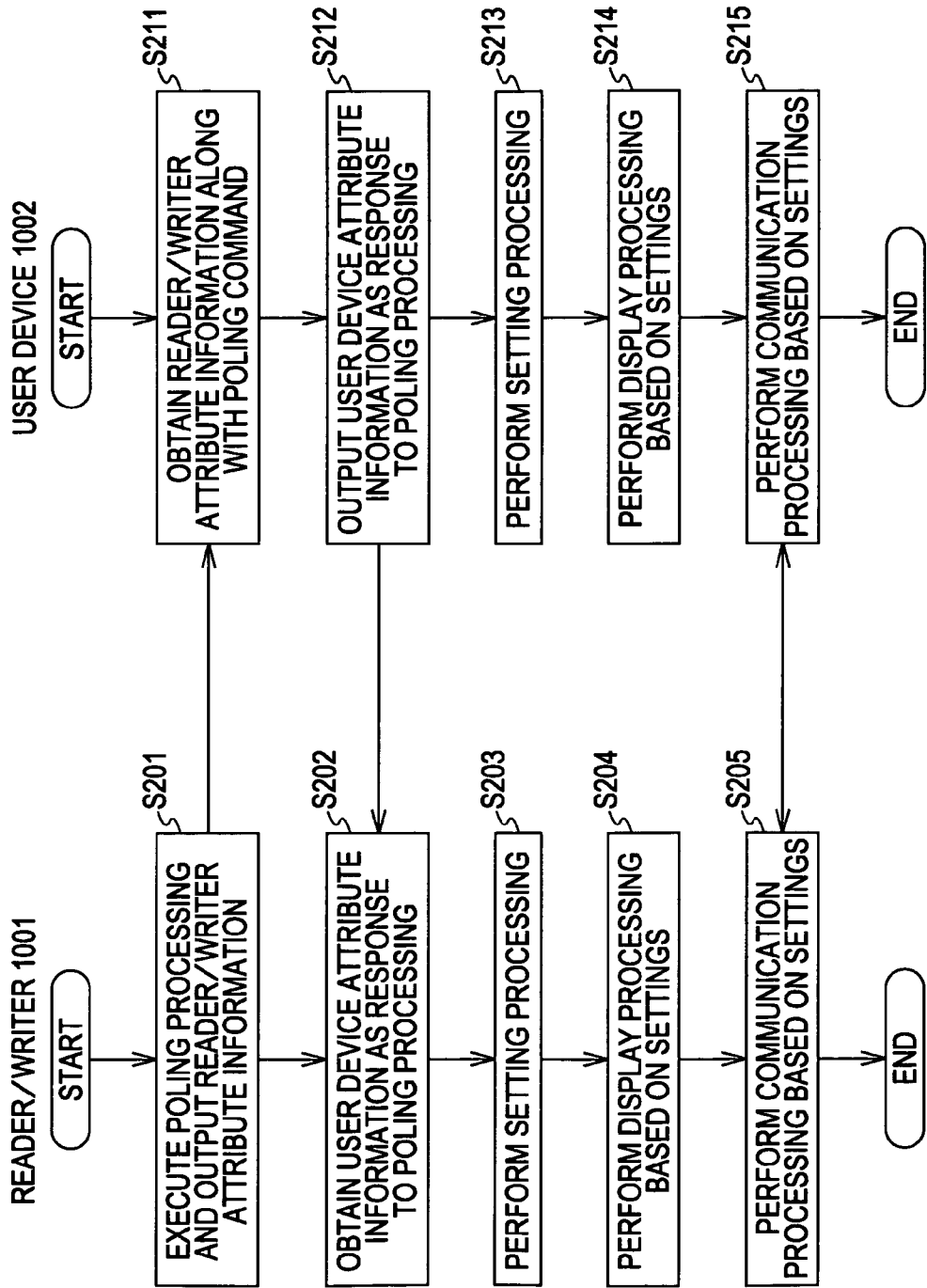
FIG. 59 is a flowchart for describing yet another example of the flow of communication optimization processing.

FIG. 59 is a flowchart illustrating an example of the flow of processing in the event of the reader/writer 1001 and user device 1002 exchanging mutual attribute information at the time of establishing communication.

First, in step. S201, the reader/writer 1001 executing polling processing, and also outputs reader/writer attribute information 1040. That is to say, the reader/writer 1001 outputs (transmits) a communication establishment request command (polling command) and also reader/writer attribute information 1040, to an undetermined device within communicable range.

For example, in the event that a user 1003 wearing the user device 1002 enters the communicable range of the reader/writer 1001 by touching the signal electrode of the reader/writer 1001, the user device 1002 obtains reader/writer attribute information 1040 along with the poling command in step S211, and in step S212 outputs user device attribute information 1140 as a response to the poling processing.

In step S202, the reader/writer 1001 obtains the user device attribute information 1140 as a response to the poling processing.

Upon obtaining the user device attribute information 1140, the reader/writer 1001 performs the setting processing in step S203 as described above, performs display processing in step S204 based on the settings, and performs communication processing with the user device 1002 in step S205 based on the settings.

Also, upon the user device 1002 outputting the user device attribute information in step S212, the user device 1002 performs the setting processing in step S213 as described above, performs display processing in step S214 based on the settings, and performs communication processing with the reader/writer 1001 based on the settings.

Thus, the reader/writer 1001 and the user device 1002 exchange mutual attribute information while performing communication establishment processing, make communication settings more suitable in accordance with the usage of the communication processing, and can perform more suitable communication processing based on the settings.

Note that attribute information of the device with which communication is being performed may be obtained from a device other than that device. For example, the attribute information of multiple devices may be centrally managed at a central server, or the like.

Also, while description has been made above that setting processing is performed based on the attribute information of the device with which communication is made, there is no need to be restricted to this, and an arrangement may be made wherein setting processing is performed with reference to both the attribute information of the device itself and the attribute information of the device with which communication is made. In this case, the settings tables used for the setting processing (e.g., settings table 1071 and settings table 1171) need to be selectable based on the attribute information of the device itself and the attribute information of the device with which communication is made.

Figure 60:
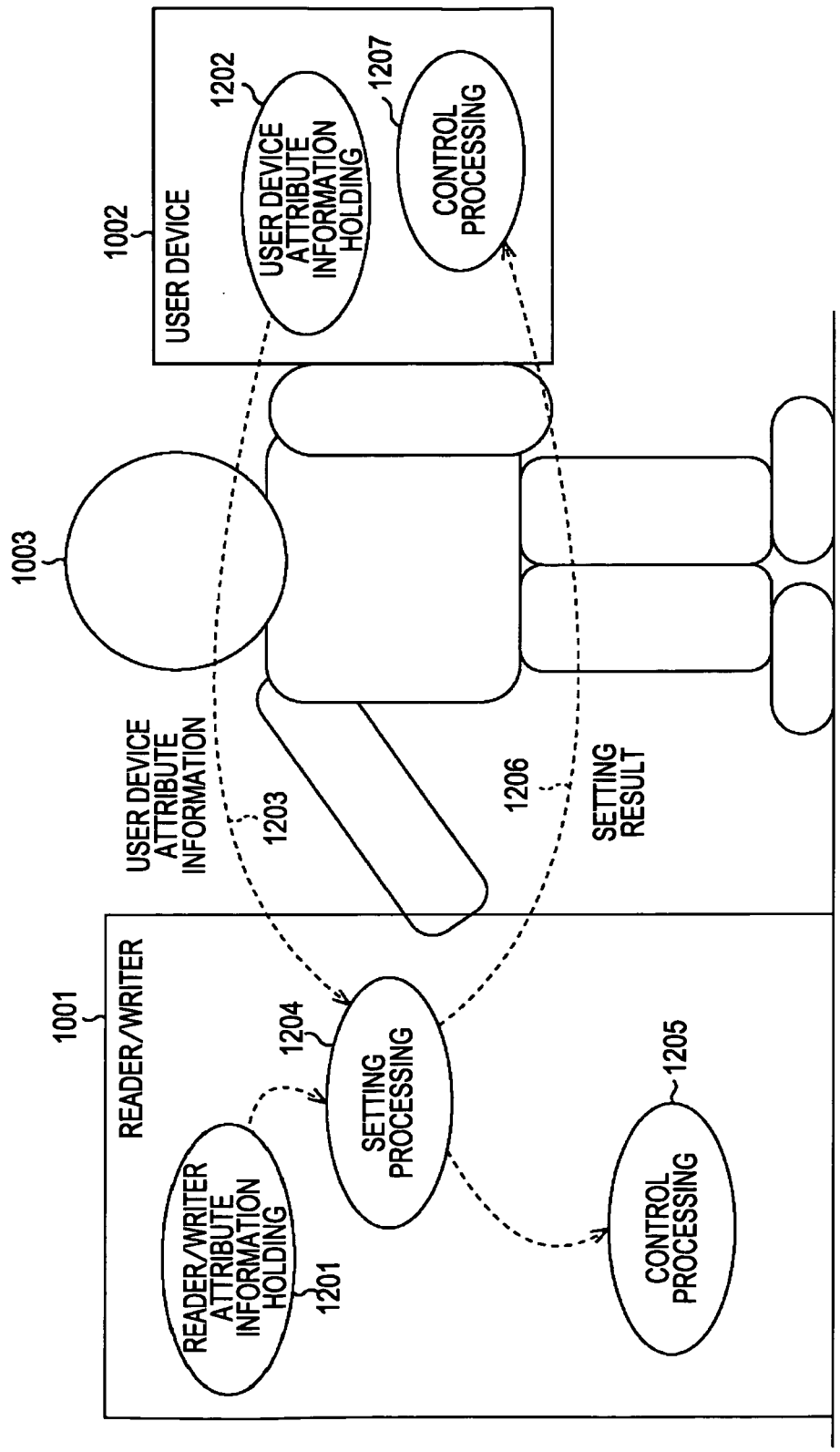
FIG. 60 is a diagram illustrating another usage example of an embodiment of a communication system to which the present invention is applied.

For example, with the communication system 1000 shown in FIG. 34, settings of not only the reader/writer 1001 but also the user device 1002 may be made at the reader/writer 1001, as shown in FIG. 60.

In the case of the example shown in FIG. 60, the reader/writer 1001 holds the reader/writer attribute information 1040 (reader/writer attribute information holding processing 1201), the user device 1002 holds the user device attribute information 1140 (user device attribute information holding processing 1202), with the user device 1002 supplying the user device attribute information 11440 which it holds to the reader/writer 1001. The reader/writer 1001 performs setting processing 1204 of both the reader/writer 1001 and the user device 1002 based on both the reader/writer attribute information 1040 hold therein and the user device attribute information 1140 supplied from the user device 1002. The reader/writer 1001 then not only performs communication processing by executing control processing 1205 based on the setting results relating to the reader/writer 1001 that have been obtained, but also supplies the obtained setting results to the user device 1002, as indicated by the arrow 1206. The user device 1002 obtains the setting results, and then performs control processing 1207 based thereupon.

Figure 61:
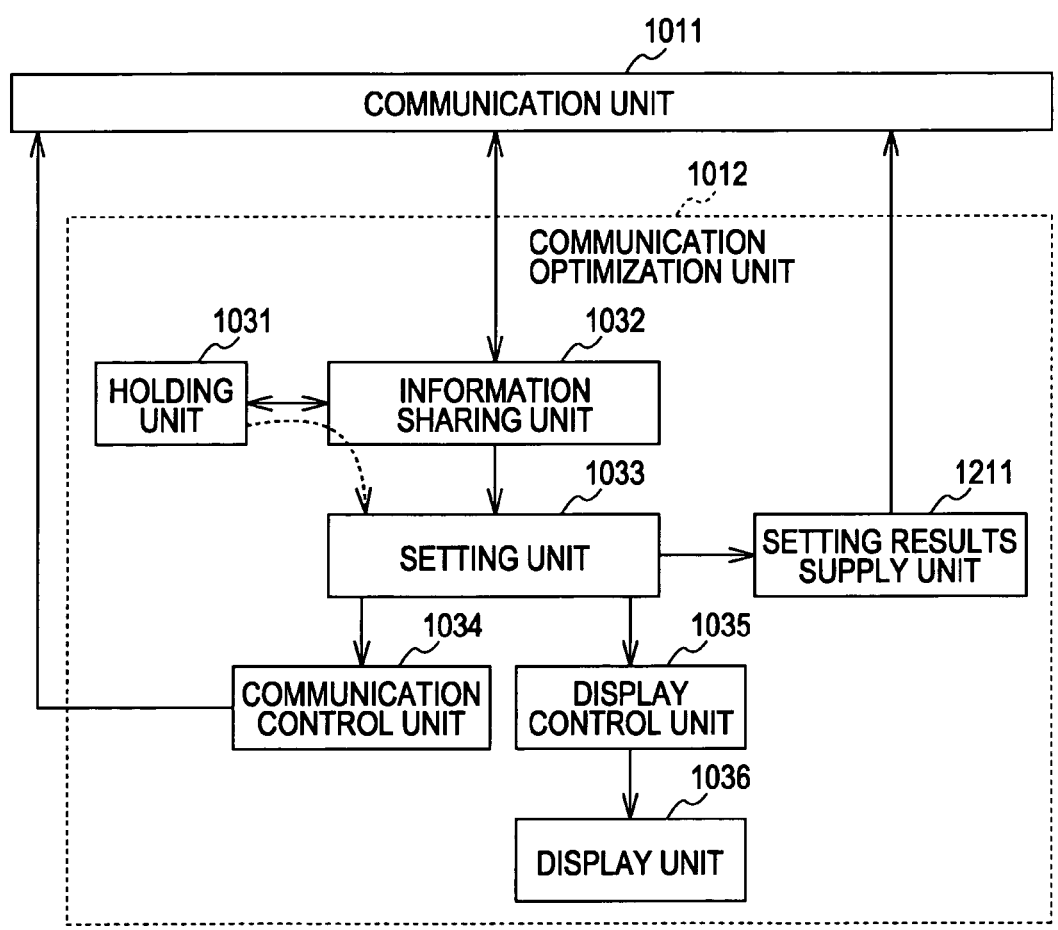
FIG. 61 is a block diagram illustrating another configuration example of the communication optimizing unit shown in FIG. 35.

In this case as well, the configuration of the reader/writer 1001 is basically the same as that of the case described with reference to FIGS. 35 through 42, but as shown in FIG. 61, the configuration of the communication optimization unit 1012 is different from the example illustrated in FIG. 36. In this case, the communication optimization unit 1012 has a setting results supply unit 1211.

The setting results supply unit 1211 obtains the setting results of the settings of the user device 1002 which the setting unit 1033 has made, then controls the communication unit 1011 to supply the setting results relating to the user device 1002 to the user device 1002.

Also, the information sharing unit 1032 not only supplies the user device attribute information 1140 obtained via the communication unit 1011 to the setting unit 1033, but also obtains the reader/writer attribute information 1040 held in the holding unit 1031 and supplies this as well to the setting unit 1033, as indicated by the dotted arrow in FIG. 61.

That is to say, the setting unit 1033 performs setting processing of both (or at least one) of the reader/writer 1001 and the user device 1001, based on both (or at least one) of the reader/writer attribute information 1040 and user device attribute information 1140 supplied from the information sharing unit 1032, and supplies the setting results (including the portion relating to the reader/writer 1001 at least) to the communication control device 1034 and the display control unit 1035, and also supplies this (including the portion relating to the user device 1002 at least) to the setting results supply unit 1212.

As described above, the communication optimization unit 1012 not only optimizes the reader/writer 1001 communication settings according to usage and function, but also performs optimization of the communication settings of the user device 1002.

Figure 62:
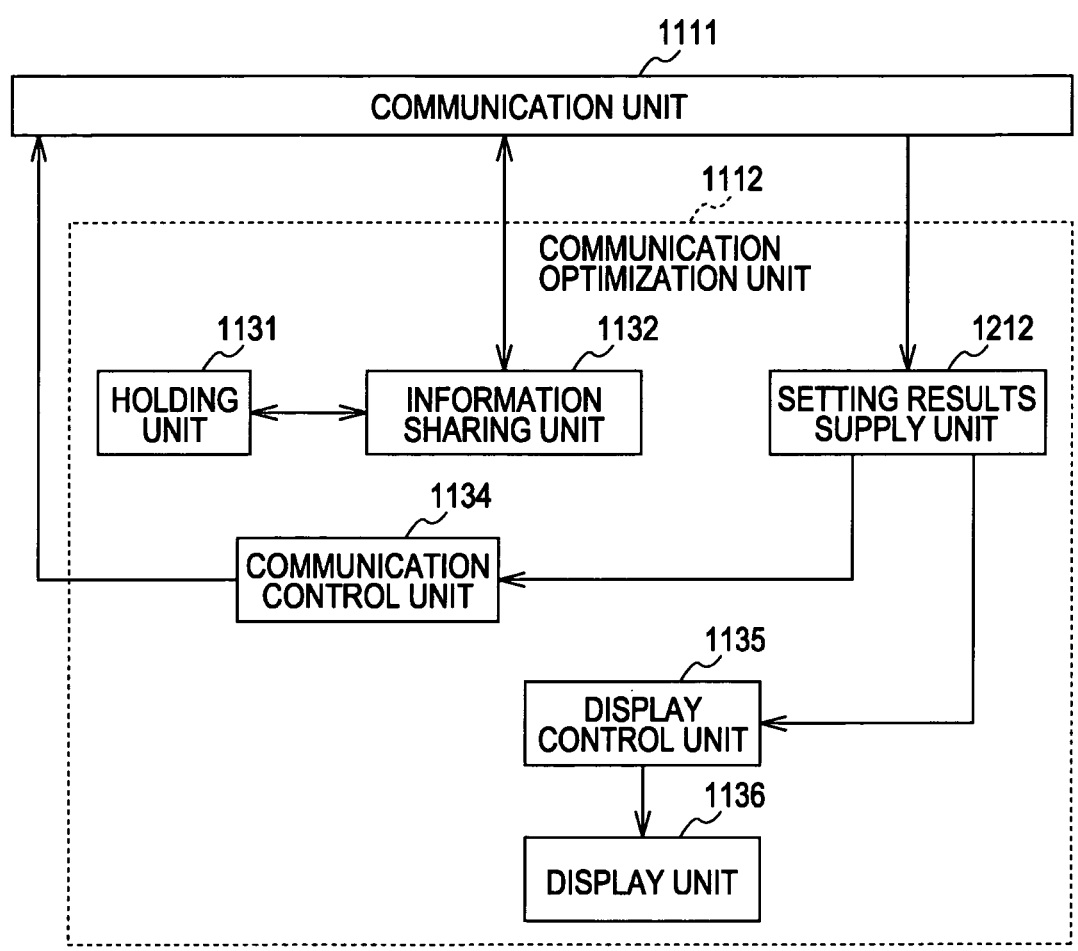
FIG. 62 is a block diagram illustrating another configuration example of the communication optimizing unit shown in FIG. 43.

Also, in this case, the configuration of the user device 1002 is basically the same as that described with reference to FIGS. 43 through 48, but as shown in FIG. 62, the configuration of the communication optimization unit 1112 differs from that shown in FIG. 44. In this case, the communication optimization unit 1112 has a setting results obtaining unit 1212 instead of the setting unit 1133 shown in FIG. 44.

The setting results obtaining unit 1212 is a processing unit corresponding to the setting results supply unit 1211 of the reader/writer 1001 shown in FIG. 61, and controls the communication unit 1111 to obtain the setting results (including the portion relating to the user device 1002 at least) supplied from the leader due to the processing by the setting results supply unit 1211, and supply this to the control unit 1134 and display control unit 1135.

The communication control unit 1134 controls the communication unit 1111 based on the supplied setting results relating to the user device 1002, and the display control device 1135 displays information relating to the supplied setting results relating to the user device 1002 on the display unit 1036.

An example of the flow of processing relating to optimization of the communication processing in this case will be described with reference to the flowchart in FIG. 63.

First, in step S311, the user device 1002 supplies the user device attribute information 1140 which it holds, to the reader/writer 1001. The reader/writer 1001 obtains the user device attribute information 1140 in step S301. Note that this processing may be triggered by a request from the reader/writer 1001.

Upon obtaining the user device attribute information 1140, the reader/writer 1001 performs setting processing for both the user device attribute information 1140 and the reader/writer attribute information 1040 in step S302, and in step S303 supplies (transmits) the setting results to the user device 1002. The user device 1002 obtains (receives) the setting results in step S312.

The reader/writer 1001 which has transmitted the setting results performs display processing in step S304 based on the settings, and in step S305 performs communication processing with the user device 1002 based on the settings.

Also, the user device 1002 which has received the setting results performs display processing in step S313 based on the settings, and in step S314 performs communication processing with the reader/writer 1001.

As described above, an arrangement may be made wherein the reader/writer 1001 performs setting processing not only for itself but also performs setting processing for the user device 1002 as well. Thus, the power consumption of the user device 1002 can be reduced.

Conversely, an arrangement may be made wherein the user device 1002 obtains attribute information from the reader/writer 1001 and makes settings for both the reader/writer 1001 and the user device 1002, so that the reader/writer 1001 performs control processing based on these settings. In this case, the configuration and processing of the reader/writer 1001 described above can be understood by substituting the configuration and processing of the user device 1002 here, so description will be omitted.

Also, an arrangement may be made wherein, in the event that exchange of attribute information fails due to communication trouble or the like, for example, each of the devices perform setting processing based on its own attribute information, and an arrangement may be made wherein the display unit displays a message indicating that exchange has failed.

Next, description will be made regarding another example of attribute information to be exchanged as described above. The description made so far has dealt with the communication devices exchanging attribute information with each other, and changing the settings of the devices to create an optimal state, as the primary object of the arrangement. Examples of attribute information described so far include information relating to processing speed, information relating to transmission power, information relating to reception sensitivity, information relating to presence or absence of a power source, and information relating to power source state, but any sort of parameters may be used as long as the above primary object is achieved. Other examples may be security functions, clock speed, hardware information and so forth.

Figure 64A:
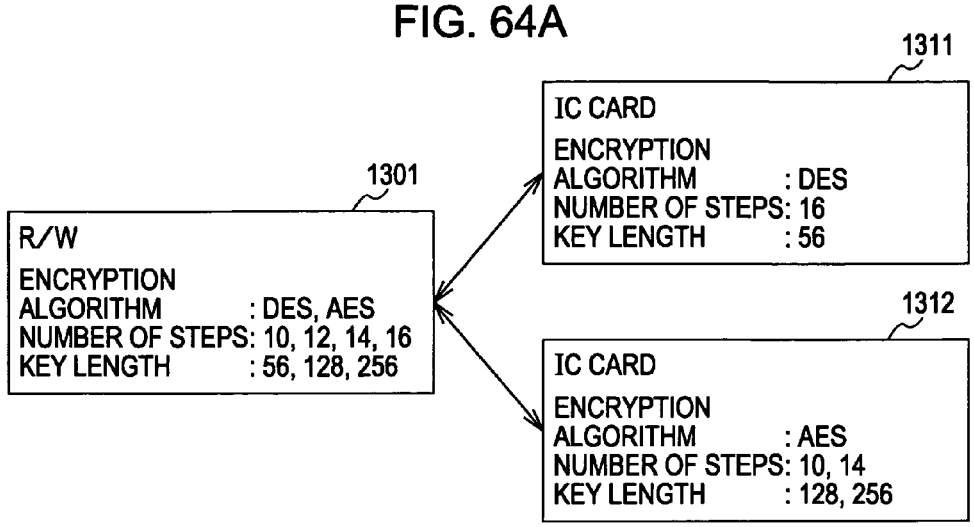
FIGS. 64A through 64C are diagrams for describing examples wherein attribute information is a security function.
Figure 64B:
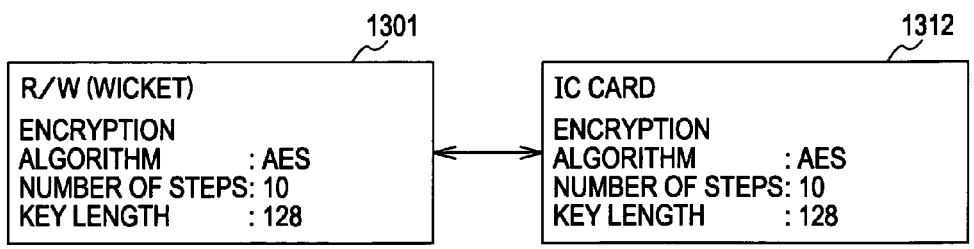
Figure 64C:
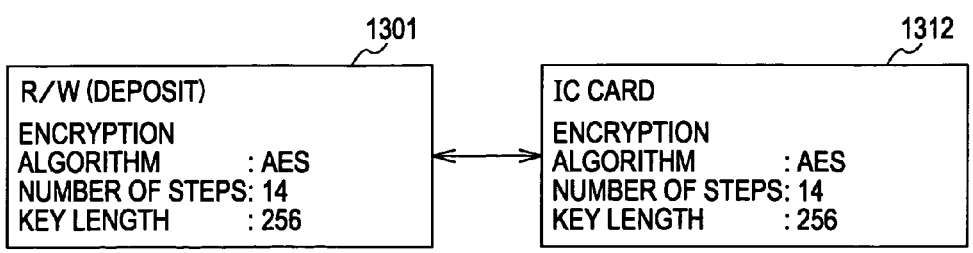

FIGS. 64A through 64C are diagrams for describing cases of exchanging attribute information relating to security functions.

In the example shown in FIG. 64A, encryption algorithm, number of steps in the algorithm, and length and type of key, and so forth are exchanged as attribute information, with each device confirming the functions of the other, and agreeing on the encryption method to use for communication.

In FIG. 64A, the reader/writer (R/W) 1301 is capable of selecting one of DES (Data Encryption Standard) and AES (Advanced Encryption Standard) as the encryption algorithm, is capable of selecting one of 10 steps, 12 steps, 14 steps, and 16 steps, as the number of steps, and further is capable of selecting one of 56-bit, 128-bit, and 256-bit, as the key length. That is to say, the reader/writer 1301 is capable of performing communication with a method selected as a combination from these multiple encryption processing methods.

For example, the IC card 1311 can perform encryption processing with 16-step DES using a 56-bit encryption key, so in the event of communication with such a user device, the reader/writer 1301 performs encryption processing with the encryption method which the IC card 1311 is capable of using for communication (DES, 16 steps, 56-bit)

Also, for example, the IC card 1312 can perform encryption processing with 10-step or 14-step AES using a 128-bit or 256-bit key, so in the event of communication with such a user device, the reader/writer 1301 performs encryption processing with the encryption method which the IC card 1312 is capable of using for communication (AES, 10 steps or 14 steps, 128-bit or 256-bit).

In the event that communication can be performed with the other device using multiple encryption processing methods, as with the case of the reader/writer 1301 and the IC card 1312, the encryption processing method can be selected according to the usage of communication (i.e., the contents of processing performed regarding the communication).

For example, in the event of automatic wicket processing which requires high speed, an arrangement may be made wherein communication is set to be performed with 10 steps and a key length of 128 bits, as shown in FIG. 64B, while in the event of payment processing, security demands are high but processing speed is not required, so an arrangement may be made wherein communication is set to be performed with 14 steps and a key length of 128 bits, as shown in FIG. 64C.

Thus, in the event of exchanging attribute information relating to security functions, the configurations and actions of the communication system 1000 shown in FIG. 34 is basically the same as the cases described with reference to FIGS. 35 through 59, but with some of the parameters and processing contents differing.

Figure 65A:
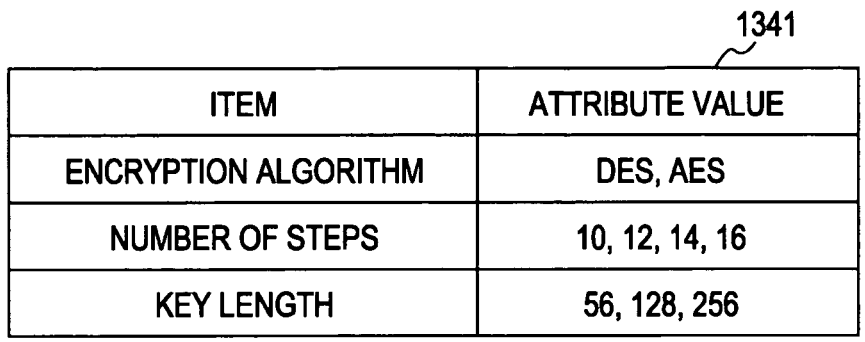
FIGS. 65A and 65B are tables illustrating other configuration examples of reader/writer attribute information.

For example, the reader/writer hardware attribute information 1041 which is information relating to the functions of the reader/writer 1001 (hardware restrictions) described with reference to FIG. 38A is configured of items relating to security functions and the attribute values thereof, as shown in the reader/writer hardware attribute information 1341 shown in FIG. 65A.

That is to say, for example, for "items" there are "encryption algorithm" indicating the algorithm for encryption processing, "steps" indicating the number of steps of the encryption processing, "key length" indicating the length of the encryption key (in bits), and so forth. As for attribute values, for example, "DES" and "AES" are provided for "encryption algorithm", "10" steps, "12" steps, "14" steps, and "16" steps are provided for "steps", and "56" bits, "128" bits, and "256" bits are provided for "key length.

Of course, the above-described example is no more than that, an example, and other items and other attribute values which the items have may be used.

Figure 65B:
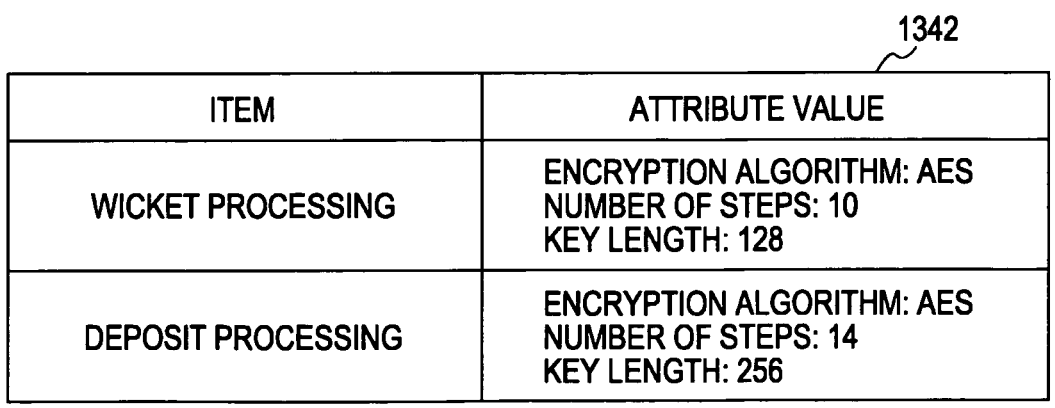

Also, in the same way, the reader/writer software attribute information 1042 which is information relating to the usage of the reader/writer 1001 (software) is configured of items relating to security functions and the attribute values thereof, as with the reader/writer software attribute information 1342 shown in FIG. 65B.

That is, there are the items of "wicket processing" and "payment processing", for example. Also, as for the attribute values indicating the hardware settings for each item (usage), for example, "wicket processing" regarding which high-speed processing is required has "encryption algorithm: AES", "steps: 10", and "key length: 128" assigned thereto, and for "payment processing" regarding which surety and safety are more important that processing speed, "encryption algorithm: AES", "steps: 14", and "key length: 256" are assigned.

Of course, the above-described example is no more than that, an example, and other items and other attribute values which the items have may be used.

Also, the settings table 1071 shown in FIG. 41 thus is also table information for determining the attribute values of the items such as described above, based on the hardware restrictions and the usage of the user device 1002 with regard to security functions, but the table contents are configured of combinations between the items and attribute values of the items shown in FIG. 65, so description thereof will be omitted.

Figure 66A:
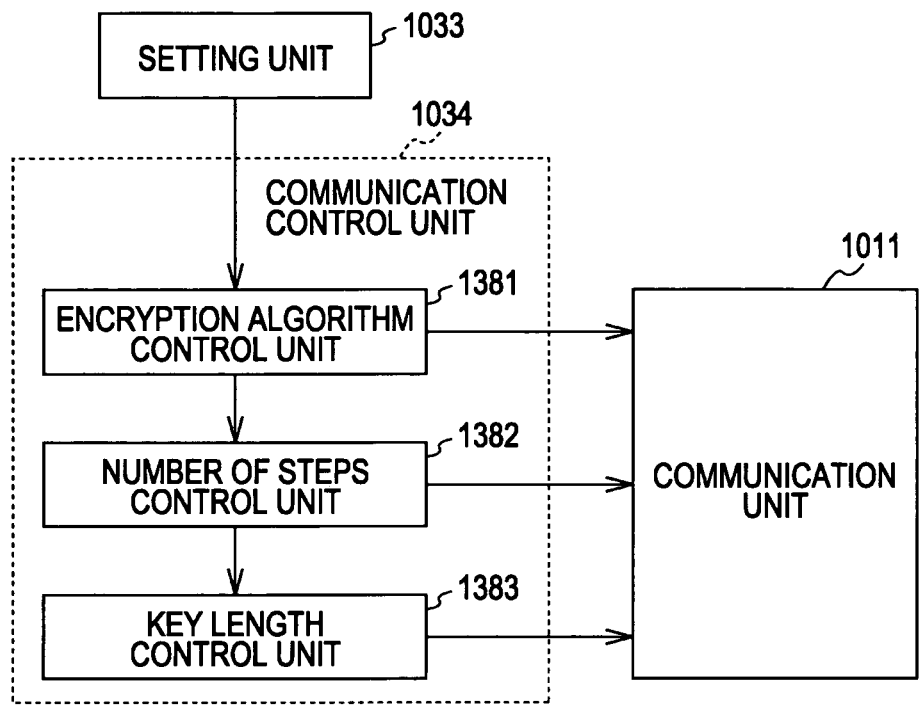
FIGS. 66A and 66B are block diagrams illustrating other configuration examples of communication control units.
Figure 66B:
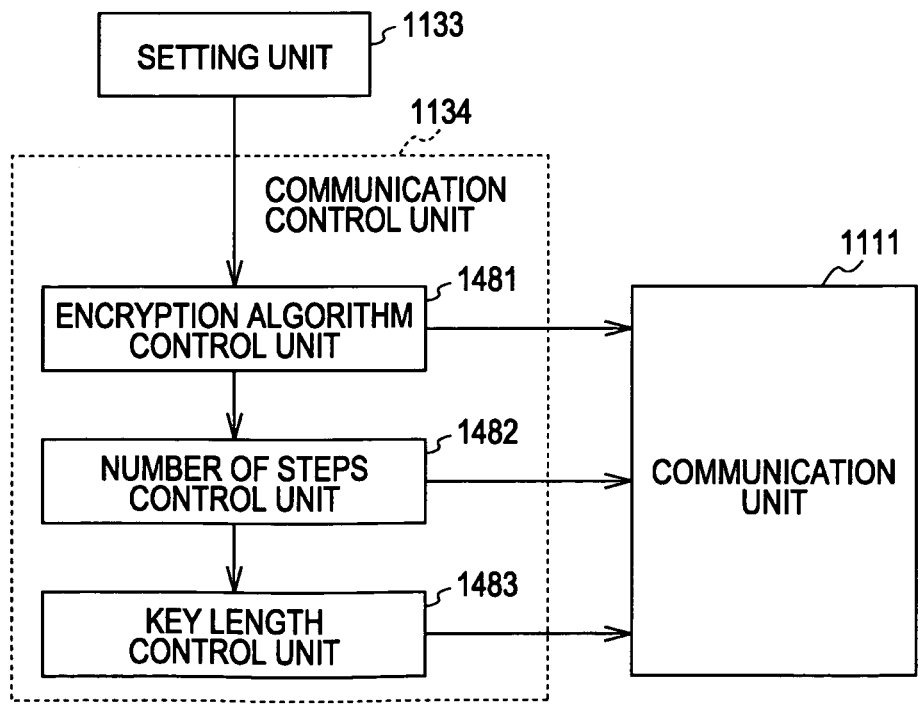

Also, the configuration of the communication control unit 1034 and communication control unit 1134, carried out based on the attribute information relating to such security functions is as shown in FIGS. 66A and 66B.

In this case, the communication control unit 1034 described with reference to FIG. 42 takes on a configuration such as shown in FIG. 66A, having an encryption algorithm control unit 1381, a number of steps control unit 1382, and a key length control unit 1383, instead of the processing speed control unit, transmission power control unit 1082, and reception sensitivity control unit 1083.

The encryption algorithm control unit 1381 controls the communication unit 1011 relating to the encryption algorithm used for encryption processing, the number of steps control unit 1382 controls the communication unit 1011 relating to the number of steps of the encryption processing, and the key length control unit 1383 controls the communication unit 1011 relating to the key length of the encryption key (decryption key) used for the encryption processing. That is to say, in this case, the communication control unit 1034 controls the encryption processing at the communication unit 1011.

In the same way, the communication control unit 1134 described with reference to FIG. 48 takes on a configuration such as shown in FIG. 66B, having an encryption algorithm control unit 1481, a number of steps control unit 1482, and a key length control unit 1483, instead of the processing speed control unit, transmission power control unit 1182, and reception sensitivity control unit 1183. The encryption algorithm control unit 1481 controls the communication unit 1111 relating to the encryption algorithm used for encryption processing, the number of steps control unit 1482 controls the communication unit 1111 relating to the number of steps of the encryption processing, and the key length control unit 1483 controls the communication unit 1111 relating to the key length of the encryption key (decryption key) used for the encryption processing. That is to say, in this case, the communication control unit 1134 controls the encryption processing at the communication unit 1111.

Accordingly, the flow of control processing by the reader/writer 1001 described with reference to the flowchart in FIG. 53 is as shown in the flowchart in FIG. 67.

That is to say, in step S401, the encryption algorithm control unit 1381 of the communication control unit 1034 determines whether or not to control the encryption algorithm, and in the event that determination is made to control the encryption algorithm, the flow proceeds to step S402, where the encryption algorithm to be used for encryption processing is controlled, based on the setting results supplied from the setting unit 1033. Upon control of the encryption algorithm being completed, the encryption algorithm control unit 1381 supplies the setting results to the number of steps control unit 1382, and the flow proceeds to step S403. Also, in the event that determination is made in step S401 not to control the encryption algorithm, the encryption algorithm control unit 1381 omits the processing of step S402 and supplies the setting results to the number of steps control unit 1382, and the flow proceeds to step S403.

Also, in step S403, the number of steps control unit 1382 determines whether or not to control the number of steps, and in the event that determination is made to control the number of steps, the flow proceeds to step S404, where the communication unit 1011 is controlled, and the processing number of steps of encryption processing is controlled, based on the setting results supplied from the encryption algorithm control unit 1381. Upon control of the number of processing steps being completed, the number of steps control unit 1382 supplies the setting results to the key length control unit 1383, and the flow proceeds to step S405. Also, in the event that determination is made in step S403 not to control the number of processing steps, the number of steps control unit 1382 omits the processing of step S404 and supplies the setting results to the key length control unit 1383, and the flow proceeds to step S405.

Also, in step S405, the key length control unit 1383 determines whether or not to control the key length, and in the event that determination is made to control the key length, the flow proceeds to step S406, where the communication unit 1011 is controlled, and the key length (bit length) of the encryption key is controlled, based on the setting results supplied from the number of steps control unit 1382. Upon control of the key length being completed, the flow proceeds to step S407. Also, in the event that determination is made in step S405 not to control the key length, the key length control unit 1383 omits the processing of step S406 and the flow proceeds to step S407.

The display unit 1035 which has been supplied with the setting results from the setting unit 1033 determines in step S407 whether or not to display information relating to the setting results on the display unit 1036, in the same way as with step S89, and in the event that determination is made to display this information, the flow proceeds to step S408, and in the same way as with step S90, the display unit 1036 is controlled and information relating to the setting results is displayed.

Upon step S408 ending, the display control unit 1035 ends the control processing, thereby ending the processing of step S4 in FIG. 49, and also ending the communication optimization processing.

Figure 57:
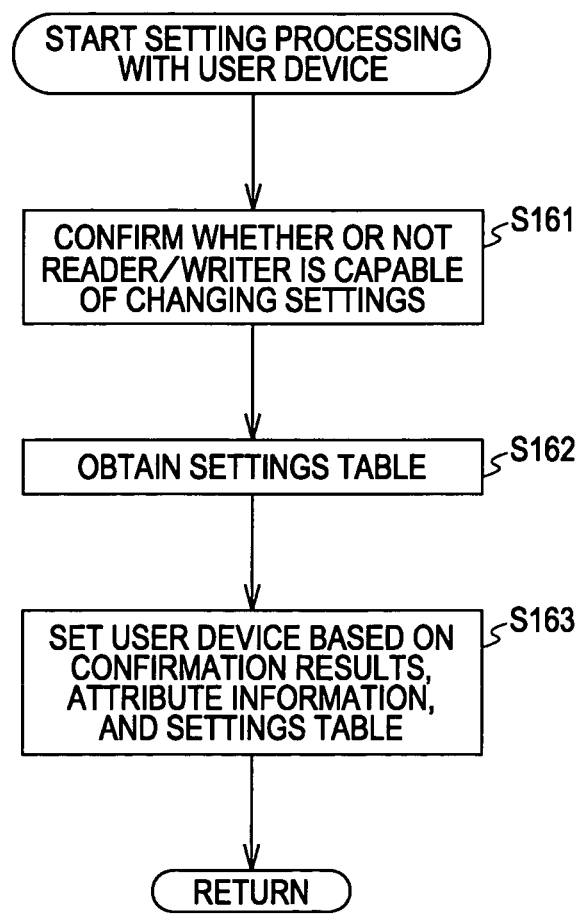
FIG. 57 is a flowchart for describing another example of the flow of setting processing.

In the event that determination is made in step S407 shown in FIG. 57 to not display information relating to the setting results on the display unit 1036, the display control unit 1035 omits the processing of step S408 to end the control processing, thereby ending the processing of step S4 in FIG. 49, and also ending the communication optimization processing.

Due to the above processing, the reader/writer 1001 can set encryption processing to be performed in the communication processing to more suitable settings in accordance with the usage of the communication processing, based on the setting results from the setting unit 1033. That is to say, the reader/writer 1001 can provide services using communication processing settings more suitably.

The communication control unit 1134 of the example shown in FIG. 66B performs control processing with the user device described with reference to the flowchart in FIG. 58 in the same way as the control processing with the reader/writer described with reference to the flowchart in FIG. 67, so description thereof will be omitted.

That is to say, the user device 1002 can set the encryption processing performed in communication processing to a more suitable setting in accordance with the usage of the communication processing, the same as with the reader/writer 1001.

Figure 68A:
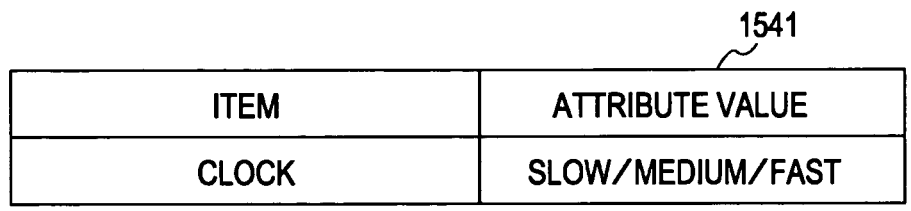
FIGS. 68A and 68B are tables illustrating further configuration examples of reader/writer attribute information.
Figure 68B:
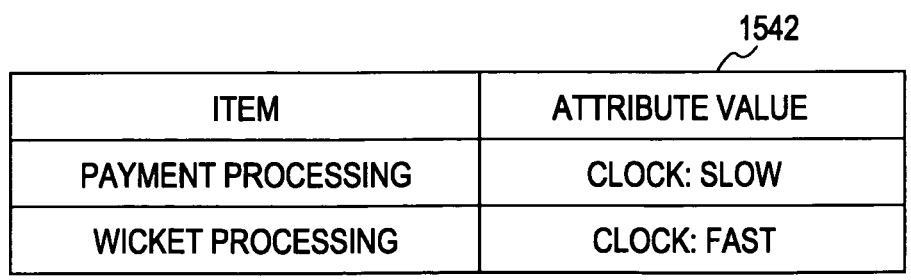

Next, description will be made regarding a case wherein the attribute information is operation clock. FIGS. 68A and 68B are diagrams illustrating a case of exchanging attribute information relating to the operation clock.

In the event that the attribute information is the operation clock, "clock" is provided in the reader/writer hardware attribute information 1541 as an item, as shown in FIG. 68A, with the attribute values of "slow", "medium", and "fast" being available for selection.

Of course, the above-described example is no more than that, an example, and other items and other attribute values which the items have may be used.

At this time, as shown in FIG. 68B, the reader/writer software attribute information 1542 has the attribute value "clock" set to "slow" for "payment processing" regarding which there is no need to raise the processing speed, and the attribute value "clock" set to "fast" for "wicket processing" regarding which fast processing speed is required even if this means increased power consumption, i.e., attribute values are assigned to the items.

Figure 69A:
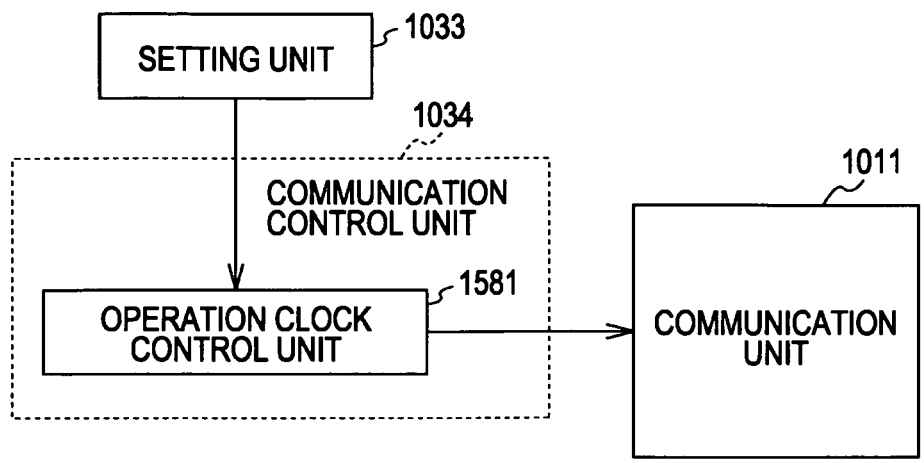
FIGS. 69A and 69B are block diagrams illustrating further configuration examples of communication control units.
Figure 69B:
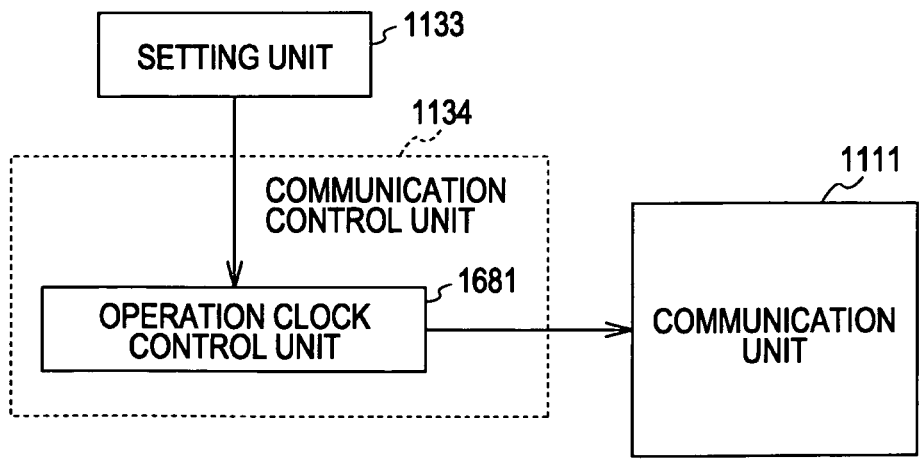

As shown in FIG. 69A, such operation clock control is performed at the reader/writer 1001 by an operation clock control unit 1581 which the communication control unit 1034 has, and at the user device 1002 is performed by an operation clock control unit 1681 which the communication control unit 1134 has, as shown in FIG. 69B. Note that the contents of the settings table 1071 are configured of combinations between the items and attribute values of the items shown in FIG. 68, so description thereof will be omitted.

Figure 70:
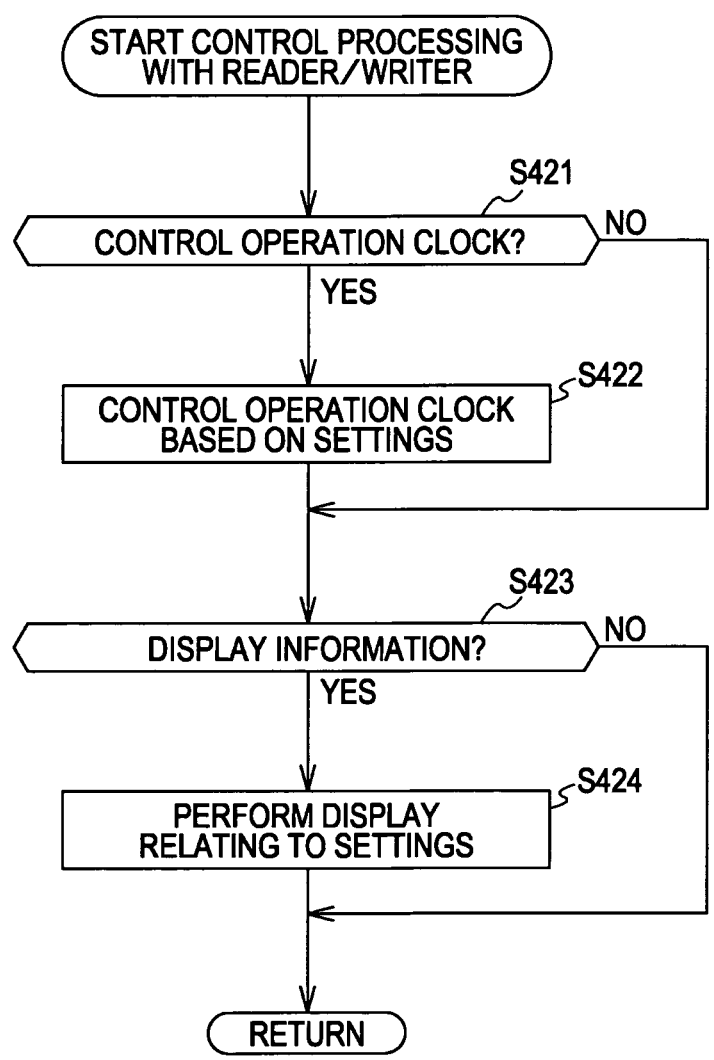
FIG. 70 is a flowchart for describing yet another example of the flow of control processing.

Now, the flow of control processing performed with the reader/writer 1001 in this case will be described with reference to the flowchart in FIG. 70.

In step S421, the operation clock control unit 1581 determines whether or not to control the operation clock, and in the event that determination is made to control the operation clock, the flow proceeds to step S422, where the operation clock of the communication processing (communication unit 1011) is controlled based on the setting results supplied from the setting unit 1033. For example, the operation clock control unit 1581 operates the operation clock at a predetermined initial value at the time of starting operations, and following exchanging of attribute information, changes the operation clock according to the processing contents (usage).

Upon control of the operation clock ending, the operation clock control unit 1581 proceeds to step S423. Also, in the event that determination is made in step S421 to not control the operation clock, the operation clock control unit 1581 omits the processing of step S422 and proceeds to step S423.

The display control unit 1035 which has been supplied with the setting results from the setting unit 1033 determines in step S423 whether or not to display information relating to the setting results on the display unit 1036 as in the case of step S89, and in the event that determination has been made to display, the flow proceeds to step S424, where the display unit 1036 is controlled in the same way as with that of step S90, and information relating to the setting results is displayed.

Upon the processing in step S424 ending, the display control unit 1035 ends the control processing, thereby ending the processing of step S4 in FIG. 49, and also ending the communication optimization processing.

Figure 67:
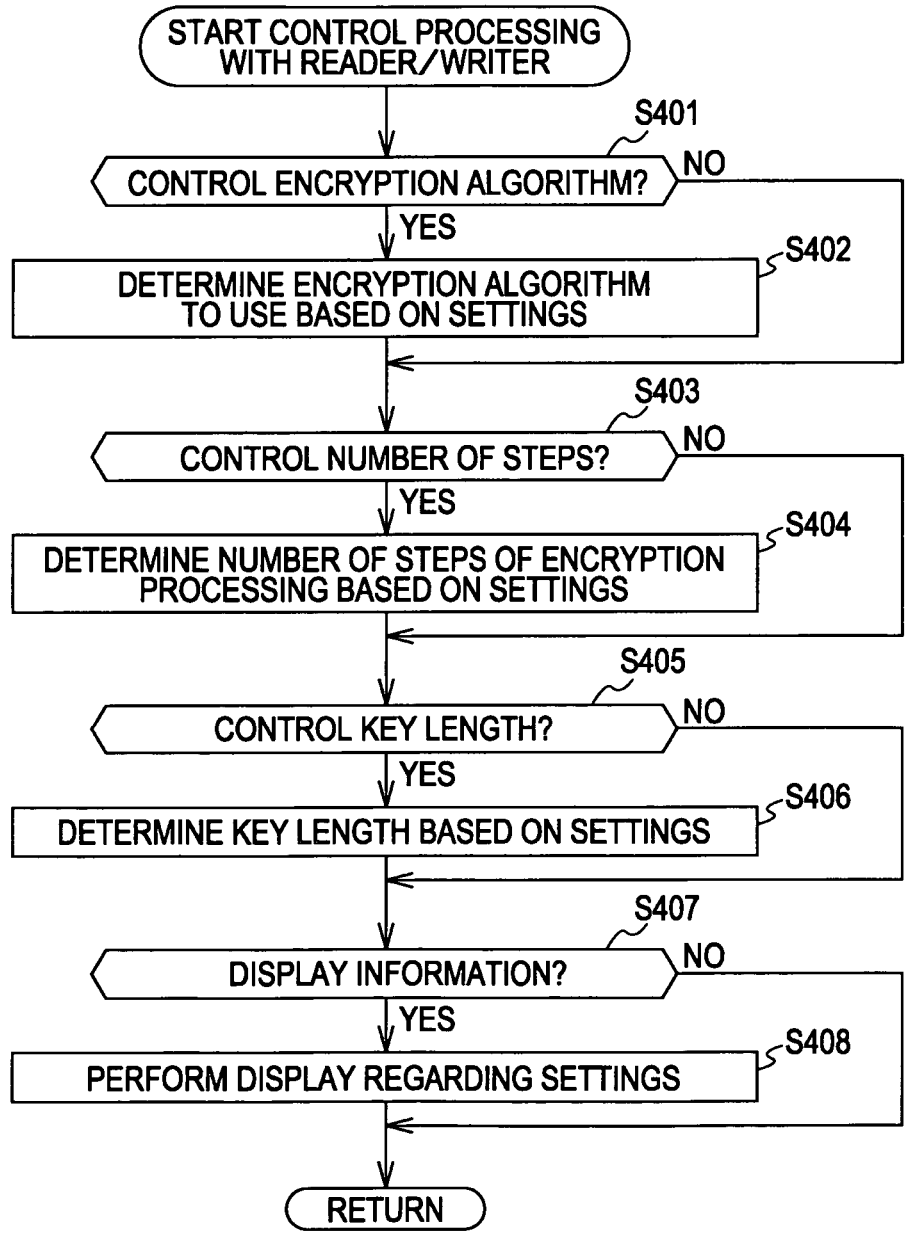
FIG. 67 is a flowchart for describing another example of the flow of control processing.

Also, in the event that determination is made in step S423 shown in FIG. 67 to not display information relating to the setting results on the display unit 1036, the display control unit 1035 omits the processing of step S424 to end the control processing, thereby ending the processing of step S4 in FIG. 49, and also ending the communication optimization processing.

Due to the above processing, the reader/writer 1001 can set the operation clock for communication processing to more suitable settings in accordance with the usage of the communication processing, based on the setting results from the setting unit 1033. That is to say, the reader/writer 1001 can provide services using communication processing set more suitably.

Note that the communication control unit 1134 shown in FIG. 69B performs the control processing with the user device described with reference to the flowchart in FIG. 58 in the same way as with the control processing of the reader/writer described with reference to the flowchart in FIG. 70, so description thereof will be omitted.

That is to say, with the user device 1002, the operation clock for communication processing can be set to more suitable settings according to the usage of the communication processing, in the same way as with the reader/writer 1001.

Next, description will be made regarding a case wherein the attribute information is information relating to hardware functions which the reader/writer or user device has.

For example, with a known electronic money system using an IC card, the user has been notified by, for example, in the case of payment with electronic money being completed, emitting a clinking sound imitating that of coins, or in the case of automatic wicket processing, opening the gate and emitting a beeping sound, or displaying remaining credits, expiration data of a pass, and so forth, on a display unit.

In recent years, cellular telephone devices having IC card functions have come into widespread use, and the IC card side devices (cellular telephone devices in this case) have come to have functions wherein processing-completed information can be notified to the user, but the reader/writers in conventional electronic money systems have made no distinction between whether the device with which communication is being performed is a conventional-type IC card or a cellular telephone device having IC card functions, and accordingly, always made the processing-completed notification at itself.

However, the processing-completed notification may include personal information such as balance amount or the like, so notification at a reader/writer which other users might be able to view is undesirable in some cases. Also, there may be cases wherein the user will want to confirm the information contained in the processing-completed notification at a later time. In such cases, notification is preferably made at the user device rather than the reader/writer. However, in the event that the user device is a conventional IC card which has no output functions, the processing-completed notification cannot be made at the user device.

Thus, there are cases wherein processing is preferably changed according to the hardware functions of the device with which communication is being made.

Figure 71:
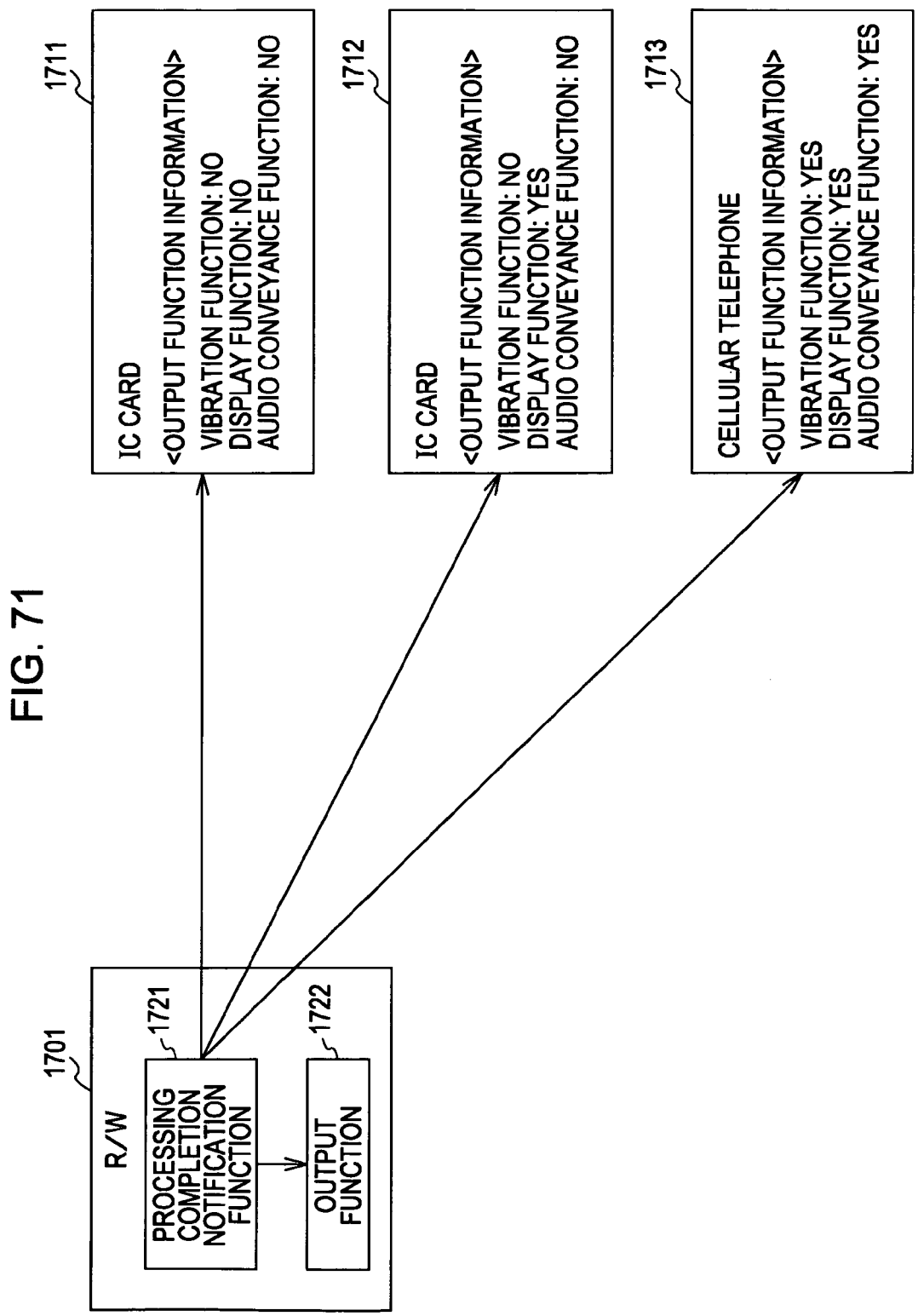
FIG. 71 is a diagram for describing an example wherein attribute information is a hardware function.

For example, The reader/writer 1701 shown in FIG. 71 has a processing completion notification function 1721 for notifying of completion of a service using communication processing with another device, and an output function 1722 for outputting images and audio.

For example, in the event that the other device with which the reader/writer 1701 is communicating with is an IC card 1711, the processing completion notification function 1721 obtains the output function information of the IC card 1711 by exchanging attribute information, and upon comprehending that the IC card 1711 has none of the "vibration function" wherein the casing is vibrated, "display function" for displaying on a display or the like, and "audio-conveyance function" such as a speaker or the like, as output functions, the user is notified of completion of processing, using the output functions 1722 of the reader/writer 1701 itself, such as vibrating the casing of the reader/writer 1701, displaying text or images on a display, or outputting audio.

Also, in the event that the other device with which the reader/writer 1701 is communicating is an IC card 1712, the processing completion notification function 1721 obtains the output function information of the IC card 1712 by exchanging attribute information, and upon comprehending that the IC card 1712 has "display function" as an output function, the display function is used to display text or images on the display of the IC card 1712, so as to notify the user with the IC card 1712. Even in the event that the processing completion notification function 1721 includes functions for audio output or vibrating the casing as a way of making notification of completion of processing, the IC card 1712 does not have vibration functions or audio conveyance functions in this case, so the processing completion notification function 1721 performs processing corresponding to display functions alone.

Further, for example, in the event that the other device with which the reader/writer 1701 is communicating is a cellular telephone 1713, the processing completion notification function 1721 obtains the output function information of the cellular telephone 1713 by exchanging attribute information, and upon comprehending that the cellular telephone 1713 has all of the "vibration function", "display function", and "audio conveyance function", as output functions, the user is notified of completion of processing, using the vibration function to vibrate the casing of the cellular telephone 1713, using the display function to display text or images on the display of the cellular telephone 1713, or using audio conveyance functions to output audio from the speaker of the cellular telephone 1713.

Of course, the above-described example is no more than that, an example, and other items and other attribute values which the items have may be used.

In this case as well, processing which the processing completion notification function 1721 performs may be changed according to the processing (usage). For example, the functions of vibration, image display, audio conveyance, and so forth, may be used according to the processing being performed.

In such a case, the reader/writer hardware attribute information can be configured such as shown in FIG. 72A, and the reader/writer software attribute information configured as shown in FIG. 72B. In the case of the reader/writer hardware attribute information 1741 shown in FIG. 72A, there are the items of "vibration function", "display function", and "audio conveyance function", and either "0: No" or "1: Yes" can be selected as attribute values for each. Also, with the reader/writer software attribute information 1742 shown in FIG. 72B, in the case of "wicket processing", the processing completion notification does not use the "vibration" function of the user device (No), and uses a "pattern A" display with the "display" function and "pattern B" audio output with the "audio conveyance" function. Also, in the case of "payment processing", processing completion notification is made with a "pattern C" vibration with the "vibration" function, "pattern D" display with the "display" function, and "pattern E" audio output with the "audio conveyance" function.

Thus, the reader/writer 1001 and the user device 1002 can change the processing to be executed according to the hardware functions of the device with which communication is being made and the processing contents (usage) by exchanging attribute information relating to hardware.

Note that the contents of the settings table 1071 are configured of combinations between the items and attribute values of the items shown in FIGS. 72A and 72B, so description thereof will be omitted.

Figure 73A:
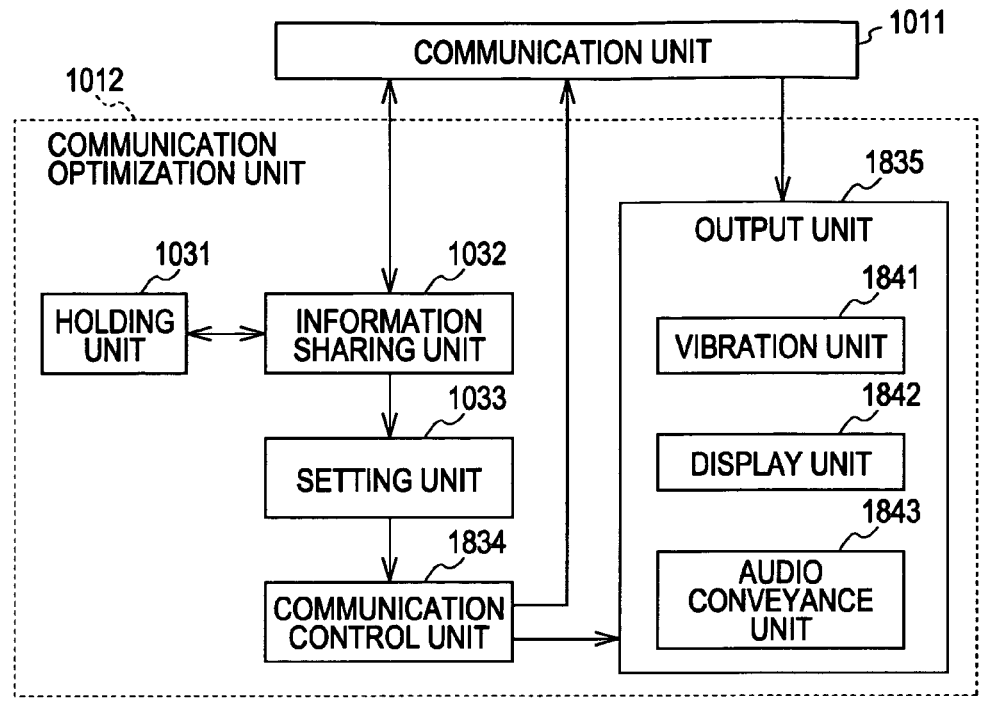
FIGS. 73A and 73B are block diagrams illustrating further configuration examples of the communication optimizing unit.

With the block configuration in this case, the communication optimization unit 1012 of the reader/writer 1001 shown in FIG. 36 has a configuration such as shown in FIG. 73A. That is to say, the communication optimization unit 1012 has a communication control unit 1834 instead of the communication control unit 1034 in the case of the example shown in FIG. 36, and has an output unit 1835 instead of the display control unit 1035 and display unit 1036.

The communication control unit 1834 controls the operation of the communication unit 1011 and the output unit 1835, based on the settings of the setting unit 1033. The output unit 1835 has a vibration unit 1841 wherein the casing of the reader/writer 1001 is vibrated, a display unit 1842 including a display for displaying text and images, and an audio conveyance unit 1843 including as a speaker or the like. That is to say, the output unit 1835 causes the vibration unit 1841 to vibrate the casing, or the display unit 1842 to display text or images, or the audio conveyance unit 1843 to output audio, to notify the user of ending of the communication processing by the communication unit 1111 (or of predetermined service processing using the communication processing), based on the control of the communication control unit 1834.

Figure 73B:
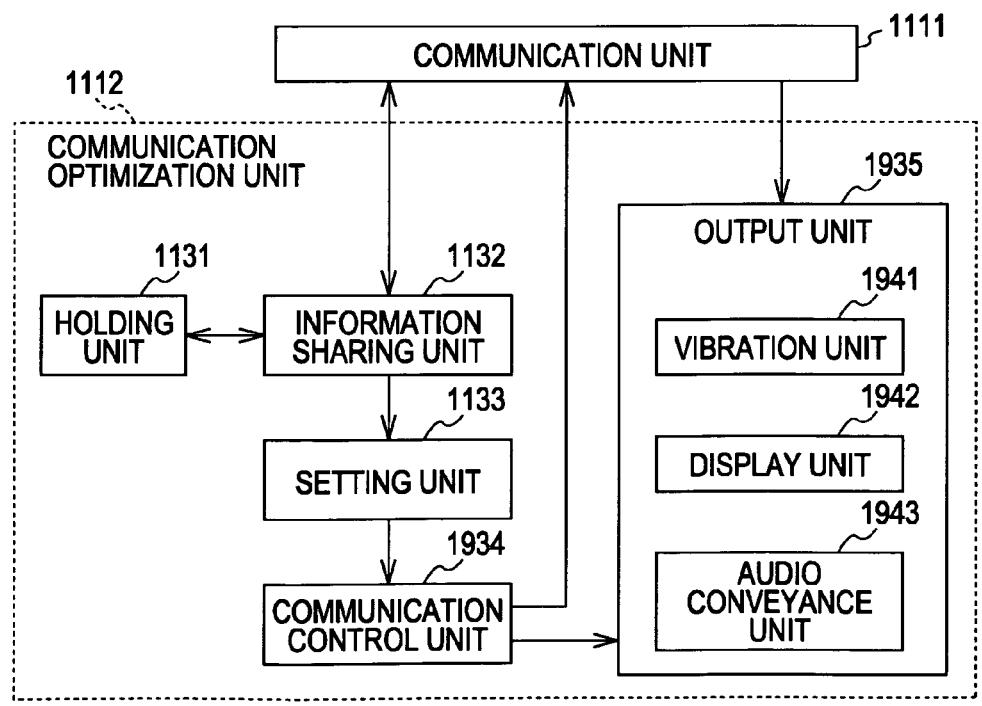

Also, at this time, the communication optimization unit 1112 of the user device 1002 shown in FIG. 44 has a configuration such as shown in FIG. 73B. That is to say, the communication optimization unit 1112 has a communication control unit 1934 instead of the communication control unit 1134 in the case of the example shown in FIG. 44, and has an output unit 1935 instead of the display control unit 1135 and display unit 1136.

The communication control unit 1934 controls the communication unit 1111 and the output unit 1935, based on the settings of the setting unit 1133. The output unit 1935 has a vibration unit 1941 wherein the casing of the reader/writer 1001 is vibrated, a display unit 1942 including a display for displaying text and images, and an audio conveyance unit 1943 including as a speaker or the like. That is to say, the output unit 1935 causes the vibration unit 1941 to vibrate the casing, or the display unit 1942 to display text or images, or the audio conveyance unit 1943 to output audio, to notify the user of ending of the communication processing by the communication unit 1111 (or of predetermined service processing using the communication processing), based on the control of the communication control unit 1934.

Figure 74:
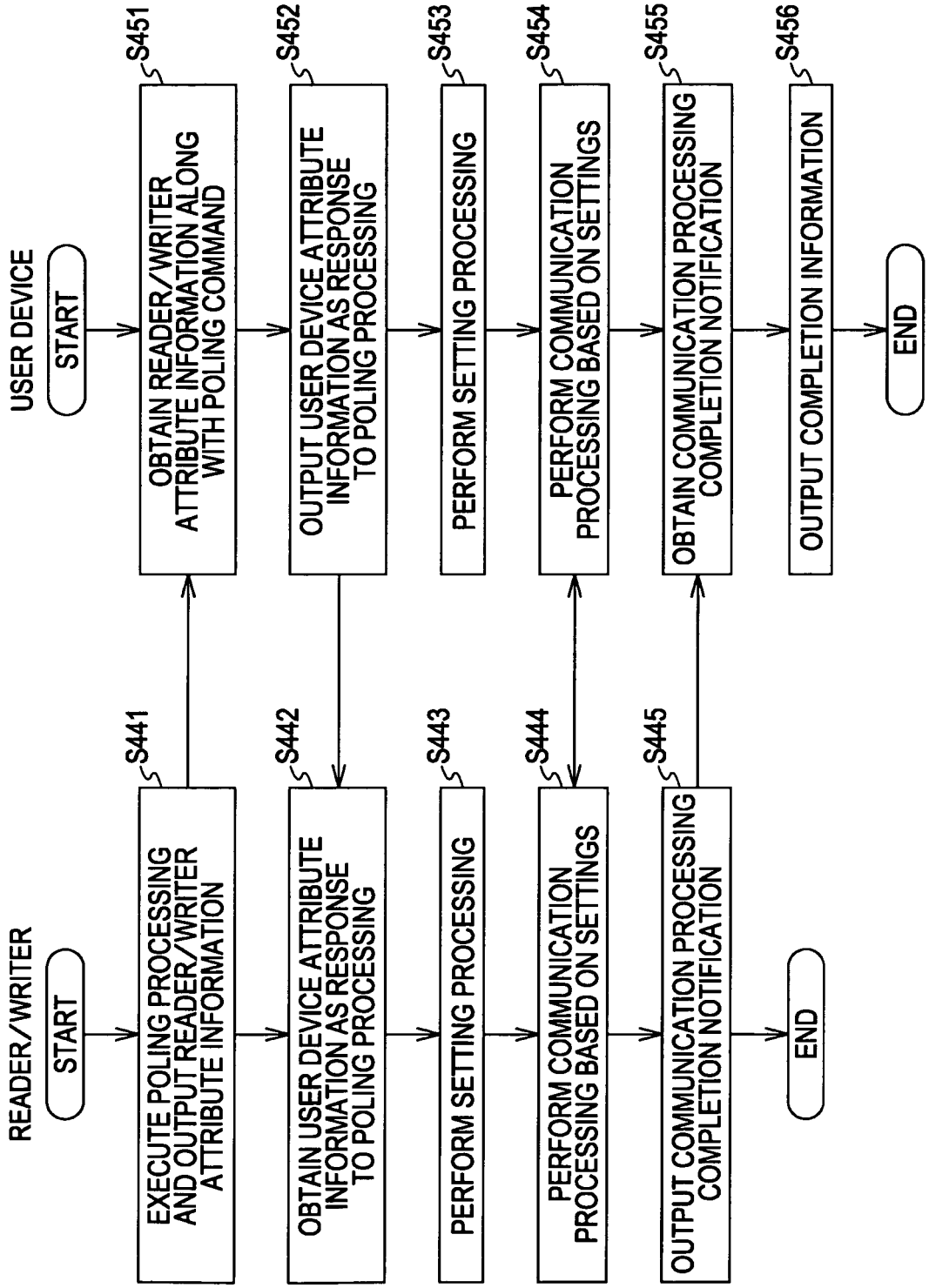
FIG. 74 is a flowchart for describing yet another example of the flow of communication optimization processing.

Note that this exchange of attribute information may be made at any timing as with the other examples described above, as long as the timing is up to the time of notification of processing completion. An example of the flow for exchanging information relating to the hardware of each other as attribute information at the time of the reader/writer 1001 and the user device 1002 establishing communication will be described with reference to the flowchart in FIG. 74.

First, in step S441, the reader/writer 1001 executes poling processing, and also outputs reader/writer attribute information. That is to say, the reader/writer 1001 outputs (transmits) a communication establishment request command (polling command) and also reader/writer attribute information, to an undetermined device within a communicable range.

For example, in the event that a user 1003 wearing the user device 1002 enters the communicable range of the reader/writer 1001 by touching the signal electrode of the reader/writer 1001 or the like, the user device 1002 obtains reader/writer attribute information along with the poling command in step S451, and in step S452 outputs user device attribute information as a response to the poling processing.

In step S442, the reader/writer 1001 obtains the user device attribute information as a response to the poling processing. Upon obtaining the user device attribute information 1140, the reader/writer 1001 performs the setting processing in step S443 as described above, performs display processing in step S444 based on the settings, and performs communication processing with the user device 1002 in step S445 based on the settings.

Also, upon the user device 1002 outputting the user device attribute information in step S452, the user device 1002 performs the setting processing in step S453 as described above, and performs communication processing with the reader/writer 1001 based on the settings in step S453.

Upon communication processing ending, the reader/writer 1001 identifies the notification method to the user 1003 based on the user device attribute information and the contents of the communication processing (usage), and in step S445 outputs the communication processing completion notification to the user device 1002, and the processing ends. Upon the communication processing completion notification being obtained in step S455, the user device 1002 outputs ending information for making notification to the user 1003 that the processing has ended, with a method identified by the communication processing completion notification, such as vibration, image display, or audio output or the like in step S456. Upon notification of the ending information ending, the user device 1002 ends processing.

Thus, the reader/writer 1001 and the user device 1002 exchange mutual attribute information while performing communication establishment processing, and following communication processing, can perform completion notification to the user with a more suitable method according to the usage of the communication processing.

Also, even with the cases of such attribute information described so far with reference to FIGS. 64 through 74, the reader/writer 1001 may make not only its own settings but also perform the setting processing for the user device 1002 for the case of this attribute information, as described with reference to FIGS. 60 through 63. Alternately, the user device 1002 may perform setting processing for not only itself but also for the reader/writer 1001.

Note that the embodiment of the present invention described with reference to FIGS. 34 through 74 may also be applied to other than the communication system 1000 shown in FIG. 34.

Figure 75A:
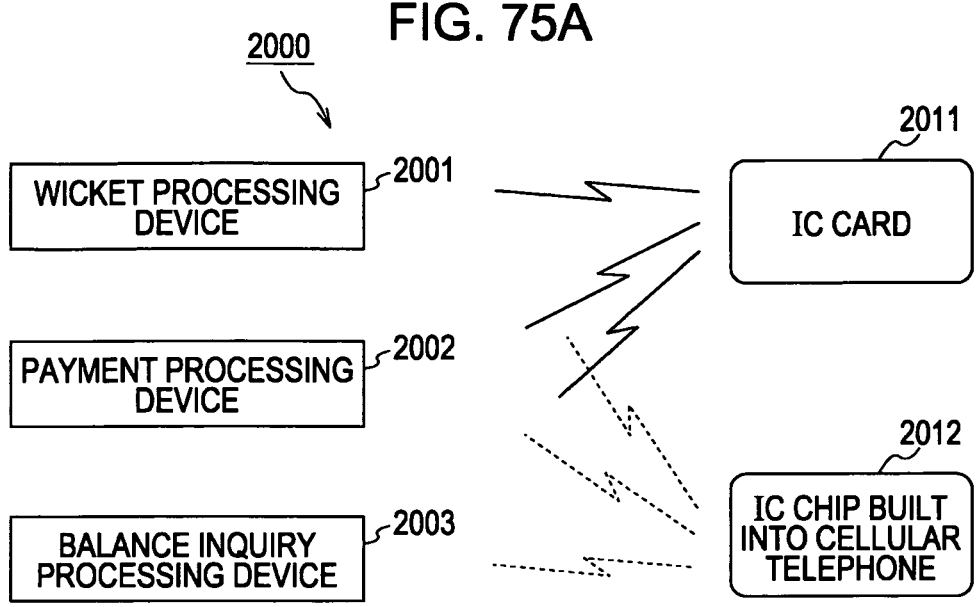
FIG. 75 is a diagram illustrating further configuration examples of a communication system to which the present invention is applied.

For example, as shown in FIG. 75A, this may be a non-contact type IC card system configured of a reader/writer in the from of various types of devices and a user device taking on the form of non-contact IC cards or IC card functions of cellular telephones. In the case shown in FIG. 75A, a non-contact IC card system 2000 includes a wicket processing device 2001 having a reader/writer built in, to perform close-distance wireless communication with a non-contact IC card or the like so as to carry out wicket processing, a payment processing device 2002 having a reader/writer built in, to perform close-distance wireless communication with a non-contact IC card or the like so as to carry out payment processing, and a balance inquiry processing device 2003 having a reader/writer built in, to perform close-distance wireless communication with a non-contact IC card or the like so as to carry out balance inquiry processing, an IC card 2011 which is a non-contact IC card and performs close-distance wireless communication with a reader/writer, and a cellular telephone built-in IC chip 2011 which has equivalent functions to the IC chip 2012 and which is built into a cellular telephone.

The wicket processing device 2001, payment processing device 2002, and balance inquiry processing device 2003 each perform close-distance wireless communication with the IC card 2011 or the telephone built-in IC chip 2012 to carry out mutually different services, thereby providing mutually different services to the user of the IC card 2011 or the user of the telephone built-in IC chip 2012. That is to say, the wicket processing device 2001, payment processing device 2002, and balance inquiry processing device 2003 each have different "usages".

Also, the IC card 2011 does not have a power source, and operates and performs communication with supply of power from the wicket processing device 2001, payment processing device 2002, and balance inquiry processing device 2003. Conversely, while the telephone built-in IC chip 2012 performs the same communication as the IC card 2011, the power source of the cellular telephone can be used. That is to say, the telephone built-in IC chip 2012 essentially has a power source, and accordingly can perform communication without power supply from the wicket processing device 2001, payment processing device 2002, or balance inquiry processing device 2003. In other words, the IC card 2011 and the telephone built-in IC chip 2012 differ one from another regarding "hardware functions".

In the event of performing communication among the devices of such a non-contact IC card system 2000, exchanging attribute information to perform settings for communication as described above allows each device in the non-contact IC card system 2000 to perform communication under more suitable communication settings regardless of which device communication is to be made with.

Figure 75B:
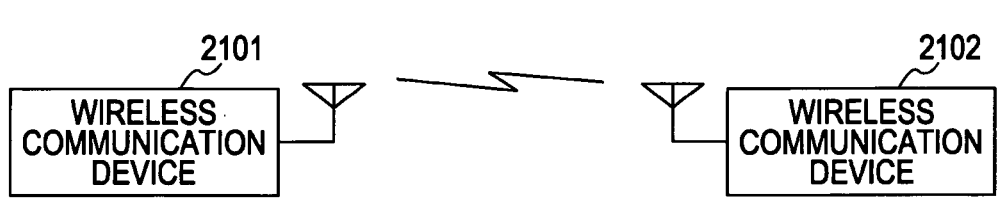

Also, for example, this may be a wireless communication system between wireless communication devices, as shown in FIG. 75B. In the case of FIG. 75B, a wireless communication system 2100 has two wireless communication devices (wireless communication device 2101 and wireless communication device 2102). The wireless communication system 2100 (i.e., the devices thereof) can apply the present invention to exchange mutual attribute information, and carry out communication settings based on the attribute information, thereby performing communication settings that are more suitable, depending on usages and functions.

Figure 75C:
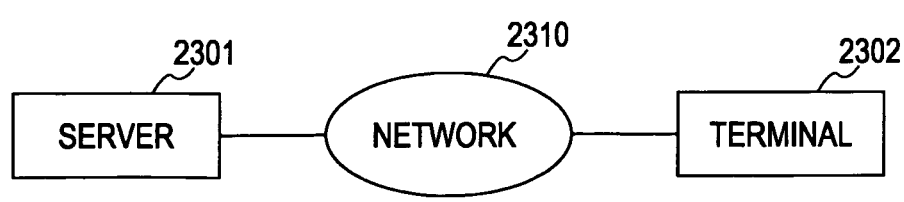

Further, as shown in FIG. 75C, an arrangement may be made for a network system connected by cable (network), for example. In the case shown in FIG. 75C, with a network system 2300, a server 2301 and terminal 2302, which in the most-commonly-implemented forms are personal computers, are connected by a network 2310, the leading example thereof being the Internet. Each device in the network 2300 applies the present invention so as to exchange attribute information with one another, and perform communication settings based on the attribute information, thereby enabling more suitable communication settings according to usages and functions.

The series of above-described processing can be executed by hardware, or by software. In these cases, the individual devices described above may each be configured as personal computers, such as illustrated in FIG. 76.

Figure 76:
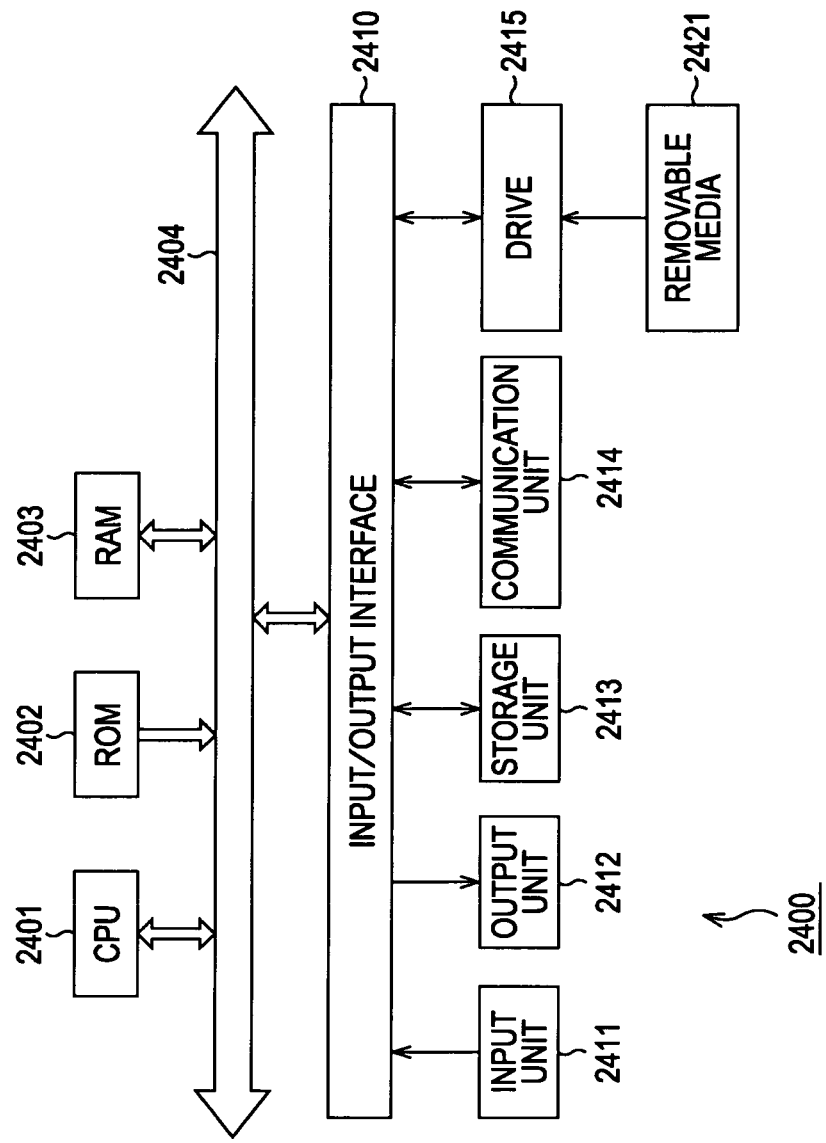
FIG. 76 is a diagram illustrating a configuration example of a personal computer to which the present invention is applied.

In FIG. 76, a CPU (Central Processing Unit) 2401 of the personal computer 2400 executes the various processing following programs stored in ROM (Read Only Memory) 2402 or programs loaded from a storage unit 2413 to RAM (Random Access Memory) 2403. The RAM 2403 also stores data necessary for the CPU 2401 to execute the various types of processing, as appropriate.

The CPU 2401, ROM 2402, and RAM 2403, are mutually connected via a bus 2404. An input/output interface 2410 is also connected to the bus 2404.

Also connected to the input/output interface 2410 is a input unit 2411 such as a keyboard, mouse, and so forth, an output unit 2412 including a display such as a CRT (Cathode Ray Tube), an LCD (Liquid Crystal Display), or the like, and a speaker or the like, a storage unit 2413 such as a hard disk or the like, and a communication unit 2414 such as a modem or the like. The communication unit 2414 performs communication processing via networks including the Internet.

Also connected to the input/output interface 2410 if necessary is a drive 2415, to which removable media 2421 such as magnetic disks, optical disks, magneto-optical disks, semiconductor memory, or the like, is mounted as appropriate, with computer programs read out therefrom being installed to the storage unit 2413 as necessary.

In the event of executing the above-described series of processing by software, programs making up the software are installed from networks and recording media.

The recording media as used here may include, but are not restricted to, magnetic disks (including flexible disks), optical disks (including CD-ROM (Compact Disk-Read Only Memory) and DVD (Digital Versatile Disk), magneto-optical disks (including MD (Mini-Disk) (a registered trademark)), in which the programs are recorded and distributed to the user separately from the device itself, as shown in FIG. 76 for example, or removable media 2421 configured of semiconductor memory or the like, and further may include ROM 2402 or the hard disk included in the storage unit 2413 or the like in which programs are recorded and the medium is assembled into the device beforehand and thus provided to the user.

Note that in the present specification, steps described in the program recorded in the recording medium may be executed in time-sequence following the described order as a matter of course, or may be executed in parallel or individually.

Also note that in the present specification, the term "system" refers to the entirety of equipment configured of multiple devices. Also note that a configuration described above as being a single device may be divided and be carried out in the form of multiple devices, or conversely, a configuration described above as being multiple devices may be integrated and be carried out in the form of a single device. Further, other configurations than those described above may be added to the configuration of the devices. Moreover, one part of the configuration of one device may be included in the configuration of another device, as long as the configuration and operations of the overall system are substantially the same.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
   a first communication device including first holding means storing first attribute information identifying a first software function performed by the first communication device and a first hardware setting used by the first communication device to perform the first software function; and
   a second communication device including a second holding unit for storing second attribute information identifying a second software function performed by the second communication device and a second hardware setting used by the second communication device to perform the second software function, the second hardware setting describing a type of hardware configuration of the second communication device and a corresponding value of the type of hardware configuration used to perform the second software function, the second communication device communicating with the first communication device via a communication medium, the second attribute information indicating whether the second hardware setting is changeable or unchangeable,
   wherein the first communication device includes:
       a first sharing unit for sharing the first attribute information with the second communication device and retrieving the second attribute information stored in the second communication device; and
       a first setting unit for controlling the first hardware setting based on the retrieved second attribute information,
   wherein the second communication device includes:
       a second sharing unit for sharing the second attribute information with the first sharing unit and retrieving the first attribute information stored in the first holding unit; and
       a second setting unit for controlling the second hardware setting based on the retrieved first attribute information shared by the second sharing unit, and
   wherein the communication between the second communication device and the first communication device continues via the communication medium, and the communication is controlled by changing the first hardware setting based on the first attribute information and the retrieved second attribute information when the retrieved second attribute information indicates that the second hardware setting is unchangeable, and when the second communication device performs the second software function based on the type of hardware configuration and the corresponding value.

2. A first communication device communicating with a second communication device via a communication medium, the first communication device comprising:
   an obtaining unit for obtaining first attribute information identifying a first software function performed by the first communication device and a first hardware setting used by the first communication device to perform the first software function, and for obtaining second attribute information identifying a second software function performed by the second communication device and a second hardware setting used by the second communication device to perform the second software function, the second hardware setting describing a type of hardware configuration of the second communication device and a corresponding value of the type of hardware configuration used to perform the second software function, wherein the second attribute information indicates whether the second hardware setting is changeable or unchangeable;

a setting unit for controlling the first hardware setting of the first communication device based on the second attribute information; and a control unit for continuing the communication between the first communication device and the second communication device by changing the first hardware setting based on the first attribute information and the second attribute information when the obtained second attribute information indicates that the second hardware setting is unchangeable, and when the second communication device performs the second software function based on the type of hardware configuration and the corresponding value.

3. The first communication device according to claim 2, wherein the second hardware setting comprises at least one of a processor speed setting, a transmission power, a reception sensitivity, and a power source setting associated with the second communication device.

4. The first communication device according to claim 2, further comprising a request unit for requesting the second attribute information of said second communication device, wherein said obtaining unit obtains the second attribute information which is transmitted in response to the request.

5. The first communication device according to claim 2, wherein the first hardware setting comprises at least one of a processor speed setting, a transmission power setting, a reception sensitivity setting, and power supply setting of the first communication device.

6. The first communication device according to claim 2, further comprising a table holding unit for holding a setting table including information for controlling the first hardware setting, wherein the first hardware setting is controlled and changed by using the setting table.

7. The first communication device according to claim 2, further comprising a changeability determining unit for determining whether or not the first hardware setting can be changed.

8. The first communication device according to claim 2, further comprising a display unit for displaying information relating to the first hardware setting.

9. The first communication device according to claim 2, wherein the second attribute information includes at least one of information relating to an algorithm for encryption processing, information relating to the number of processing steps of encryption, and information relating to an encryption key and key length associated with the second software function.

10. The first communication device according to claim 2, wherein the second hardware setting comprises a clock frequency of the second communication device.

11. The first communication device according to claim 2, further comprising:

an attribute information holding unit for holding the first attribute information; and a supply unit for supplying the first attribute information to the second communication device.

12. The first communication device according to claim 11, wherein the first hardware setting comprises at least one of a processor speed setting, a transmission power setting, a reception sensitivity setting, and a power source setting of the first communication device.

13. The first communication device according to claim 11, further comprising a request accepting unit for accepting requests for the first attribute information from the second communication device, wherein the supply unit supplies the first attribute information to the second communication device upon accepting the request.

14. The first communication device according to claim 11, wherein the first attribute information includes at least one of information relating to an algorithm for encryption processing, information relating to the number of processing steps of encryption processing, and information relating to an encryption key and key length associated with the first communication device.

15. The first communication device according to claim 11, wherein the first hardware setting comprises a clock frequency of the first communication device.

16. The first communication device according to claim 2, further comprising:

an attribute information holding unit for holding the first attribute information; and a supply unit for supplying information relating to results of setting the first hardware setting to the second communication device, wherein the setting unit performs setting of the first hardware setting of the communication between the first communication device and the second communication device based on the first attribute information and the second attribute information and, wherein the supply unit supplies results of setting the first hardware setting to the second communication device.

17. The first communication device according to claim 2, further comprising a setting results obtaining unit for obtaining setting results supplied from the second communication device.

18. A communication method being executed by a first communication device communicating with a second communication device via a communication medium, the method comprising:

obtaining first attribute information identifying a first software function performed by the first communication device and a first hardware setting used by the first communication device to perform the first software function;

obtaining second attribute information identifying a second software function performed by the second communication device and a second hardware setting used by the second communication device to perform the second software function, the second hardware setting describing a type of hardware configuration of the second communication device and a corresponding value of the type of hardware configuration used to perform the second software function, wherein the second attribute information indicates whether the second hardware setting is changeable or unchangeable;

controlling the first hardware setting of the first communication device based on the second attribute information; and continuing the communication between the first communication device and the second communication device by changing the first hardware setting based on the first attribute information and the second attribute information when the obtained second attribute information indicates that the second hardware setting is unchangeable, and when the second communication device performs the second software function based on the type of hardware configuration and the corresponding value.

19. A non-transitory computer-readable storage medium comprising a program, which when executed on a first communication device causes the first communication apparatus to execute processing of a communication method for communicating with a second communication device via a communication medium, the communication method comprising:

obtaining first attribute information identifying a first software function performed by the first communication device and a first hardware setting used by the first communication device to perform the first software function;

obtaining second attribute information identifying a second software function performed by the second communication device and a second hardware setting used by the second communication device to perform the second software function, the second hardware setting describing a type of hardware configuration of the second communication device and a corresponding value of the type of hardware configuration used to perform the second software function, wherein the second attribute information indicates whether the second hardware setting is changeable or unchangeable;

controlling the first hardware setting of the first communication device based on the second attribute information; and continuing the communication between the first communication device and the second communication device by changing the first hardware setting based on the first attribute information and the second attribute information when the obtained second attribute information indicates that the second hardware setting is unchangeable, and when the second communication device performs the second software function based on the type of hardware configuration and the corresponding value.

20. A communication system comprising:

a first communication device including a first holding unit storing first attribute information identifying a first software function performed by the first communication device and a first hardware setting used by the first communication device to perform the first software function; and a second communication device including a second holding unit for storing second attribute information identifying a second software function performed by the second communication device and a second setting used by the second communication device to perform the second software function, the second hardware setting describing a type of hardware configuration of the second communication device and a corresponding value of the type of hardware configuration used to perform the second software function, the second communication device communicating with the first communication device via a communication medium, the second attribute information indicating whether the second hardware setting is changeable or unchangeable, wherein the first communication device includes:

a first sharing unit for sharing the first attribute information with the second communication device and retrieving the second attribute information stored in the second communication device;

a changeability determining unit for determining whether the first hardware setting can be changed;

a table holding unit for holding a setting table describing predetermined settings of the first communication device, the predetermined settings corresponding to types of communications being executed by the first communication device; and a first setting unit for controlling the first hardware setting based on the retrieved second attribute information and the setting table, wherein the second communication device includes:

a second sharing unit for sharing the second attribute information with the first sharing unit and retrieving first attribute information stored in the first holding unit;

a second setting unit for performing setting of said communication based on said first attribute information shared by said second sharing unit;

a second control unit for controlling said communication based on the setting results of said communication performed by said second setting unit; and a second setting unit for controlling the second hardware setting based on the retrieved first attribute information shared by the second sharing unit, and wherein the communication between the second communication device and the first communication device continues via the communication medium, and the communication is controlled by changing the first hardware setting based on the first attribute information, the retrieved second attribute information, the setting table, and a type of the communication being continued when it is determined that the first hardware setting can be changed, when the retrieved second attribute information indicates that the second setting is unchangeable, and when the second communication device performs the second software function based on the type of hardware configuration and the corresponding value.

21. A first communication device communicating with a second communication device via a communication medium, the first communication device comprising:

an obtaining unit for obtaining first attribute information identifying a first software function performed by the first communication device and a first hardware setting used by the first communication device to perform the first software function of the first communication device, and for obtaining second attribute information describing a second software function performed by the second communication device and a second hardware setting used by the second communication device to perform the second software function, the second hardware setting describing a type of hardware configuration of the second communication device and a corresponding value of the type of hardware configuration used to perform the second software function, wherein the second attribute information indicates whether the second hardware setting is changeable or unchangeable;

a setting unit for controlling the first hardware setting of the first communication device based on the second attribute information;

a changeability determining unit for determining whether the first hardware setting can be changed;

a table holding unit for holding a setting table describing predetermined settings of the first communication device, the predetermined settings corresponding to types of communications being executed by the first communication device; and a control unit for continuing the communication between the first communication device and the second communication device by changing the first hardware setting based on the first attribute information, the second attribute information, the setting table and a type of the communication being continued when it is determined that the first hardware setting can be changed, when the obtained second attribute information indicates that the second hardware setting is unchangeable, and when the second communication device performs the second software function based on the type of hardware configuration and the corresponding value.

* * * * *